US011144889B2

(12) United States Patent
Li et al.

(10) Patent No.: US 11,144,889 B2
(45) Date of Patent: *Oct. 12, 2021

(54) AUTOMATIC ASSESSMENT OF DAMAGE AND REPAIR COSTS IN VEHICLES

(71) Applicant: American International Group, Inc., New York, NY (US)

(72) Inventors: Kaigang Li, New York, NY (US); Ashwath Aithal, Fremont, CA (US); Siddhartha Dalal, Somerset, NJ (US); Liangkai Zhang, Newark, CA (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/973,343

(22) Filed: May 7, 2018

(65) Prior Publication Data

US 2018/0260793 A1 Sep. 13, 2018

Related U.S. Application Data

(63) Continuation-in-part of application No. 15/092,480, filed on Apr. 6, 2016, now Pat. No. 10,692,050.

(51) Int. Cl.
*G06Q 40/08* (2012.01)
*G06Q 10/00* (2012.01)
(Continued)

(52) U.S. Cl.
CPC .......... *G06Q 10/20* (2013.01); *G06N 3/0454* (2013.01); *G06N 3/08* (2013.01); *G06N 3/084* (2013.01);
(Continued)

(58) Field of Classification Search
USPC .............................................................. 705/4
See application file for complete search history.

(56) References Cited

U.S. PATENT DOCUMENTS 9,824,453 B1 * 11/2017 Collins .................. G06Q 40/08
10,319,094 B1 * 6/2019 Chen ..................... G06F 3/0484
(Continued)

OTHER PUBLICATIONS

European Patent Office, International Preliminary Report on Patentability in International Application No. PCT/US2016/042783 (dated Oct. 9, 2018).

(Continued)

*Primary Examiner* — Hani M Kazimi
*Assistant Examiner* — Hatem M Ali
(74) *Attorney, Agent, or Firm* — Snell & Wilmer L.L.P.

(57) ABSTRACT

A system and method are provided for automatically estimating a repair cost for a vehicle. A method includes: receiving, at a server computing device over an electronic network, one or more images of a damaged vehicle from a client computing device; performing image processing operations on each of the one or more images to detect external damage to a first set of parts of the vehicle; inferring internal damage to a second set of parts of the vehicle based on the detected external damage; and, calculating an estimated repair cost for the vehicle based on the detected external damage and inferred internal damage based on accessing a parts database that includes repair and labor costs for each part in the first and second sets of parts.

17 Claims, 44 Drawing Sheets

(51) Int. Cl.
| | |
|---|---|
| G06Q 30/02 | (2012.01) |
| G06T 19/20 | (2011.01) |
| G06T 7/00 | (2017.01) |
| G06N 3/08 | (2006.01) |
| G06T 7/33 | (2017.01) |
| G06N 5/00 | (2006.01) |
| G06N 7/00 | (2006.01) |
| G06N 3/04 | (2006.01) |
| G06N 20/20 | (2019.01) |

(52) U.S. Cl.
CPC ............ *G06N 5/003* (2013.01); *G06N 7/005* (2013.01); *G06N 20/20* (2019.01); *G06Q 30/0283* (2013.01); *G06Q 40/08* (2013.01); *G06T 7/001* (2013.01); *G06T 7/0004* (2013.01); *G06T 7/33* (2017.01); *G06T 19/20* (2013.01); *G06T 2207/10024* (2013.01); *G06T 2207/30136* (2013.01); *G06T 2207/30252* (2013.01); *G06T 2219/2008* (2013.01)

(56) References Cited

U.S. PATENT DOCUMENTS

| | | | | |
|---|---|---|---|---|
| 2014/0229207 | A1 | 8/2014 | Swamy et al. | |
| 2014/0292755 | A1* | 10/2014 | Nagase | G06T 17/20 345/423 |
| 2015/0106133 | A1* | 4/2015 | Smith, Jr. | G06Q 40/08 705/4 |
| 2018/0260793 | A1* | 9/2018 | Li | G06N 7/005 |
| 2020/0034958 | A1* | 1/2020 | Campbell | G06Q 10/10 |

OTHER PUBLICATIONS

Baumgärtel et al., "Detecting car damages with CAN networks" *CAN Newsletter*, 38-40 (Jan. 2014).

Chabot et al., Détection de pose de véhicule pour la reconnaissance de marquee et modèe—Pose detection for vehicle Make and Model Recognition, *Journées francophones des jeunes chercheurs en vision par ordinateur* (Jun. 2015).

Dai, et al. "Convolutional Feature Masking for Joint Object and Stuff Segmentation," *IEEE Conference on Computer Vision and Pattern Recognition* (CVPR), pp. 3992-4000 (Jun. 7-12, 2015).

Dai, et al. "Instance-Aware Semantic Segmentation via Multi-task Network Cascades," *2016 IEEE Conference on Computer Vision and Pattern Recognition* (*CVPR*), pp. 3150-3158 (Jun. 2016).

Dollar, et al. "Fast Edge Detection Using Structured Forests," *IEEE Transactions on Pattern Analysis and Machine Intelligence*, vol. 37, Iss. 8, pp. 1558-1570 (Dec. 4, 2014).

Felzenszwalb et al., "Object Detection with Discriminatively Trained Part Based Models," *Pattern Analysis and Machine Intelligence, IEEE Transactions on*, 32(9): 1627-1645 (2010).

Jayawardena, "Image Based Automatic Vehicle Damage Detection," (Nov. 2013).

Li et al., "Distance Regularized Level Set Evolution and Its Application to Image Segmentation," *IEEE Transactions On Image Processing*, 19(12): 3243-3254 (2010).

Murphy, "Undirected graphical models (Markov random fields)," *Machine learning: a probabilistic perspective*, MIT Press, 661-705 (2012).

Pinheiro, et al. "Learning to Segment Object Candidates," *Proceedings of the 28th Int'l Conf. on Neural Information Processing Systems* (NIPS '15), pp. 1990-1998 (Dec. 7-12, 2015).

Ren, et al. "Faster R-CNN: Towards Real-Time Object Detection with Region Proposal Networks," *IEEE Transactions on Pattern Analysis and Machine Intelligence*, vol. 39, Iss. 6, pp. 1137-1149 (Jun. 2017).

Rhim et al., "A neural network approach for damage detection and identification of structures," *Computational Mechanics*, 16: 437-443 (1995).

Rother et al., "GrabCut"—Interactive Foreground Extraction using Iterated Graph Cuts, *ACM transactions on graphics* (*TOG*), 23(3), 309-314 (2004).

Selvaraju, et al. "Grad-CAM: Visual Explanations from Deep Networks via Gradient-based Localization," *2017 IEEE International Conference on Computer Vision* (ICCV) (Oct. 22-29, 2017).

Tulsiani et al., Viewpoints and Keypoints, *IEEE Conference on Computer Vision and Pattern Recognition* 1510-1519 (2015).

Zheng et al., "Conditional Random Fields as Recurrent Neural Networks," *Proceedings of the IEEE International Conference on Computer Vision*, 1529-1537 (2015).

European Patent Office, International Search Report and the Written Opinion in International Application No. PCT/US2016/042783 (dated Nov. 9, 2016).

\* cited by examiner

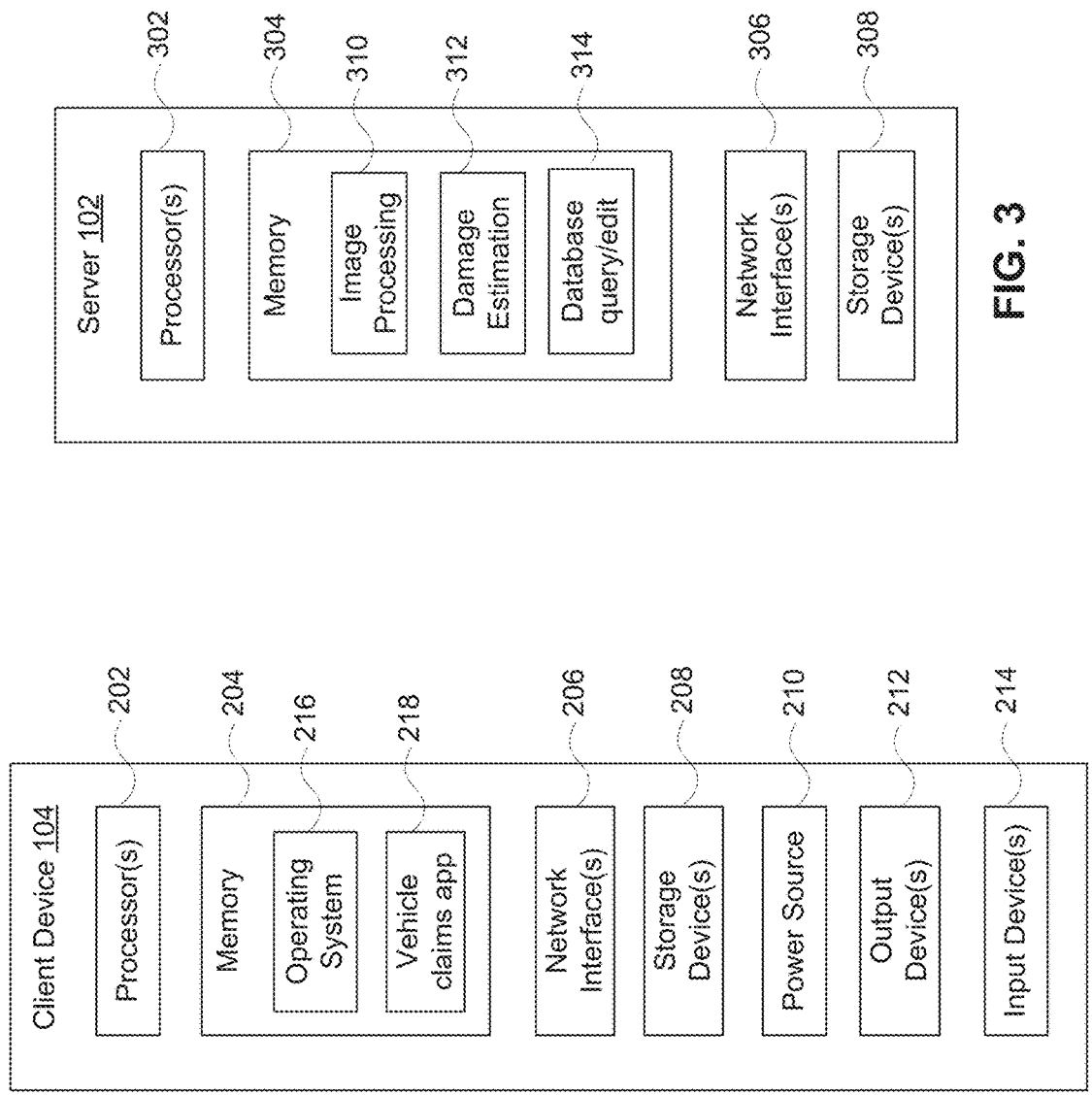

FIG. 29

|  | Part | Pose | | | | | | | |
|---|---|---|---|---|---|---|---|---|---|
|  |  | 1 | 2 | 3 | 4 | 5 | 6 | 7 | 8 |
| 0 | Front Bumper |  |  |  |  |  | ▓ | ▓ | ▓ |
| 1 | Back Bumper |  | ▓ | ▓ | ▓ |  |  |  |  |
| 2 | Front Windshield |  |  |  |  |  | ▓ | ▓ | ▓ |
| 3 | Back Windshield |  | ▓ | ▓ | ▓ |  |  |  |  |
| 4 | Hood |  |  |  |  |  | ▓ | ▓ | ▓ |
| 5 | Car Top |  |  |  |  |  | ▓ | ▓ | ▓ |
| 6 | Front Grill |  |  |  |  |  | ▓ | ▓ | ▓ |
| 7 | Left Front Fender | ▓ |  |  |  |  |  |  | ▓ |
| 8 | Left Front Headlight |  |  |  |  |  |  | ▓ | ▓ |
| 9 | Left Side | ▓ | ▓ |  |  |  |  |  |  |
| 10 | Left Back Headlight |  | ▓ | ▓ |  |  |  |  |  |
| 11 | Left Front Window | ▓ |  |  |  |  |  |  |  |
| 12 | Left Back Window | ▓ | ▓ |  |  |  |  |  |  |
| 13 | Left Front Door | ▓ |  |  |  |  |  |  | ▓ |
| 14 | Left Back Door | ▓ |  |  |  |  |  |  |  |
| 15 | Right Front Fender |  |  |  |  | ▓ | ▓ |  |  |
| 16 | Right Front Headlight |  |  |  |  |  | ▓ |  |  |
| 17 | Right Side |  |  |  | ▓ | ▓ |  |  |  |
| 18 | Right Back Headlight |  |  | ▓ | ▓ |  |  |  |  |
| 19 | Right Front Window |  |  |  |  | ▓ |  |  |  |
| 20 | Right Back Window |  |  |  | ▓ | ▓ |  |  |  |
| 21 | Right Front Door |  |  |  |  | ▓ | ▓ |  |  |
| 22 | Right Back Door |  |  |  |  | ▓ |  |  |  |
| 23 | Trunk |  | ▓ | ▓ | ▓ |  |  |  |  |

FIG. 31

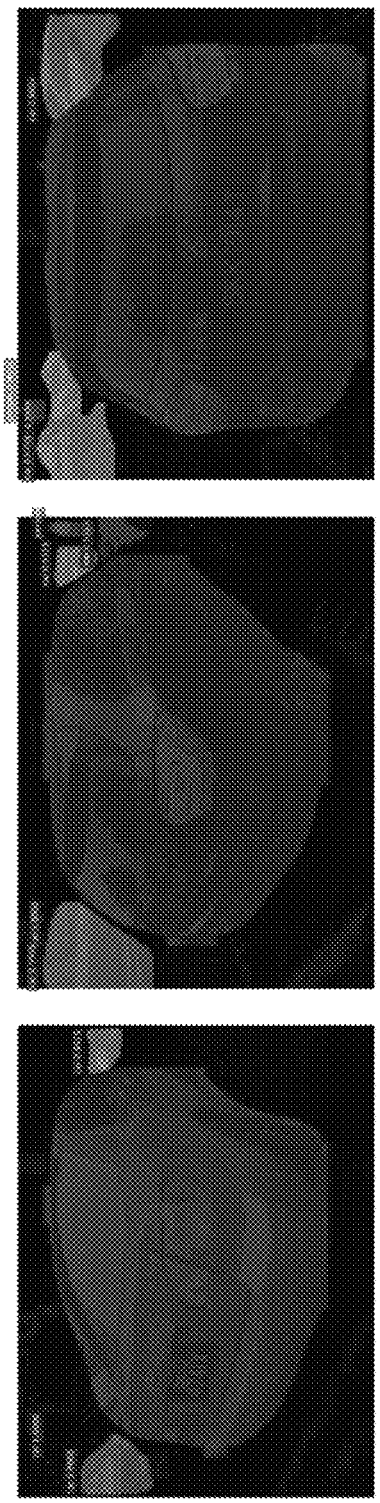
FIG. 33

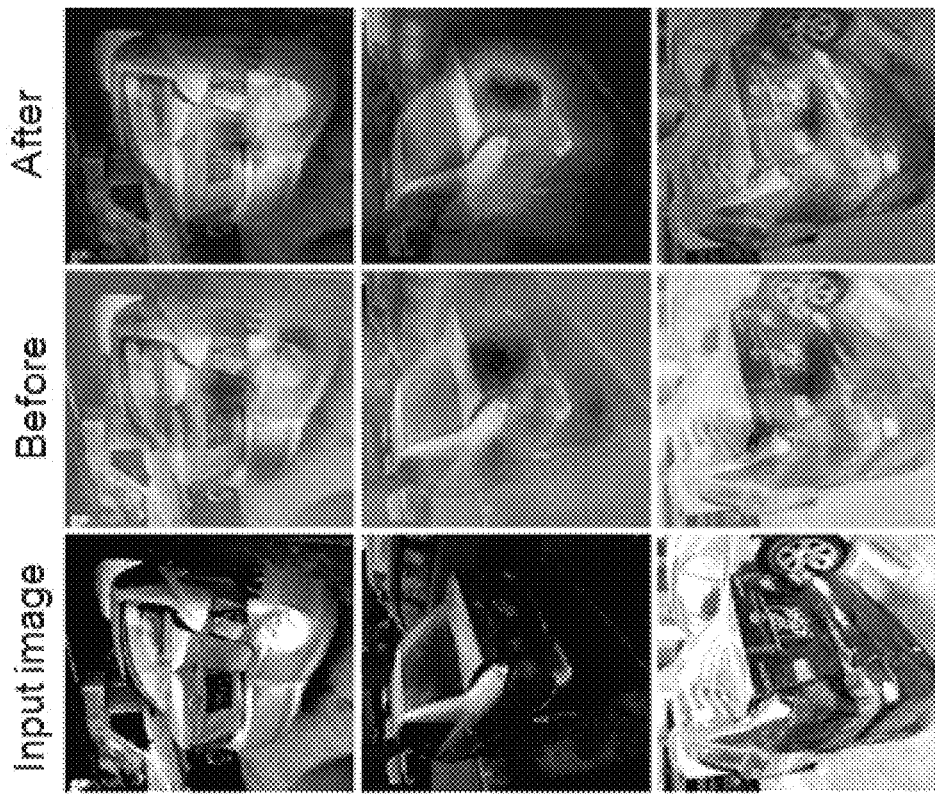
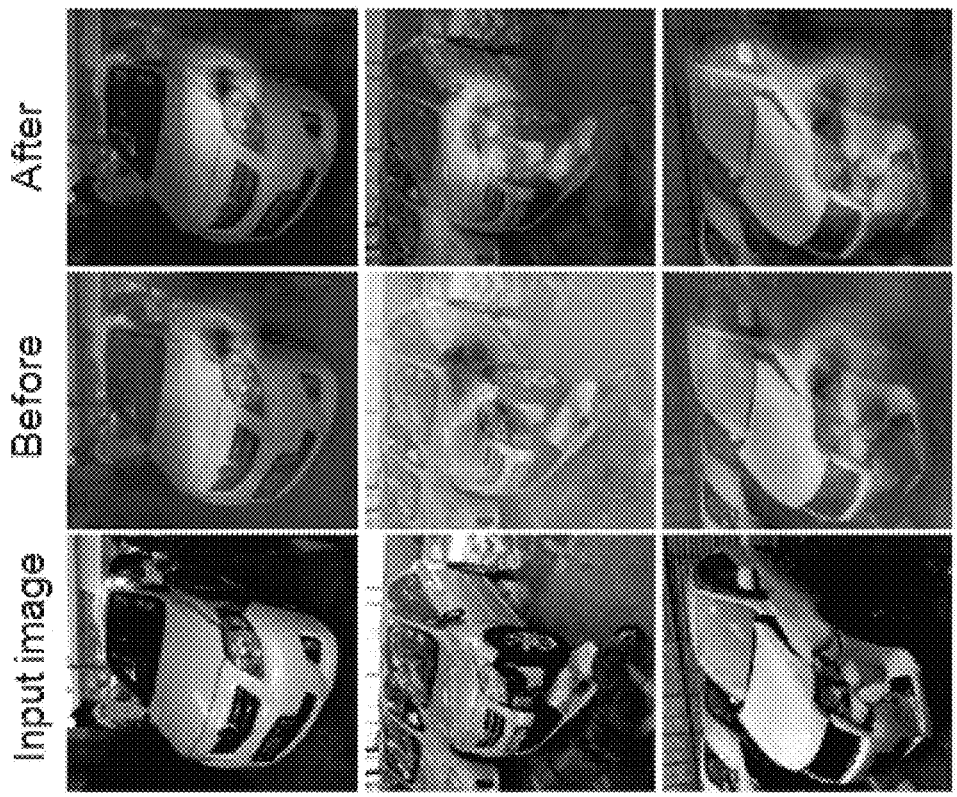
FIG. 38

 
 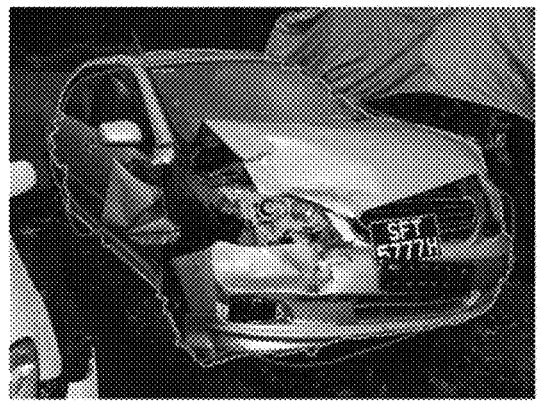
Before Refinement　　　　　　　　After Refinement
FIG. 44

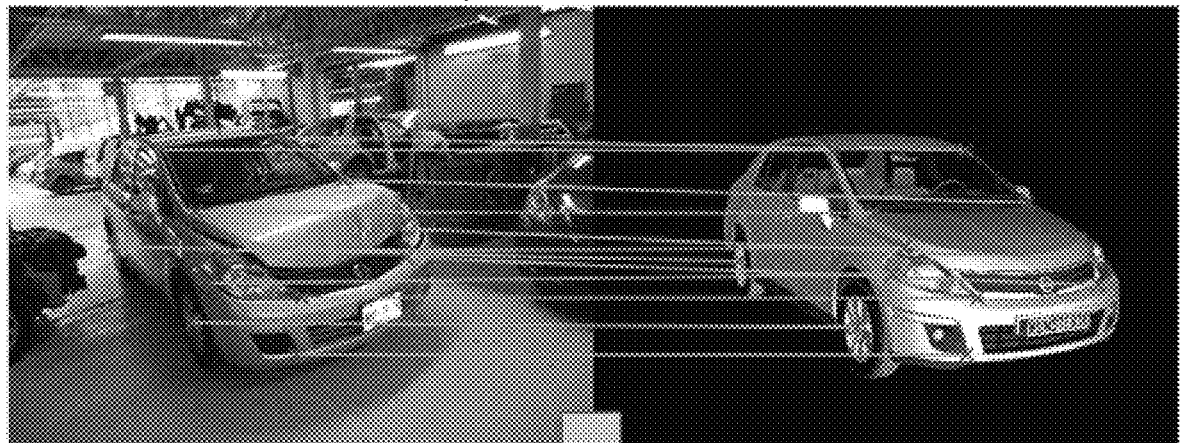
FIG. 46

AUTOMATIC ASSESSMENT OF DAMAGE AND REPAIR COSTS IN VEHICLES

CROSS-REFERENCED TO RELATED APPLICATIONS

The present application is a continuation-in-part (CIP) of U.S. patent application Ser. No. 15/092,480, filed on Apr. 6, 2016, which is hereby incorporated by reference in its entirety.

BACKGROUND

Currently, after a vehicle has been damaged in a road accident or otherwise, the vehicle is taken by the owner or a tow company to an auto repair shop for inspection. Inspection of the vehicle by a mechanic at the auto repair shop is required in order to assess which parts of the vehicle need to be repaired or replaced. An estimate is then generated based on the inspection. In some cases, when an insurance claim is filed, the estimate is forwarded to an insurance company to approve the repairs before the repairs are made to the vehicle.

From end-to-end, the process of vehicle inspection, estimate generation, claim approval, and vehicle repair can be long and complex, involving several parties including at least a customer, an auto repair shop, and a claim adjustor.

Accordingly, there is a need in the art for an improved system that overcomes some of the drawbacks and limitations of conventional approaches.

SUMMARY

Embodiments of the disclosure provide a method, computer-readable storage medium, and device for: receiving, at a server computing device over an electronic network, one or more images of a damaged vehicle from a client computing device; performing computerized image processing based on the one or more images to generate one or more damage detection images, wherein each damage detection image is a two-dimensional (2D) image that includes indications of areas of damage to the vehicle in the damage detection image; mapping the one or more damage detection images to a three-dimensional (3D) model of the vehicle to generate a damaged 3D model that indicates area of the vehicle that are damaged; and, calculating an estimated repair cost for the vehicle based on the damaged 3D model.

BRIEF DESCRIPTION OF THE DRAWINGS

FIG. 2 is a block diagram illustrating components of a client device from the system illustrated in FIG. 1 according to some embodiments of the disclosure.

FIG. 3 is a block diagram illustrating components for a server from the system illustrated in FIG. 1 according to some embodiments of the disclosure.

FIG. 29 illustrates an example of an interface of a damage annotation tool.

FIG. 31 illustrates which external body parts are visible in each of the eight pre-defined poses, according to one implementation.

FIG. 33 illustrates some example results of performing MNC to segment images of vehicles.

FIG. 38 illustrates results of the Grad-CAM algorithm and modified Grad-CAM algorithm for detecting localized damage in images, according to some implementations.

FIG. 44 illustrates results of pose refinement, according to one embodiment.

FIG. 46 illustrates pairwise 3D-to-2D correspondence between a 3D pose that maps a 3D model onto a 2D image plane, according to one embodiment.

DETAILED DESCRIPTION

Figure 1:
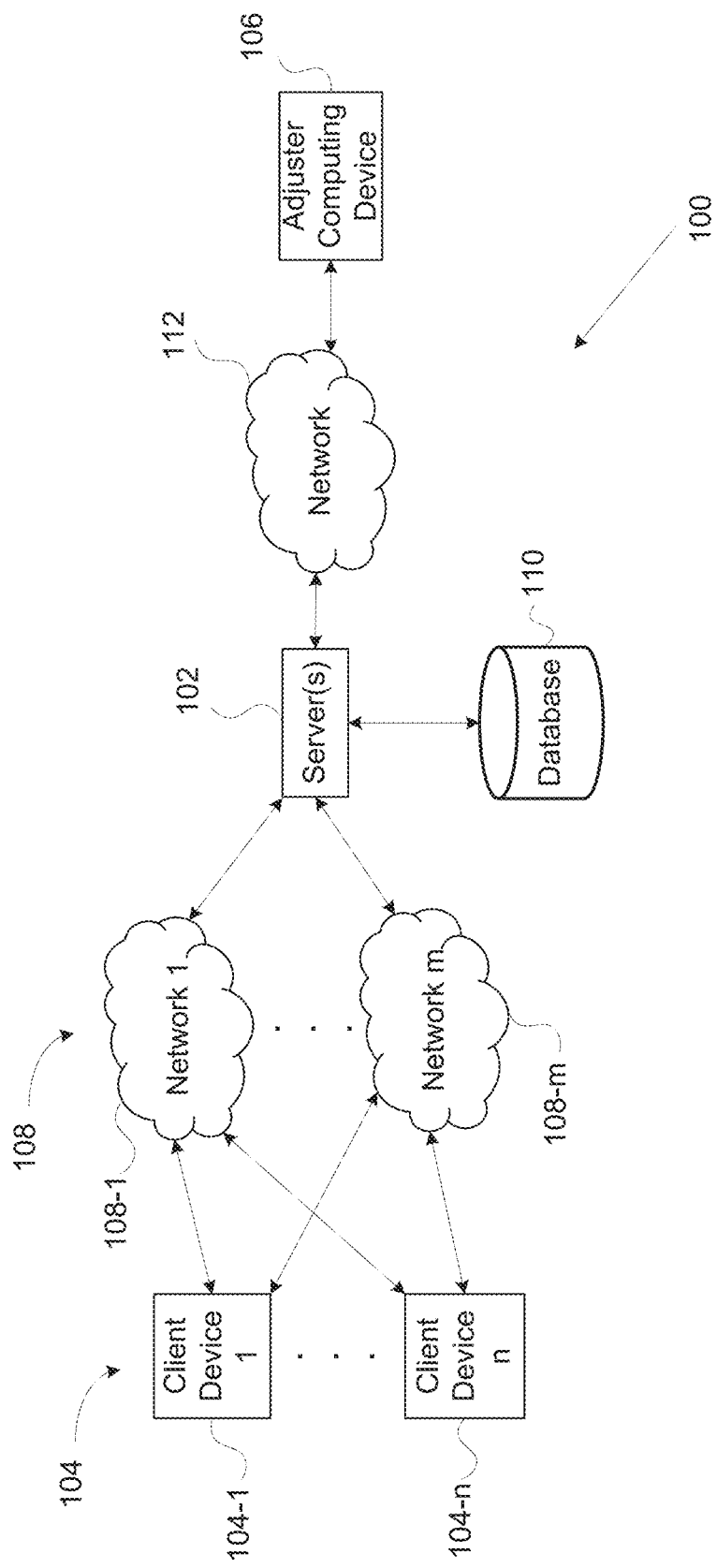
FIG. 1 is a block diagram illustrating a system in accordance with some example embodiments of the disclosure.

Embodiments of the disclosure provide systems and methods that apply computer vision and image processing to images of a damaged vehicle to determine which parts of the vehicle are damaged and estimate the cost of repair or replacement, thus automating the damage assessment and cost appraisal process. Additionally, in some embodiments, the server computing device may classify the loss as a total, medium, or small loss.

The disclosed automatic vehicle damage assessment system is a software system that uses captured images of a damaged vehicle along with auxiliary information available from other sources to assess the damage and, optionally, to provide an appraisal of damage and estimate of repair costs. In some embodiments, the captured images comprise one or more still images of the damaged vehicle and damaged areas. The auxiliary data includes the vehicle's make, model, and year. In other embodiments, the captured images include not only still images, but also video, LIDAR imagery, and/or imagery from other modalities. In some embodiments, the auxiliary information includes additional information available from insurance and vehicle registration records, publicly available information for the vehicle make and model, vehicle data from on-board sensors and installed devices, as well as information regarding the state of the imaging device at the time of image capture, including location information (e.g., GPS coordinates), orientation information (e.g., from gyroscopic sensors), and settings, among others.

The automatic vehicle damage assessment system is a first-of-its-kind system that leverages state-of-the-art computer vision and machine learning technologies to partially or fully automate the auto claims submission and settlement process, thereby introducing efficiencies in auto insurance claims processing. The system can be expanded to additional sensors and information sources as these become available on smartphone devices including, for instance, stereo/depth sensing modalities. Additionally, in some embodiments, the image capture process can be interactive, with an application ("app") installed on a smartphone or other client device that guides a user through the process of capturing images of the damaged vehicle.

In one example implementation, images (e.g., photos or videos) showing damage to the vehicle are captured soon after the damage occurs. The images can be taken with a mobile phone and sent to a server by the vehicle owner or driver over a cellular or wireless network connection, either through a proprietary platform such a mobile application or through a web-based service. In some embodiments, an insurance company field inspector or adjustor visits the vehicle site, captures the requisite images and uploads them to the server, as is currently done in some jurisdictions or countries. In further embodiments, the images can be captured by an auto repair shop to which the vehicle is taken after an accident.

In embodiments where a mobile phone is used to collect the images, information about the camera's location from the mobile phone GPS system, the camera's orientation from the mobile phone's gyroscope and accelerometer, the time at which the images are taken, and the camera's resolution, image format, and related attributes can also be provided to the server.

In embodiments where a telematics system is installed in the vehicle, the telematics system can provide information to the server about the vehicle's state at, prior to, and/or after the time of accident, velocity and acceleration profile of the vehicle, states of the airbags and turn signals, and other relevant vehicle state data.

Certain "metadata" about the vehicle are also available and stored in a database accessible by the server. The metadata includes at least the vehicle make, model, and year. The metadata may optionally include images of the vehicle prior to the occurrence of damage.

According to embodiments of the disclosure, the assessment of damage and associated repair costs relies upon image processing and machine learning technologies.

In one embodiment, computer vision techniques are used to first clean the received images of unwanted artifacts, such as background clutter and specular reflections, and then, to find the best matching image of a reference vehicle of the same make/model/year. The system compares the received images with the corresponding reference images along several attributes, e.g., edge distribution, texture, and shape. Using a variety of computer vision techniques, the system recognizes where and how the received images depart from the reference images, and identifies the corresponding part(s) and/or regions on the exterior of the vehicle that are damaged. The reference images can, in some embodiments, be derived from a commercial 3D model of a vehicle of the same make and model, or from images of the same vehicle taken prior to the occurrence of damage in the current claim, e.g., at the time of purchase of the auto policy.

In another embodiment, the computer vision techniques involve segmenting an image into portions related to the vehicle in question, determining a pose of the vehicle, detecting localized damage in the 2D image of the vehicle, aligning the 2D image to a 3D model of the vehicle, and fusing the localized damage onto the 3D model.

In some embodiments, a deep learning system (e.g., Convolutional Neural Network) is trained on a large number of images of damaged vehicles and corresponding information about damage, e.g., its extent and location on the vehicle, which are available from an insurance company's auto claims archives, in order to learn to assess damage presented with input images for a new auto claim. Such a pattern learning method can predict damage to both the exterior and interior of the vehicle, as well as the associated repair costs. The assessment of damage to the exterior determined by the image processing system can be used as input to the pattern learning system in order to supplement and refine the damage assessment. The current level of damage can be compared with the level of damage prior to filing of the current claim, as determined using image processing of prior images of the vehicle with the same system.

A comprehensive damaged parts list is then generated to prepare an estimate of the cost required to repair the vehicle by looking up in a parts database for parts and labor cost. In the absence of such a parts database, the system can be trained to predict the parts and labor cost associated with a damage assessment, since these are also available in the archival data. In some embodiments, the regions and/or areas of damage on the exterior of the vehicle can also be identified.

In some embodiments, when additional information about the state of the vehicle at the time of the accident as well as of the camera used to take its images is available, the additional information can be used to further refine the system's predictive capabilities. In particular, knowing the location, velocity, and acceleration of the vehicle at the time of accident allows an assessment of the extent of impact to the vehicle during the accident, which allows better estimation of the extent of damage to the exterior and interior of the vehicle. Knowing further whether airbags were deployed during the collision can be useful for determination of the extent of damage, including whether there might be a "total loss" of the vehicle. The orientation of the camera when used to take images of the vehicle, as well as its location and time, can also assist the damage detection system in carrying out various image processing operations, as will become apparent during the discussion below.

Advantageously, the automatic vehicle damage assessment systems and methods provided herein allow an insurance company to increase its efficiency of auto claims settlement processes. For example, automatic determination of "small value" claims can be settled rapidly without requiring time and effort on the part of adjustors to adjudicate. Automatic determination of "total loss" claims can also lead to early settlement of the claim, resulting in substantial savings in vehicle storage costs. Automatic verification of the damage appraisals sent by auto repair shops can supplant manual inspection of appraisals by adjustors and, in many cases, lead to efficiencies in adjustor involvement. Data aggregated across multiple claims and repair shops can also help identify misleading appraisals and recurrent fraudulent activity by repair shops. Early notification of the nature of damage can be sent to partner repair shops, allowing them to schedule the resources needed for repair early and more efficiently, reducing customer wait times, and thereby, rental vehicle costs.

Also, customer satisfaction is enhanced in multiple ways. First, the system can rapidly identify the claims that have a small amount of damage and the claims that have such severe damage that the vehicle can not be repaired and is a "total loss." In at least these two cases, the customer can be sent a settlement check almost immediately upon filing of the claim, with minimal involvement of human adjustors. In other cases, where the damage falls between the two extremes and the vehicle has to be taken to an auto repair shop, appraisal of the damage by the shop can be automatically checked by the system, leading to detection of potentially fraudulent claims, again with minimal requirement of a human adjustors' time and effort.

Turning now to the figures, FIG. 1 is a block diagram of a system 100 in accordance with certain embodiments of the disclosure. The system 100 includes a server or cluster of servers 102, one or more client devices labeled 104-1 through 104-$n$, an adjuster computing device 106, several network connections linking client devices 104-1 through 104-$n$ to server(s) 102 including the network connections labeled 108-1 through 108-$m$, one or more databases 110, and a network connection 112 between the server(s) 102 and the adjuster computing device 106.

The client device or plurality of client devices 104 and the adjuster computing device 106 can be any type of communication devices that support network communication, including a telephone, a mobile phone, a smart phone, a personal computer, a laptop computer, a smart watch, a personal digital assistant (PDA), a wearable or embedded digital device(s), a network-connected vehicle, etc. In some embodiments, the client devices 104 and adjuster computing device 106 can support multiple types of networks. For example, the client devices 104 and the adjuster computing device 106 may have wired or wireless network connectivity using IP (Internet Protocol) or may have mobile network connectivity allowing over cellular and data networks.

The various networks 108, 112 may take the form of multiple network topologies. For example, network 108 comprises wireless and/or wired networks. Networks 108 link the server 102 and the client devices 104. Networks 108 include infrastructure that support the links necessary for data communication between at least one client device 104 and server 102. Networks 108 may include a cell tower, base station, and switching network.

As described in greater detail herein, client devices 104 are used to capture one or more images of a damaged vehicle. The images are transmitted over a network connection 108 to a server 102. The server 102 processes the images to estimate damage and repair costs. The estimates are transmitted over network connection 112 to the adjust computer device 106 for approval or adjustment.

FIG. 2 is a block diagram of basic functional components for a client device 104 according to some aspects of the disclosure. In the illustrated embodiment of FIG. 2, the client device 104 includes one or more processors 202, memory 204, network interfaces 206, storage devices 208, power source 210, one or more output devices 212, one or more input devices 214, and software modules—operating system 216 and a vehicle claims application 218—stored in memory 204. The software modules are provided as being contained in memory 204, but in certain embodiments, the software modules are contained in storage devices 208 or a combination of memory 204 and storage devices 208. Each of the components including the processor 202, memory 204, network interfaces 206, storage devices 208, power source 210, output devices 212, input devices 214, operating system 216, the network monitor 218, and the data collector 220 is interconnected physically, communicatively, and/or operatively for inter-component communications.

As illustrated, processor 202 is configured to implement functionality and/or process instructions for execution within client device 104. For example, processor 202 executes instructions stored in memory 204 or instructions stored on a storage device 208. Memory 204, which may be a non-transient, computer-readable storage medium, is configured to store information within client device 104 during operation. In some embodiments, memory 204 includes a temporary memory, an area for information not to be maintained when the client device 104 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some embodiments, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

Client device 104 uses network interface 206 to communicate with external devices or server(s) 102 via one or more networks 108 (see FIG. 1), and other types of networks through which a communication with the client device 104 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and Universal Serial Bus (USB).

Client device 104 includes one or more power sources 210 to provide power to the device. Non-limiting examples of power source 210 include single-use power sources, rechargeable power sources, and/or power sources developed from nickel-cadmium, lithium-ion, or other suitable material.

One or more output devices 212 are also included in client device 104. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 104 includes one or more input devices 214. Input devices 214 are configured to receive input from a user or a surrounding environment of the user through tactile, audio, and/or video feedback. Non-limiting examples of input device 214 include a photo and video camera, presence-sensitive screen, a mouse, a keyboard, a voice responsive system, microphone or any other type of input device. In some examples, a presence-sensitive screen includes a touch-sensitive screen.

The client device 104 includes an operating system 216. The operating system 216 controls operations of the components of the client device 104. For example, the operating system 216 facilitates the interaction of the processor(s) 202, memory 204, network interface 206, storage device(s) 208, input device 214, output device 212, and power source 210.

As described in greater detail herein, the client device 104 uses vehicle claims application 218 to capture one or more images of a damaged vehicle. In some embodiments, the vehicle claims application 218 may guide a user of the client device 104 as to which views should be captured. In some embodiments, the vehicle claims application 218 may interface with and receive inputs from a GPS transceiver and/or accelerometer.

Server(s) 102 is at least one computing machine that can automatically calculate an estimate for vehicle repair costs based on images provided from a client device 104. The server 102 has access to one or more databases 110 and other facilities that enable the features described herein.

According to certain embodiments, similar elements shown in FIG. 2 to be included in the client device 104 can also be included in the adjuster computing device 106. The adjuster computing device 106 may further include software stored in a memory and executed by a processor to review and adjust repair cost estimates generated by the server 102.

Turning to FIG. 3, a block diagram is shown illustrating components for a server 102, according to certain aspects of the disclosure. Server 102 includes one or more processors 302, memory 304, network interface(s) 306, storage device(s) 308, and software modules—image processing engine 310, damage estimation engine 312, and database query and edit engine 314—stored in memory 304. The software modules are provided as being stored in memory 304, but in certain embodiments, the software modules are stored in storage devices 308 or a combination of memory 304 and storage devices 308. In certain embodiments, each of the components including the processor(s) 302, memory 304, network interface(s) 306, storage device(s) 308, media manager 310, connection service router 312, data organizer 314, and database editor 316 are interconnected physically, communicatively, and/or operatively for inter-component communications.

Processor(s) 302, analogous to processor(s) 202 in client device 104, is configured to implement functionality and/or process instructions for execution within the server 102. For example, processor(s) 302 executes instructions stored in memory 304 or instructions stored on storage devices 308. Memory 304, which may be a non-transient, computer-readable storage medium, is configured to store information within server 102 during operation. In some embodiments, memory 304 includes a temporary memory, i.e., an area for information not to be maintained when the server 102 is turned off. Examples of such temporary memory include volatile memories such as random access memories (RAM), dynamic random access memories (DRAM), and static random access memories (SRAM). Memory 304 also maintains program instructions for execution by processor(s) 302.

Server 102 uses network interface(s) 306 to communicate with external devices via one or more networks depicted as network 108 and network 112 in FIG. 1. Such networks may also include one or more wireless networks, wired networks, fiber optics networks, and other types of networks through which communication between the server 102 and an external device may be established. Network interface(s) 306 may be a network interface card, such as an Ethernet card, an optical transceiver, a radio frequency transceiver, or any other type of device that can send and receive information.

Storage devices 308 in server 102 also include one or more non-transient computer-readable storage media. Storage devices 308 are generally configured to store larger amounts of information than memory 304. Storage devices 308 may further be configured for long-term storage of information. In some examples, storage devices 304 include non-volatile storage elements. Non-limiting examples of non-volatile storage elements include magnetic hard discs, optical discs, floppy discs, flash memories, resistive memories, or forms of electrically programmable memories (EPROM) or electrically erasable and programmable (EEPROM) memories.

Server 102 further includes instructions that implement an image processing engine 310 that receives images of a damaged vehicle from one or more client devices 104 and performs image processing on the images. Server 102 further includes instructions that implement a damage estimation engine 312 that receives the images processed by the image processing engine 310 and, in conjunction with a database query and edit engine 314 that has access to a database 110 storing parts and labor costs, calculates an estimate for repair or replacement of the damaged vehicle.

Figure 4:
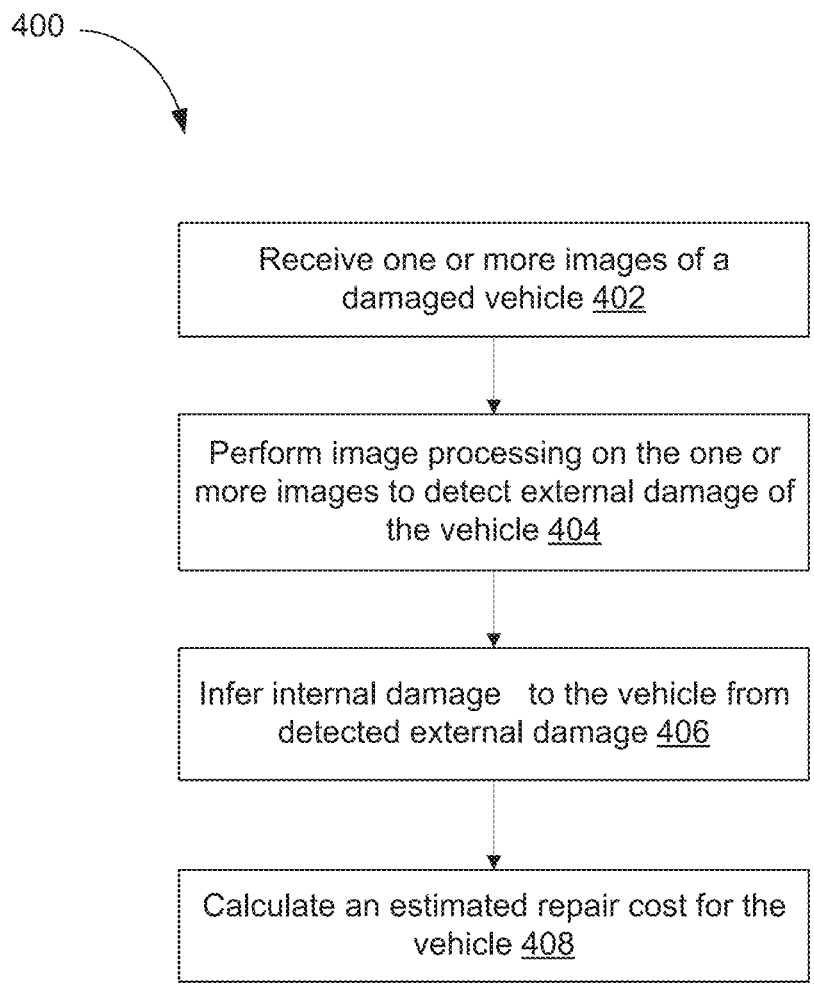
FIG. 4 is a flow diagram of method steps for automatically estimating a repair cost for a vehicle, according to one embodiment of the disclosure.

FIG. 4 is a flow diagram of method steps for automatically estimating a repair cost for a vehicle, according to one embodiment of the disclosure. As shown, the method 400 begins at step 402, where a server, such as server 102, receives one or more images of a damaged vehicle from a client device. In some embodiments, the images may include additional metadata, such as GPS location.

At step 404, the server performs image processing on the one or more images to detect external damage of the vehicle. In one embodiment, as described in greater detail in FIG. 5, performing image processing on the one or more images includes: image cleaning to remove artifacts such as background and specular reflection, image alignment to an undamaged version of the vehicle, image segmentation into vehicle parts, and damage assessment, including edge distribution, texture comparison, and spatial correlation detection. Another embodiment for performing image processing on the one or more images to detect external damage of the vehicle is described in FIG. 27.

In some embodiments, if the camera's position and orientation are known for a given image, this information can help with the image alignment step by providing a rough estimation of the two-dimensional projection required to produce the reference image. In some embodiments, if an outline of the vehicle or the part whose image is intended to be taken is placed within the camera view for the image taker to align the image to, then the accuracy and efficiency of the background removal procedure can be substantially improved. In some embodiments, if the state of the vehicle just prior to and during the accident can be obtained from a telematics system, then a dynamic model of the vehicle movement can be constructed, the forces each part of the vehicle is subject during any impact estimated, and therefore, the amount of its distortion including displacement in depth assessed.

At step 406, the server infers internal damage to the vehicle from detected external damage. Once the externally damaged parts are identified, the server can look up in a database which internal parts are also likely to be replaced based on the set of damaged external parts. This inference can be based on historical models for which internal parts needed to be replaced given certain external damage in prior repairs.

At step 408, the server calculates an estimated repair cost for the vehicle based on the detected external damage and inferred internal damage. The server accesses one or more databases of parts and labor cost for each external and internal part that is estimated to need repair or replacement. The estimate can be provided to an insurance claim adjuster for review, adjustment, and approval.

Figure 5:
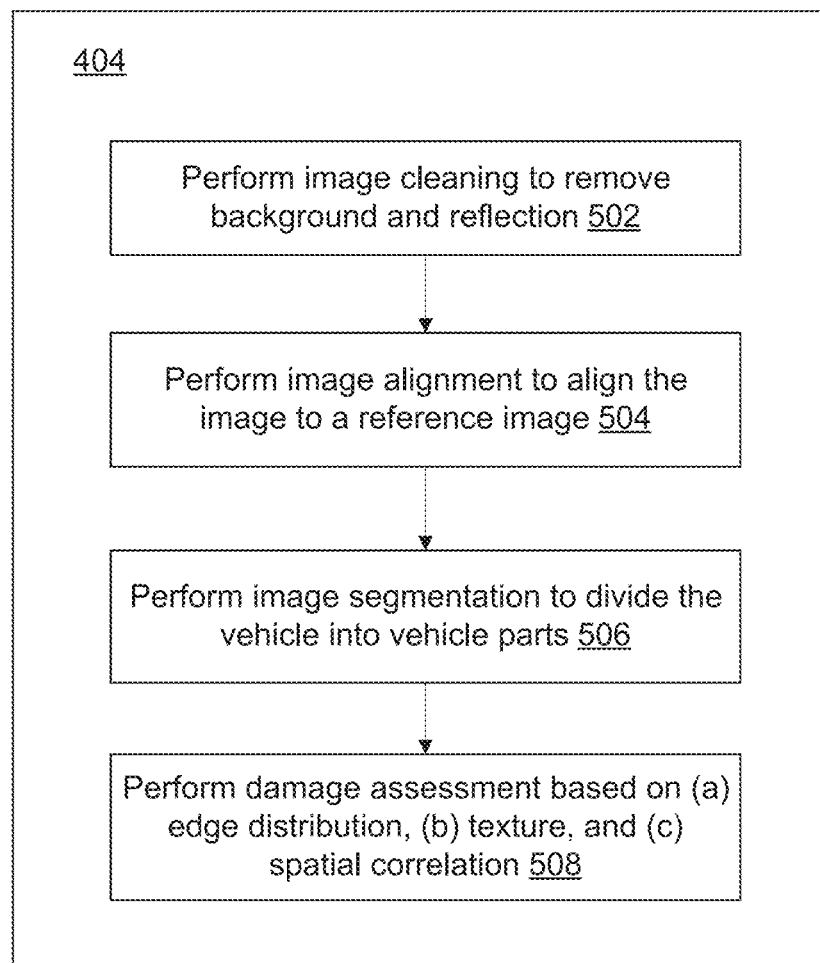
FIG. 5 is a flow diagram of method steps for performing image processing on one or more images to detect external damage of the vehicle, according to one embodiment of the disclosure.

FIG. 5 is a flow diagram of method steps for performing image processing on one or more images to detect external damage of the vehicle, according to one embodiment of the disclosure. In some embodiments, the steps of the method shown in FIG. 5 provided an implementation of step 404 from FIG. 4.

As shown in FIG. 5, the method begins at step 502, where a server pedal' is image cleaning to remove background and specular reflection. As step 504, the server performs image alignment to align the image to a reference image. As step 506, the server performs image segmentation to divide the vehicle into vehicle parts. As step 508, the server performs damage assessment based on (a) edge distribution, (b) texture, and (c) spatial correlation.

Each of the one or more images provided to the server from the client device is processed separately according to the method shown in FIG. 5. A detailed explanation of performing each of steps 502, 504, 506, 508 is provided below.

At step 502 (i.e., image cleaning), each image is cleaned to remove background and specular reflections due to incident light.

In a first embodiment of implementing step 502, background removal can be performed with image segmentation using Conditional Random Fields (CRF) realized as Recurrent Neural Networks (RNN).

In the technique, the image is modeled as a conditional random field. Each pixel in the image is regarded as a node in a mathematical graph. Two nodes are connected by an edge in the graph if their corresponding pixels are neighbors. Each node is assigned a binary label according to whether the corresponding pixel is deemed to belong to the foreground (i.e., the vehicle) or the background. The binary label can be taken to be 1 for the foreground and −1 for the background. Once all of the pixels in the image have been assigned a binary label properly, the pixels labeled as background can be removed achieving segmentation of the background.

In order to find the node binary labels, two functions are used. The value of the function $\psi_u(x_i)$ denotes the "cost" of the node I taking the value $x_i$. The value of the function $\psi_p(x_i, x_j)$ denotes the "cost" of the neighboring nodes I and J taking the value $x_i$ and $x_j$, respectively. Using these functions, the following energy function for an image X can be defined:

$$E(x) = \sum_i \psi_u(x_i) + \sum_{i<j} \psi_p(x_i, x_j),$$

The probability of an image is defined to be $e^{(-E(X))}$ suitably normalized. The task is to learn the parameters of two functions $\psi_u$ and $\psi_p$ from a large database of real images so that their probabilities are maximized, or equivalently, their energies are minimized.

The unary function $\psi_u$ can be learned using a convolutional neural network (CNN). The network is repeatedly shown a succession of training images in which each pixel has been correctly labeled as foreground/background. Starting with random weights, the weights are adjusted using a standard backpropagation algorithm in order to predict the labeling correctly.

The function $\psi_p$ can be modeled as:

$$\psi_p(x_i, x_j) = \mu(x_i, x_j) \sum_{m=1}^{M} w^{(m)} k_G^{(m)}(f_i, f_j),$$

where $k_G$ is a Gaussian kernel, $f_i$ are features derived from the image and $\mu$ is a label-compatibility function. $\psi_p$ can be learned using the following algorithm, in the which the steps can be implemented as a CNN:

$Q_i(l) \leftarrow \frac{1}{Z_i} \exp(U_i(l))$ for all i ▷ Initialization while not converged do $\tilde{Q}_i^{(m)}(l) \leftarrow \sum_{j \neq i} k^{(m)}(f_i, f_j) Q_j(l)$ for all m ▷ Message Passing $\check{Q}_i(l) \leftarrow \sum_m w^{(m)} \tilde{Q}_i^{(m)}(l)$ ▷ Weighting Filter Outputs $\hat{Q}_i(l) \leftarrow \sum_{l' \in \mathcal{L}} \mu(l, l') \check{Q}_i(l')$ ▷ Compatibility Transform $\check{Q}_i(l) \leftarrow U_i(l) - \hat{Q}_i(l)$ ▷ Adding Unary Potentials $Q_i \leftarrow \frac{1}{Z_i} \exp(\check{Q}_i(l))$ ▷ Normalizing end while In a second embodiment of implementing step 502, for background removal, an "active contour" technique can be used to produce a curve called a contour that lies as close to the boundary of the vehicle in the image as possible. The contour serves to separate the vehicle from its background. Anything outside the curve is then removed (e.g., by converting that part of image to black or white, depending on the color of the vehicle).

In one embodiment, the active contour technique starts with a user-supplied initial contour (i.e., closed curve) containing the vehicle within the photo and defining an energy function of the contour that takes its minimum value when the contrast in color and intensity across the contour is maximum, which is assumed to be the indicator of the vehicle boundary. For example, the user-supplied initial contour can be provided by an insurance adjuster utilizing a computing device in communication with the server.

The initial contour is evolved along the gradient of the energy function until the gradient becomes zero, i.e., when the energy function has achieved an extremal value. An energy function E is defined so that its minimum should correspond to a good segmentation of the image into foreground and background:

$E(\underline{\alpha}, k, \underline{\theta}, z) = U(\underline{\alpha}, k, \underline{\theta}, z) + V(\underline{\alpha}, z).$ where the U( ) evaluates the color distribution and V( ) evaluates the edge or gradient distribution, $z = (z_1, \ldots, z_n, \ldots, z_N)$ is the image thought of as an RGB-valued array, and $\alpha \in \{0, 1\}$ is the binary segmentation map, with 0 for background and 1 for foreground. For each assignment of values of a to the pixels the corresponding energy can be computed.

In one embodiment, the color term U is a Gaussian Mixture Model (GMM) defined as follows:

$$U(\underline{\alpha}, k, \underline{\theta}, z) = \sum_n D(\alpha_n, k_n, \underline{\theta}, z_n),$$

$$D(\alpha_n, k_n, \underline{\theta}, z_n) = -\log p(z_n | \alpha_n, k_n, \underline{\theta}) - \log \pi(\alpha_n, k_n)$$

where p( ) is a Gaussian probability distribution and π( ) is the mixture weighting coefficient, so that:

$$D(\alpha_n, k_n, \underline{\theta}, z_n) = -\log \pi(\alpha_n, k_n) + \frac{1}{2} \log \det \Sigma(\alpha_n, k_n) +$$
$$\frac{1}{2}[z_n - \mu(\alpha_n, k_n)]^\top \Sigma(\alpha_n, k_n)^{-1} [z_n - \mu(\alpha_n, k_n)].$$

Therefore, the color modeling parameters are:

$\underline{\theta} = \{\pi(\alpha, k), \mu(\alpha, k), \Sigma(\alpha, k), \alpha = 0, 1, k = 1 \ldots K\}$ In one embodiment, the edge term V is defined as:

$$V(\underline{\alpha}, z) = \gamma \sum_{(m,n) \in C} [\alpha_n \neq \alpha_m] \exp - \beta \|z_m - z_n\|^2$$

where [ ] denotes the indicator function taking values 0 or 1, C is the set of pairs of neighboring pixels, and other two scalars are input parameters (determined by experiments).

In one embodiment, a user, such as a claims adjuster, initializes the process by supplying an initial background for the image. For example, initialize a=0 for pixels in background and a=1 for pixels in foreground. An iterative process is then performed as follows:

Iterative Minimisation

1. Assign GMM components to pixels:

$$k_n := \arg\min_{k_n} D_n(\alpha_n, k_n, \underline{\theta}, z_n).$$

2. Learn GMM parameters from data z:

$$\underline{\theta} := \arg\min_{\underline{\theta}} U(\underline{\alpha}, k, \underline{\theta}, z)$$

3. Estimate segmentation: use min cut to solve:

$$\min_{\{\alpha_n: n \in T_U\}} \min_k E(\underline{\alpha}, k, \underline{\theta}, z).$$

4. Repeat from step 1, until convergence.

However, the choice of the initial contour is critical, and the active contour technique itself does not specify how to choose an appropriate initial contour. Since the location of the vehicle within the image is not known, one might put the initial contour at or close to the boundary of the photo in order to ensure that the vehicle is always contained within it. However, this often results in other objects being included in the final result of the background removal process.

Some embodiments of the disclosure improve upon existing techniques by using a Deformable Part Model (DPM) to obtain the initial contour. DPM is a machine learning model usually used to recognize objects made of moveable parts. At a high level, DPM can be characterized by strong low-level features based on histograms of oriented gradient (HOG) that is globally invariant to illumination and locally invariant to translation and rotation, efficient matching algorithms for deformable part-based models, and discriminative learning with latent variables. After training on a large database of vehicles in various orientations, the DPM learns to put a bounding box around the vehicle in the photo. This bounding box can then serve as the initial contour.

Even with a much better choice of initial contour, the background removal process is not always perfect due to the presence of damage and specular reflections. For example, sometimes only part of the vehicle is retained. To solve this problem, embodiments of the disclosure provide a solution by first segmenting the image into "super-pixels." A super-pixel algorithm group pixels into perceptually meaningful atomic regions. Therefore, if parts of the atomic region are missing, embodiments of the disclosure can recover them by checking atomic region integrity. In one implementation, k-means clustering can be used to generate super-pixels. The similarity measurement for pixels is determined by the Euclidean distance in LAB space (i.e., a type of color space).

In view of the above, embodiments of the disclosure provide novel image processing techniques to achieve excellent performance on background removal.

Figure 8:
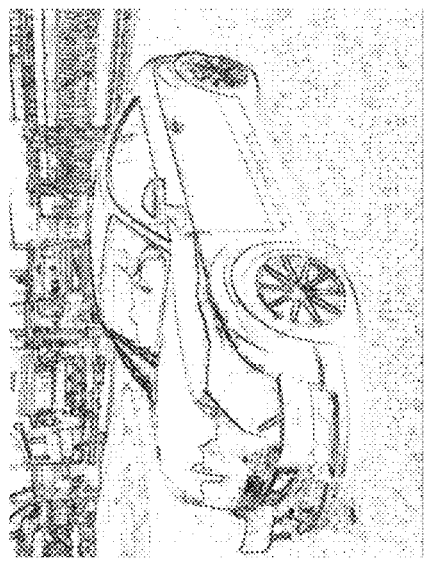
FIG. 8 is an example of an edge distribution of the input image from FIG. 6, according to one embodiment of the disclosure.
Figure 7:
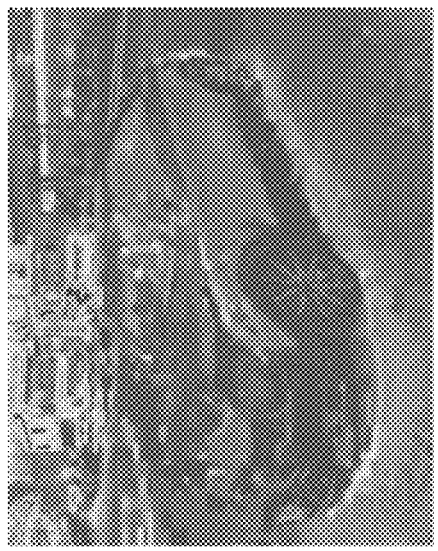
FIG. 7 is an example of a color distribution of the input image from FIG. 6, according to one embodiment of the disclosure.
Figure 6:
FIG. 6 is an example of an input image of a damaged vehicle, according to one embodiment of the disclosure.

FIG. 6 is an example of an input image of a damaged vehicle, according to one embodiment of the disclosure. FIG. 7 is an example of a color distribution of the input image from FIG. 6, according to one embodiment of the disclosure. FIG. 8 is an example of an edge distribution of the input image from FIG. 6, according to one embodiment of the disclosure.

In some embodiments, specular reflection removal is also used to remove specular reflections on the metallic surfaces of the vehicle. Reflection removal is performed by a combination of two techniques. In a first technique, embodiments of the disclosure apply a high-pass spatial filter to the image. Applying a high-pass filter assumes that specular reflections are low spatial frequency additive components of the image intensity. The frequency threshold of the filter can be determined empirically.

In a second technique, embodiments of the disclosure apply a method that examines each pixel of the image. Pixels whose intensity values have reached a maximum in either of the three color channels (i.e., red (R), green (G), and blue (B)) are assumed to be "saturated" due to strong incident light, and are re-assigned color values of nearby pixels that are of the same color, but unsaturated. This technique of finding the appropriate nearest unsaturated pixel is novel relative to conventional approaches. Among the nearest such pixels, embodiments of the disclosure choose the ones that lie on the same part of the vehicle as the saturated pixel in question, which ensures that they have the same true color, and use the mean ratios between the R, G and B values of the unsaturated pixels to correct the RGB values of the saturated pixel because despite considerable lighting variations, the ratios are supposed to remain invariant.

Figure 9C:
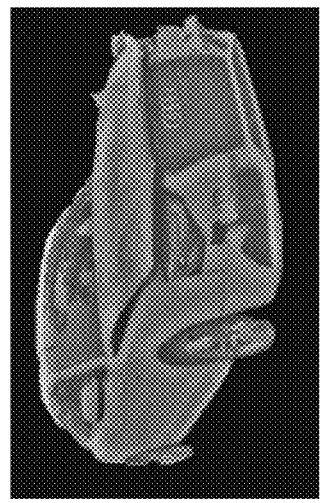
FIGS. 9A-9C illustrate a specular reflection removal process, according to one embodiment of the disclosure.
Figure 9B:
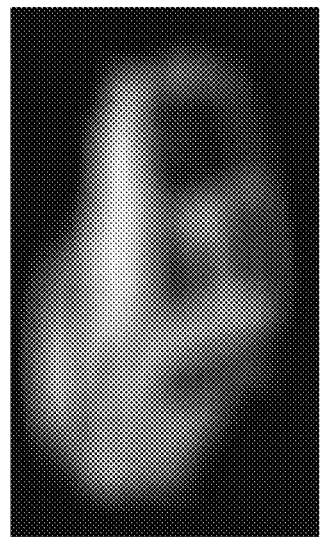
Figure 9A:
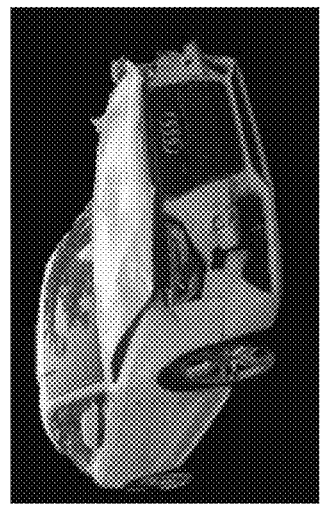

FIGS. 9A-9C illustrate a specular reflection removal process, according to one embodiment of the disclosure. FIG. 9A illustrates an input image of a damaged vehicle with the background removed. FIG. 9B illustrates the low frequency components of a damaged vehicle in FIG. 9A. FIG. 9C illustrates a reflection-removed version of the vehicle in FIG. 9A, with low frequency components removed and color corrected to remove saturated pixels.

Referring back to FIG. 5, at step 504 (i.e., image alignment), a reference image is found for the same vehicle type that is taken from the same camera position and orientation as the damaged vehicle image. Once the input image is aligned to a reference image, the server is able to overlay the two images on top of each other so that the vehicle boundaries within them more or less coincide. This is called image alignment.

In one embodiment, the server starts with a three-dimensional model of the vehicle and finds a two-dimensional projection of the three-dimensional model that best matches the cleaned image of the damaged vehicle. The match is determined in two stages.

In a first stage, "mutual information" between the input image and a template is determined. Mutual information is a statistical measure of similarity of the spatial distributions of the normalized intensities in the two images. In order to find the best match, a sequence of "similarity transformations" are applied to the three-dimensional model and mutual information of the resulting two-dimensional projections is computed until the ones with the maximum mutual information is obtained. The top few templates with the highest mutual information with the damaged image are kept. The top one turns out to not necessarily be the correct template because of the inability of mutual information to sometimes distinguish between front/back and left/right sides of the vehicle.

In a second stage, another statistical measure "cross-correlation" is used to choose among the top few selected templates. Cross-correlation measures different similarity properties of the two images, and therefore, is able to break the tie among the front/back or left/right sides to come up with the correct template.

According to some embodiments, three-dimensional models of various vehicles can be purchased from commercial providers of three-dimensional renderings of objects, including the vehicle manufacturers themselves. Alternatively, the three-dimensional models can be constructed from a collection of two-dimensional images of the vehicle taken prior to occurrence of damage. In one implementation of constructing the three-dimensional model from two dimensional images, first a number of feature points of a certain type, e.g., scale-invariant feature transform (SIFT) are computed in each two-dimensional image. Next, correspondences between similar feature points across images are established. These correspondences determine the mutual geometrical relationships of the two-dimensional images in three-dimensional space using mathematical formulas. These relationships allow us to "stitch" the two-dimensional images together into a three-dimensional model of the vehicle.

At step 506 (i.e., image segmentation), the cleaned image of the damaged vehicle is segmented into vehicle parts, i.e., the boundaries of the vehicle parts are determined and drawn. Segmentation is carried out in order to assess damage on a part-by-part basis, which makes for more robust damage assessment.

First, the reference image is itself segmented. This can be done easily, since commercial three-dimensional models usually come equipped with segmentation into its component parts.

Next, an attempt is made to locate each part present in the reference image within the damaged input image. The initial position of the part is located by simply overlaying the reference image onto the damaged image and projecting the boundary of the part on to the damaged image. This is then shrunk uniformly in order to arrive at an initial contour, which is then evolved along the gradient of an energy function in a manner analogous to the method of background removal until the energy function reaches its minimum, which is regarded as occurring when the contour coincides with the part boundary, where there is a locally large difference in intensity across the contour. In order to prevent one part from "leaking" into another, some embodiments use the part template to define the zone within which the evolving part in the damaged image must be confined to. Some embodiments also apply consistency checks across different parts found to make sure that they do not overlap or are completely absent.

In some embodiments, level set methods can be used to perform image segmentation. In level set methods, a contour of interest is embedded as the zero level set of a level-set function (LSF) $\phi$, where $\phi$ is a function of time t. Initially at t=0, some embodiments choose a seed contour inside the object of interest. For segmentation applications, the energy function is an edge-based geometric active model. The function is defined such that its minimum is reached (therefore, stop evolving) as soon as the zero level set touches the object boundary. In one implementation, the energy function is defined as:

$$\varepsilon_\varepsilon(\phi) = \mu \int_\Omega p(|\nabla \phi|) dx + \lambda \int_\Omega g \delta_\varepsilon(\phi) |\nabla \phi| dx + \alpha \int_\Omega g H_\varepsilon(-\phi) dx.$$

The first term in the energy function $\varepsilon$ above is the regularization term. The regularization function is defined as:

$$p_2(s) = \begin{cases} \frac{1}{(2\pi)^2}(1 - \cos(2\pi s)), & \text{if } s \leq 1 \\ \frac{1}{2}(s-1)^2, & \text{if } s \geq 1 \end{cases}.$$

Let I be an image on a domain $\Omega$, and the edge indicator function g is defined as:

$$g \triangleq \frac{1}{1 + |\nabla G_\sigma * I|^2}$$

where $G_\sigma$ is a Gaussian smoothing kernel. In some embodiments, the Gaussian kernel is replaced with a non-linear filter that is called a bilateral filter. The filter weights depend not only on Euclidean distance of pixels, but also on the radiometric difference, e.g., pixel grayscale intensity. This preserves sharp edges by systematically looping through each pixel and adjusting weights to the adjacent pixels accordingly.

The second term in the energy function $\varepsilon$ above is a line integral of the function g along the zero level set of energy function. The other integral part is defined as:

$$\delta_\varepsilon(x) = \begin{cases} \frac{1}{2\varepsilon}\left[1 + \cos\left(\frac{\pi x}{\varepsilon}\right)\right], & |x| \leq \varepsilon \\ 0, & |x| > \varepsilon \end{cases}$$

The third term in the energy function $\varepsilon$ above is to speed up the evolution. The function is defined as:

$$H_\varepsilon(x) = \begin{cases} \frac{1}{2}\left(1 + \frac{x}{\varepsilon} + \frac{1}{\pi}\sin\left(\frac{\pi x}{\varepsilon}\right)\right), & |x| \leq \varepsilon \\ 1, & x > \varepsilon \\ 0, & x < -\varepsilon \end{cases}.$$

The energy function $\varepsilon$ is minimized by solving the gradient flow:

$$\frac{\partial \phi}{\partial t} = \mu \, div(d_p(|\nabla \phi|)\nabla \phi) + \lambda \delta_\varepsilon(\phi) div\left(g \frac{\nabla \phi}{|\nabla \phi|}\right) + \alpha g \delta_\varepsilon(\phi)$$

At the end of the image segmentation step, each vehicle part present in the image of the damaged vehicle is separately delineated.

At step 508 (i.e., damage assessment), the segmented image of the damaged vehicle and the corresponding reference image are compared for significant differences that are attributable to damage to the vehicle. The reference image can be the image of the same vehicle prior to occurrence of damage or of a commercial 3D model. In order to localize damage, each image is divided into small rectangular regions called "windows" in such a manner that the window boundaries in the two coincide. Within each window the images are compared for edge distribution, texture, and spatial correlation.

For edge distribution, embodiments of the disclosure follow the observation that an undamaged image of a vehicle consists primarily of edges (i.e., straight line segments arising from significant and consistent changes in color and intensity) that are regular in structure and orientation, which are disturbed in the portions where damage has occurred. Embodiments of the disclosure first find edges in the two images using a standard edge finding algorithm, and then compute the distributions of the length and orientations of edges in each window. The distance between the distributions within a window is then computed (using entropy or Kullback-Leibler divergence, for example). If a window exceeds a threshold that is empirically determined, the window may contain damage.

According to one implementation of a method for edge map comparison, the method first computes the edges of each parts using Canny edge detector. Second, the method detects straight lines on the edge maps from all the possible orientations. Then, the method calculates the probability of each orientation having a straight line. Finally, the method checks the entropy difference between template and damage car based on the probability distribution obtained from last step Regarding texture comparison, texture is a way to characterize patterns of intensity changes across an image. In an image of a clean vehicle, each part of the vehicle has a specific texture. When the part is damaged, the part's texture often changes also. Embodiments of the disclosure compute measures of texture such as entropy, derived from locally-oriented intensity gradients for both images in each window and take their difference. If the sum of the magnitudes of differences exceeds an empirically established threshold, the window is regarded as possibly containing damage.

According to one implementation of a method for texture difference detection, first image pairs are transformed to grayscale image. Then, the method computes the co-occurrence matrix for each part. Finally, the method checks the homogeneity difference based on the co-occurrence matrix.

For image correlation, in one the auto-correlation and cross-correlation difference Metric is computed as follows:

$$\text{Metric} = \int_{-\infty}^{\infty} \int_{-\infty}^{\infty} \int_{-\infty}^{\infty} \int_{-\infty}^{\infty} f(x-a, y-b)\{g(x,y) - f(x,y)\} dx dy da db$$

In another embodiment, another way to capture differences between patterns of intensity in the damaged and reference images is via spatial correlation, or equivalently, spatial frequency. Some embodiments, compute the spatial frequency components present in the two images in each window. Just as with edges and texture, if they differ appreciably, the window is regarded as a candidate for containing damage.

Figure 10B:
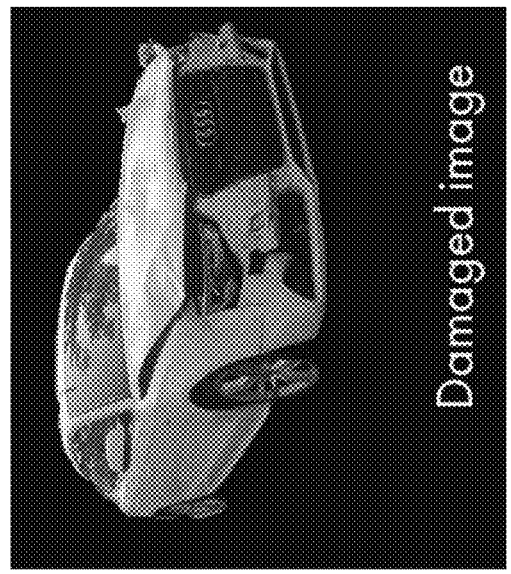
FIG. 10B is an example of an input image of damage to a vehicle, according to one embodiment of the disclosure.
Figure 10A:
FIG. 10A is an example of a reference image of vehicle, according to one embodiment of the disclosure.

FIG. 10A is an example of a reference image of vehicle, according to one embodiment of the disclosure. FIG. 10B is an example of an input image of damage to a vehicle, according to one embodiment of the disclosure.

As described above, the reference image and input image are divided into segments or "windows," that are compared to one another on the basis of edge distribution, texture, and spatial correlation. These measures of difference between the two images are then combined together for the final determination of damage within each window.

In some embodiments, if more than one measure contributes to the existence of damage, the system asserts that damage within the window exists. The exact proportion of weight assigned to each measure can be determined empirically through testing on real images. The weights can also be determined through supervised machine learning on auto claims data.

Figure 11:
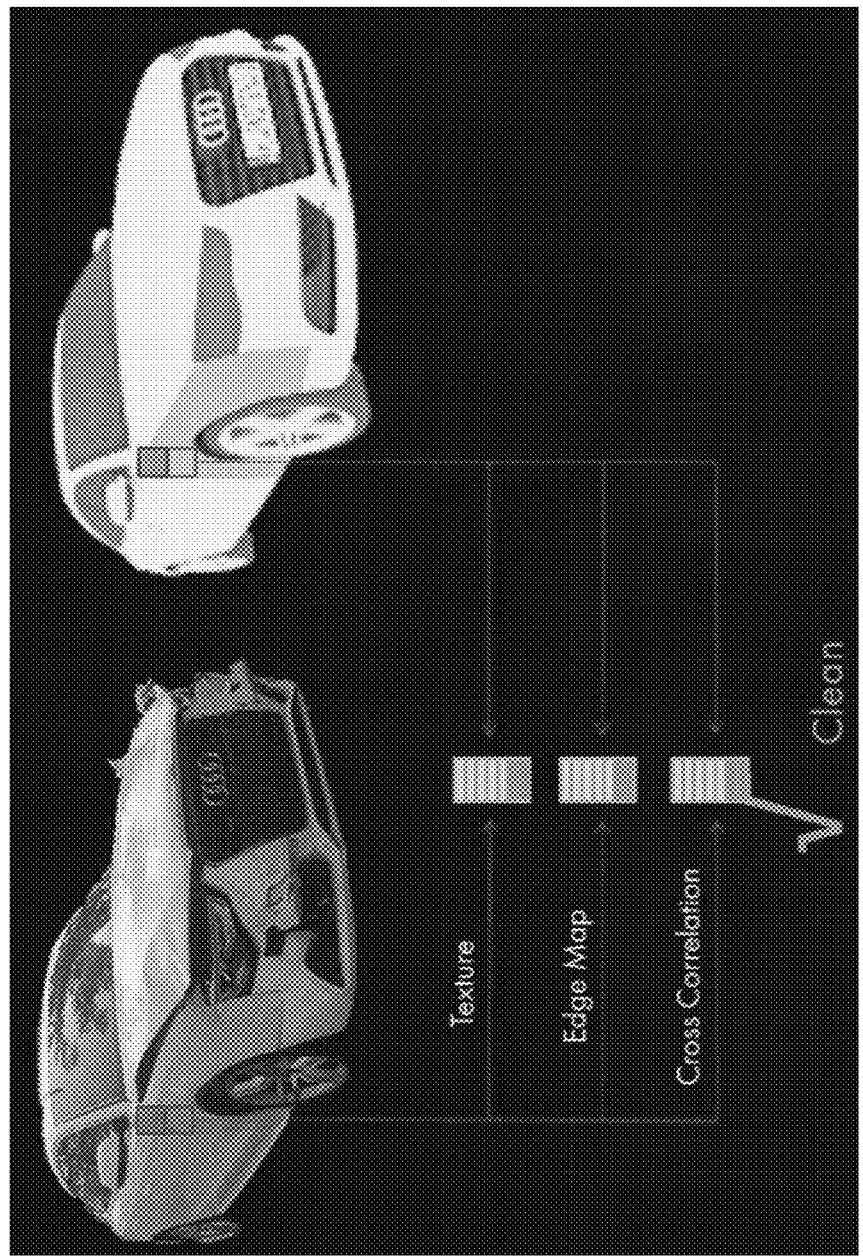
FIG. 11 is a conceptual diagram illustrating comparing a window from a reference image to a corresponding window of an input image where no damage is detected, according to one embodiment of the disclosure.

FIG. 11 is a conceptual diagram illustrating comparing a window from a reference image to a corresponding window of an input image where no damage is detected, according to one embodiment of the disclosure. As shown, for each of edge distribution, texture, and spatial correlation, the difference between the window from the reference image and the window from the input image does not exceed the respective threshold.

Figure 12:
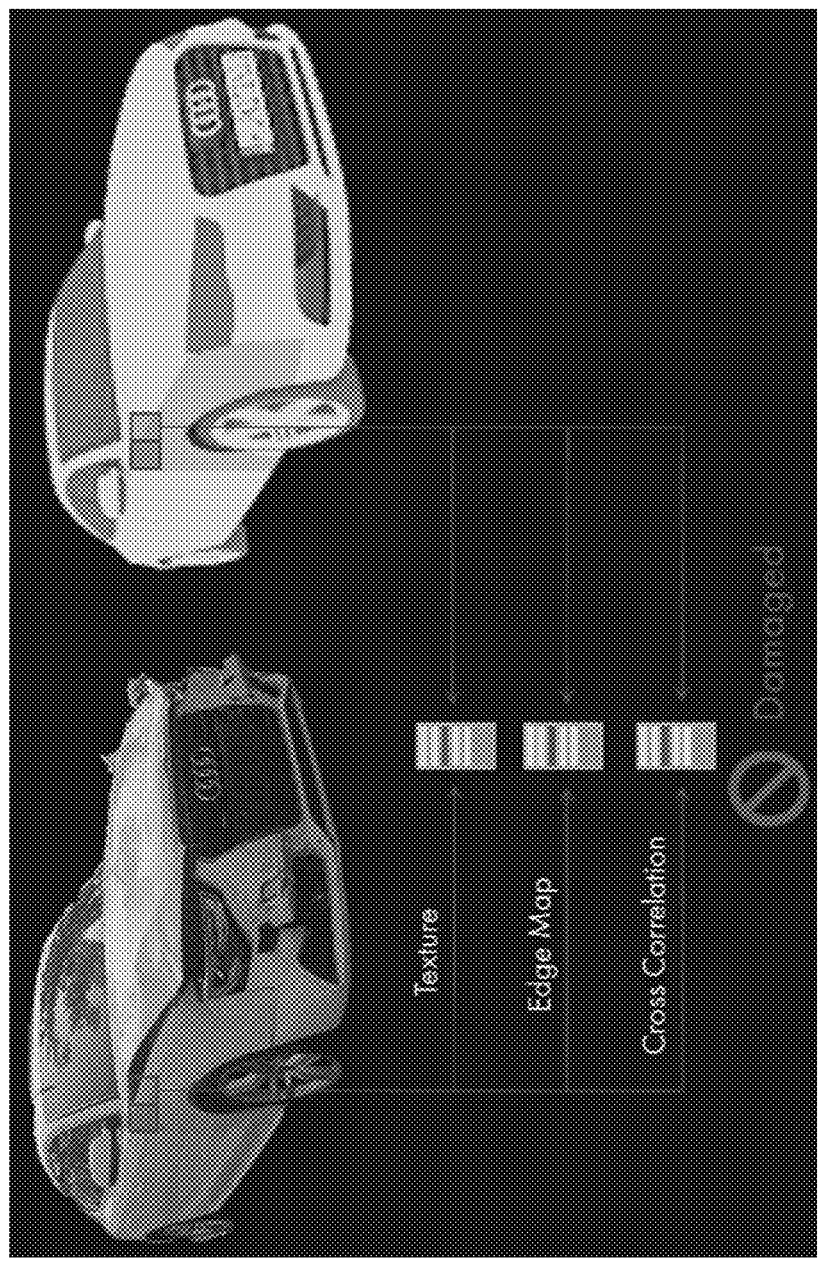
FIG. 12 is a conceptual diagram illustrating comparing a window from a reference image to a corresponding window of an input image where damage is detected, according to one embodiment of the disclosure.

FIG. 12 is a conceptual diagram illustrating comparing a window from a reference image to a corresponding window of an input image where damage is detected, according to one embodiment of the disclosure. As shown, damage is detected since the threshold different from edge distribution, texture, and spatial correlation exceeds the respective threshold. As described, in some embodiments, if one of the metrics exceeds the threshold, then damage is detected. In other embodiments, two or three metrics exceeding the threshold indicate that damage is detected.

Figure 13:
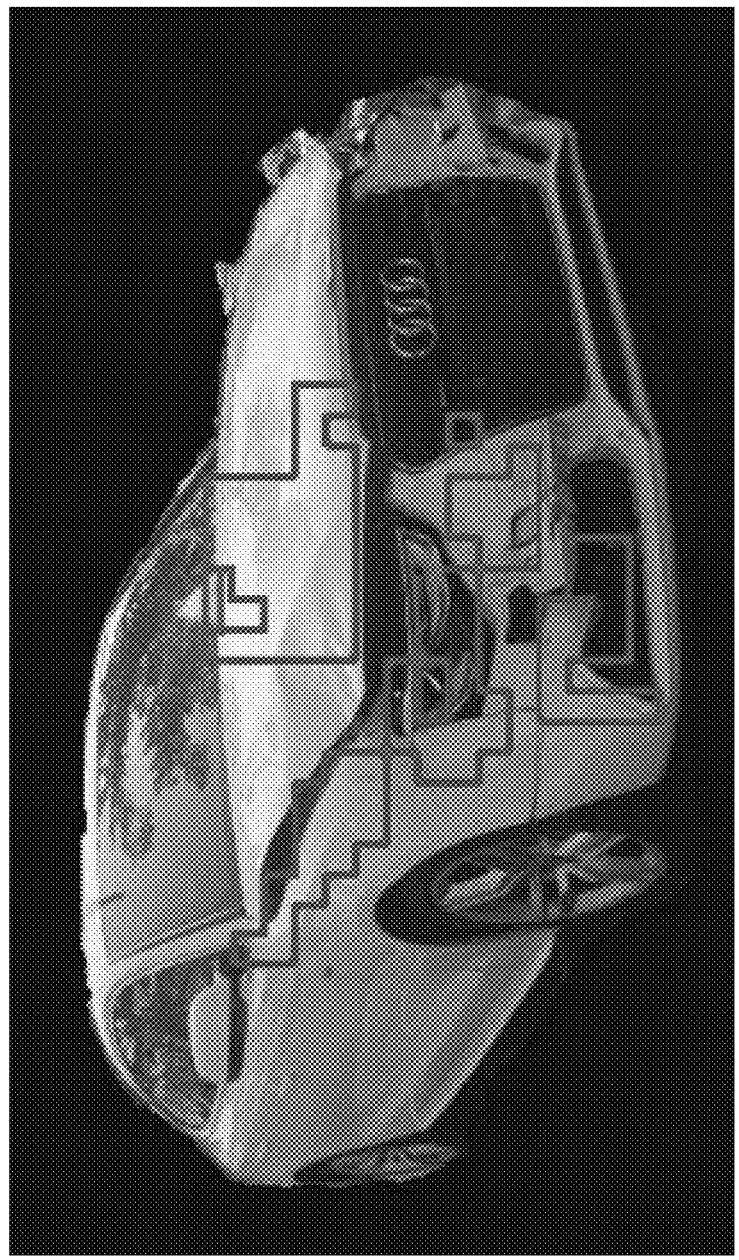
FIG. 13 is a conceptual diagram illustrating the various windows in an input image where damage is detected, according to one embodiment of the disclosure.

FIG. 13 is a conceptual diagram illustrating the various windows in an input image where damage is detected, according to one embodiment of the disclosure. Now that the several indicators of damage within each window have been aggregated, for each vehicle part in the image found during the segmentation step, embodiments of the disclosure compute whether the fraction of "damaged" windows to the total number of windows covering the part exceeds a threshold. If it does, the whole part is declared as damaged. Otherwise, it is not damaged. The "damaged" windows are themselves combined together within their outer boundaries, which can be displayed to show the location of damage within each part, as shown in FIG. 13. The fraction of damaged area can be regarded as an indicator of the severity of damage to the part.

In addition to these "local" measures of damage, some embodiments can also compute the overall shape of each vehicle part in the two images using a shape descriptor, e.g., medial axis, and regard significant difference between the two as further evidence of damage, which can be combined in a weighted manner with the preceding indicators to arrive at the final estimate.

Referring back to FIG. 4, once external damage is detected at step 404, internal damage can be inferred at step 406. Since there is no direct evidence of damage to internal parts from images of the damaged vehicle, embodiments of the disclosure infer damage to internal parts from damage to the external parts. In one implementation, pattern mining large amounts of data of past auto claims can be used to infer damage to the internal parts.

Some embodiments take a large number (e.g., on the order of thousands) of auto claims that contains images of the damaged vehicles and the corresponding appraisals of damaged parts, as found by auto repair shops for repair purposes. Taken together, these historical claims provide enough evidence to establish a high degree of correlation between damage visible in the images and the entire list of damaged parts, both internal and external. In one embodiment, a Convolutional Neural Network (CNN) is trained to learn this correlation. A CNN is a type of mathematical device called a neural network that can be gradually tuned to learn the patterns of correlation between its input and output from being presented a large number of exemplars of input/output pairs called training data. CNNs are configured to take into account the local structure of visual images and invariance properties of objects that are present in them. CNNs have been shown to be highly effective at the task of recognition of objects and their features provided there are enough exemplars of all possible types in the data used to train them. Some embodiments train a CNN to output a complete list of damaged parts when presented with the set of images associated to an auto claim. This includes both internal and external parts. The performance of the CNN can be made more robust when it is presented with the output of the external damage detection system described above. The output of the external damage detection system "primes" the CNN with the information about which external parts are more likely to be damaged, and thereby, increases its accuracy and speed of convergence to the solution.

After both external and internal damaged parts are identified, the system can calculate an estimated repair cost at step 408. To arrive at the estimated cost of parts and labor needed for repairing the vehicle, some embodiments provide the damaged parts list to a database of parts and labor costs. Several such databases exist and are already used by auto repair shops and insurance adjustors on a daily basis once a parts list is identified.

FIGS. 14-21 are screenshots of example interface screens of a vehicle claims application on a client device, according to various embodiments of the disclosure. As described, a vehicle claims application, such as vehicle claims application 218 in FIG. 2, may be used to capture images of a damaged vehicle and upload them to a server for processing.

Figure 16:
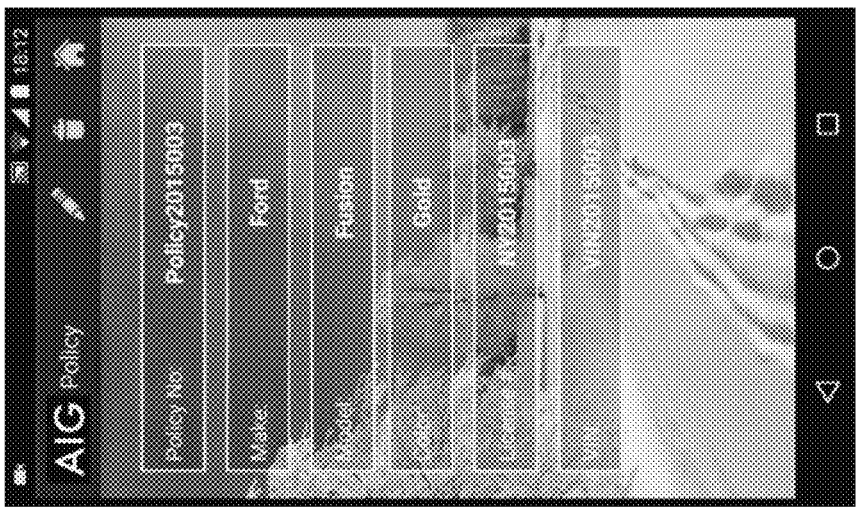
FIGS. 14-21 are screenshots of example interface screens of a vehicle claims application on a client device, according to various embodiments of the disclosure.
Figure 15:
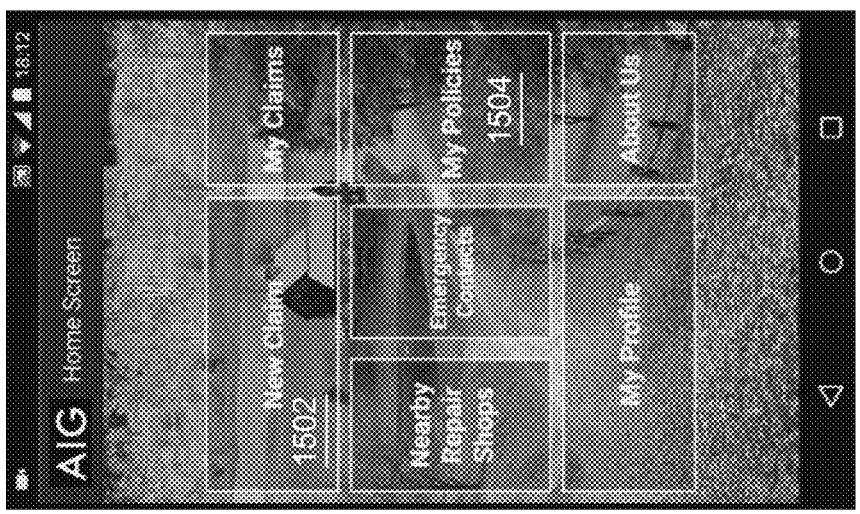
Figure 14:
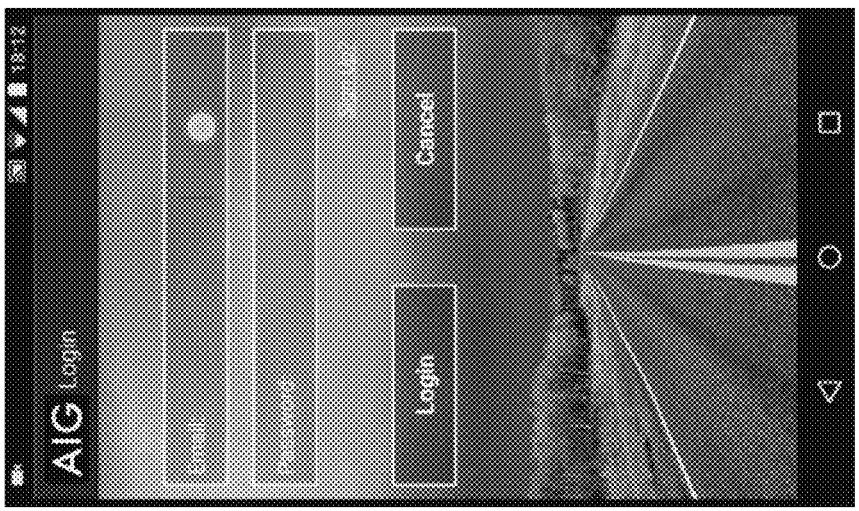

FIG. 14 shows an example log-in screen of vehicle claims application. Once the user is authenticated, a home screen may be displayed, as shown in FIG. 15. Various links can be provided on the home screen to initiate a new claim 1502, review current policies 1504, review prior claims ("My Claims"), find nearby repair shops, view emergency contacts, view the user's profile, and view information about an insurance company ("About Us"). Selecting the current policies 1504 link may display policy information, as shown in FIG. 16.

Figures 17, 18:
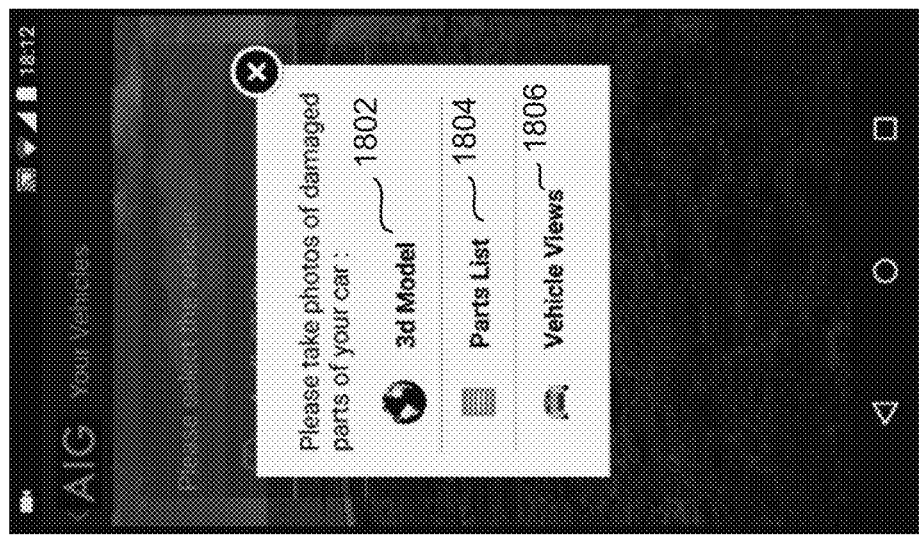

If the user selects the new claim 1502 link, the interface in FIG. 17 may be shown. If there are multiple vehicles insured, the user is asked to select which vehicle to which the new claim relates. Once a vehicle is selected, the interface in FIG. 18 may be displayed, where the user is prompted to take photos of the damaged parts of the vehicle. The vehicle claims application may prompt the user for certain photos using a three-dimensional (3d) model 1802, a parts list 1804, and vehicle views 1806.

Figure 19C:
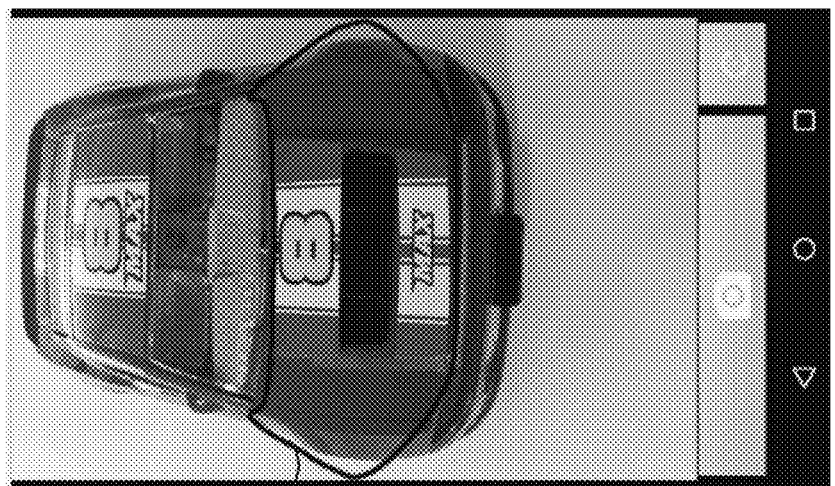
Figure 19B:
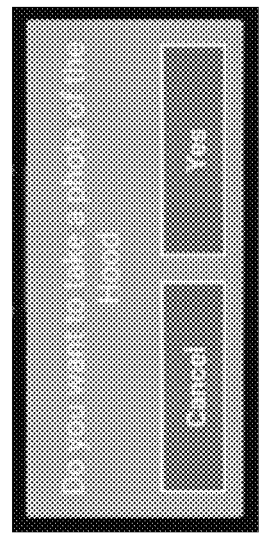
Figure 19A:
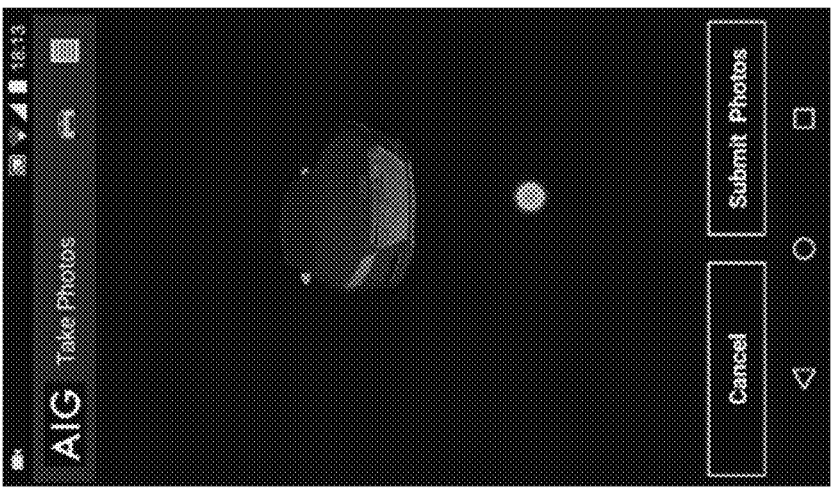

If the user selects to be prompted by a 3d model 1802, the interface in FIG. 19A may be displayed. A 3d model of the user's vehicle is displayed and the user is prompted to tap on the portion of the vehicle that is damaged. For example, the user may tap on the hood of the vehicle, which causes an interface such as the one shown in FIG. 19B to be displayed. If the user selects "Yes" in the prompt in FIG. 19B, the interface in FIG. 19C may be displayed. In FIG. 19C, an outline 1902 is displayed for the hood of the vehicle superimposed on a live camera view from the client device. The user can then position the camera of the client device so that the hood of the car aligns with the outline 1902. Once the hood of the car aligns with the outline 1902, a photo is captured, either automatically by the camera or manually by the user selecting a capture button. The user can be prompted in this manner to capture photos of all damaged parts using a 3d model of the vehicle.

Figure 20B:
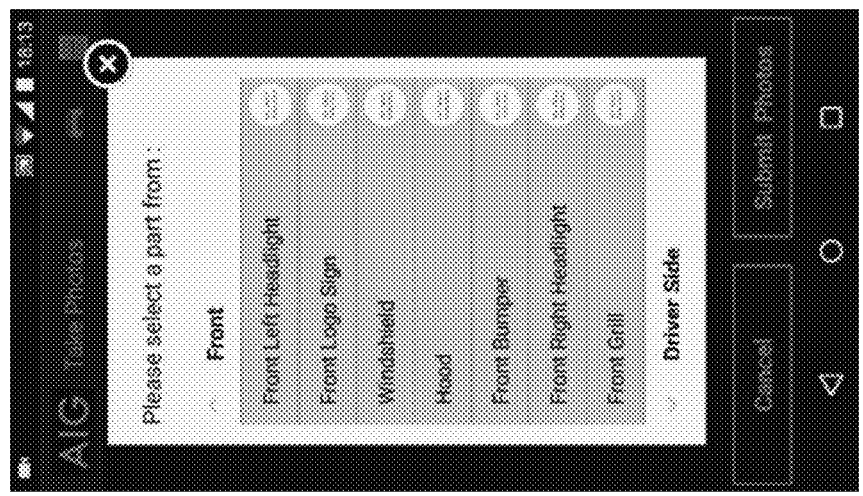
Figure 20A:
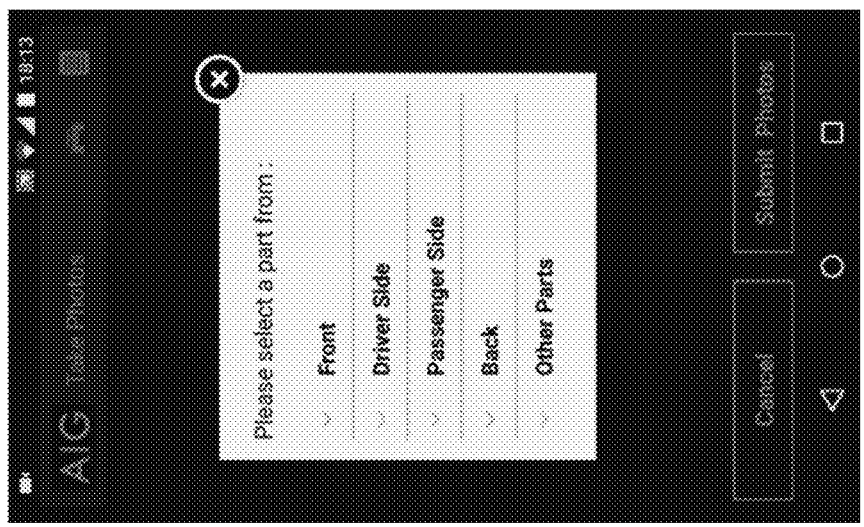

If instead the user selects to be prompted by a parts list 1804, the interface in FIG. 20A may be displayed. The user is first prompted to select general section of the vehicle that sustained damage. Suppose the user select "Front" from the interface shown in FIG. 20A, which causes the interface shown in FIG. 20B to be displayed. The user is then prompted to select a more specific section or part of the vehicle that sustained damage. Once the user makes a selection, an outline for that part is displayed (similar to the outline 1902 in FIG. 19C), and the client device proceeds to capture the requisite photo.

Figure 21:
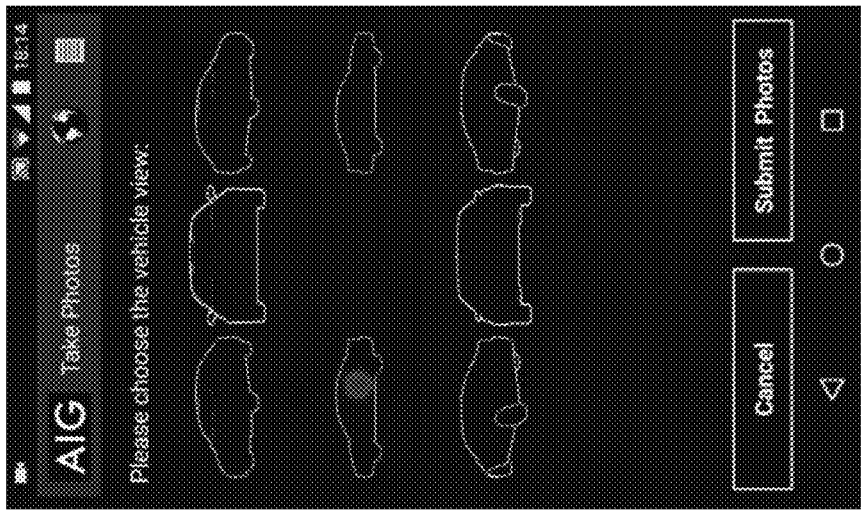

If instead the user selects to be prompted by vehicle views 1806, the interface in FIG. 21 may be displayed. The user is prompted to capture photos of eight views of the vehicle, for example: front-left perspective, front plan, front-right perspective, left plan, right plan, rear-left perspective, rear plan, rear-right perspective. In other implementations, different views may be requested.

Once the user captures the images of the damaged vehicle using the prompts provided by the vehicle claims application, the images are uploaded to a server over a network. The server is then configured to perform image processing operations on the images to identify damaged external parts, infer damaged internal parts, and estimate repair costs, as described above.

Figure 22:
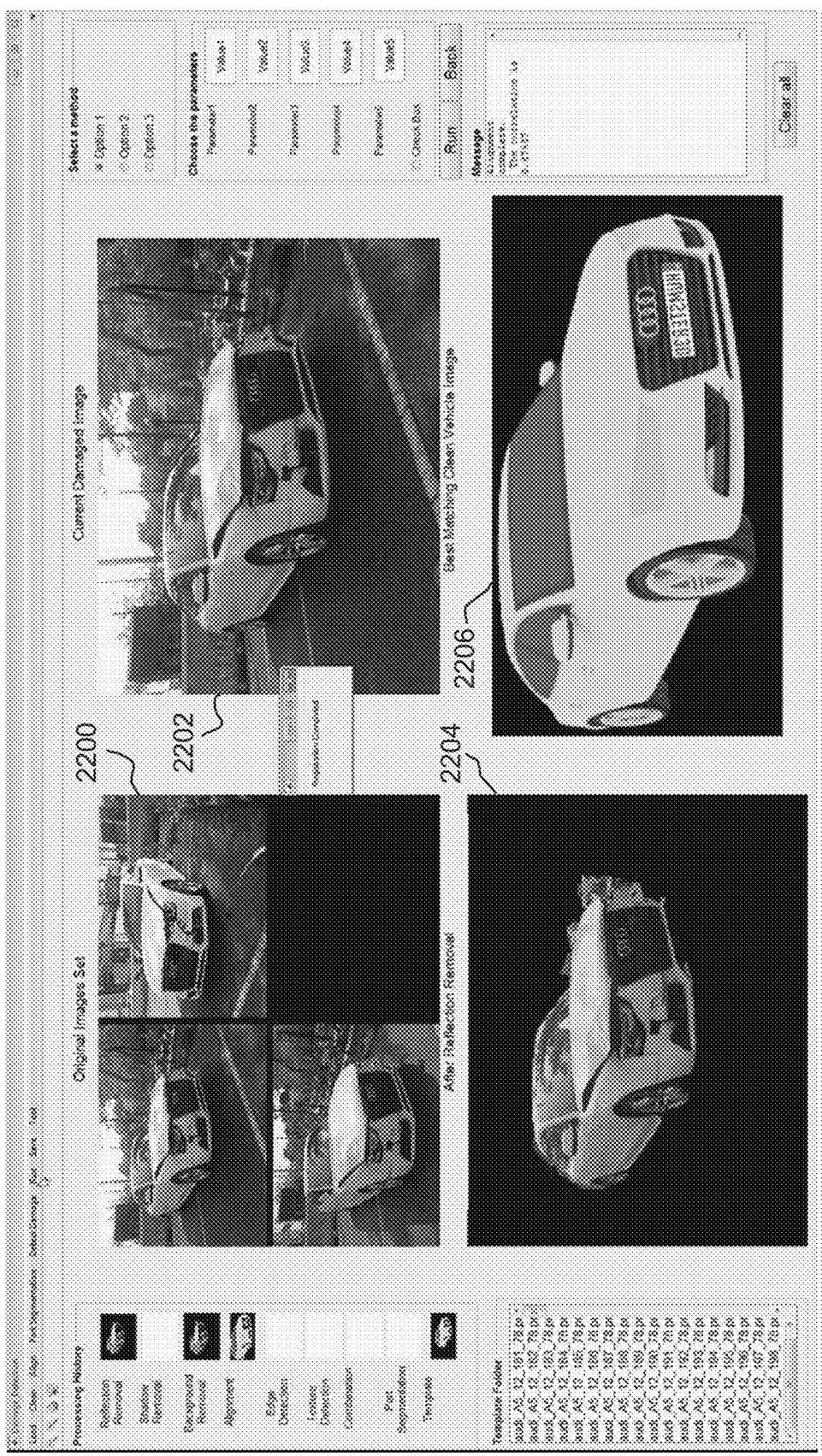
FIG. 22 is a screenshot of an example interface screen of an adjuster computing device connected via a communications interface to a server configured to automatically estimate repair costs, according to one embodiment of the disclosure.

FIG. 22 is a screenshot of an example interface screen of an adjuster computing device connected via a communications interface to a server configured to automatically estimate repair costs, according to one embodiment of the disclosure. In FIG. 22, in portion 2200 of the interface, the original images uploaded to the server are shown. In this example, three images have been received by the server. Each of the three images is processes separately. In portion 2202, the image currently being processed is displayed. In portion 2204, the image after background and specular reflection removal is shown. In portion 2206, the clean reference image is shown aligned with the image shown in portion 2204. Using the techniques described herein, the image shown in portion 2204 is compared to the image shown in portion 2206 to identify the external parts that are damaged, from which internal parts are inferred, and total repair costs are estimated.

In some embodiments, in order to assist the adjustors to make decisions quickly and easily using the output of the disclosed automated system, damaged area in each input image are marked in a contrasting color. Also, a label can be put onto the damaged part. Some embodiments then project the images onto the 3D model of the vehicle using the camera angles determined during the alignment process. The 3D model then shows the damage to the vehicle in an integrated manner. The adjustor can rotate and zoon in on the 3D model as desired. When the adjustor clicks on a damaged part, the interface may show all the original images that contain that part on the side, so that the adjustor can easily examine in the original images where the damage was identified.

Figure 23:
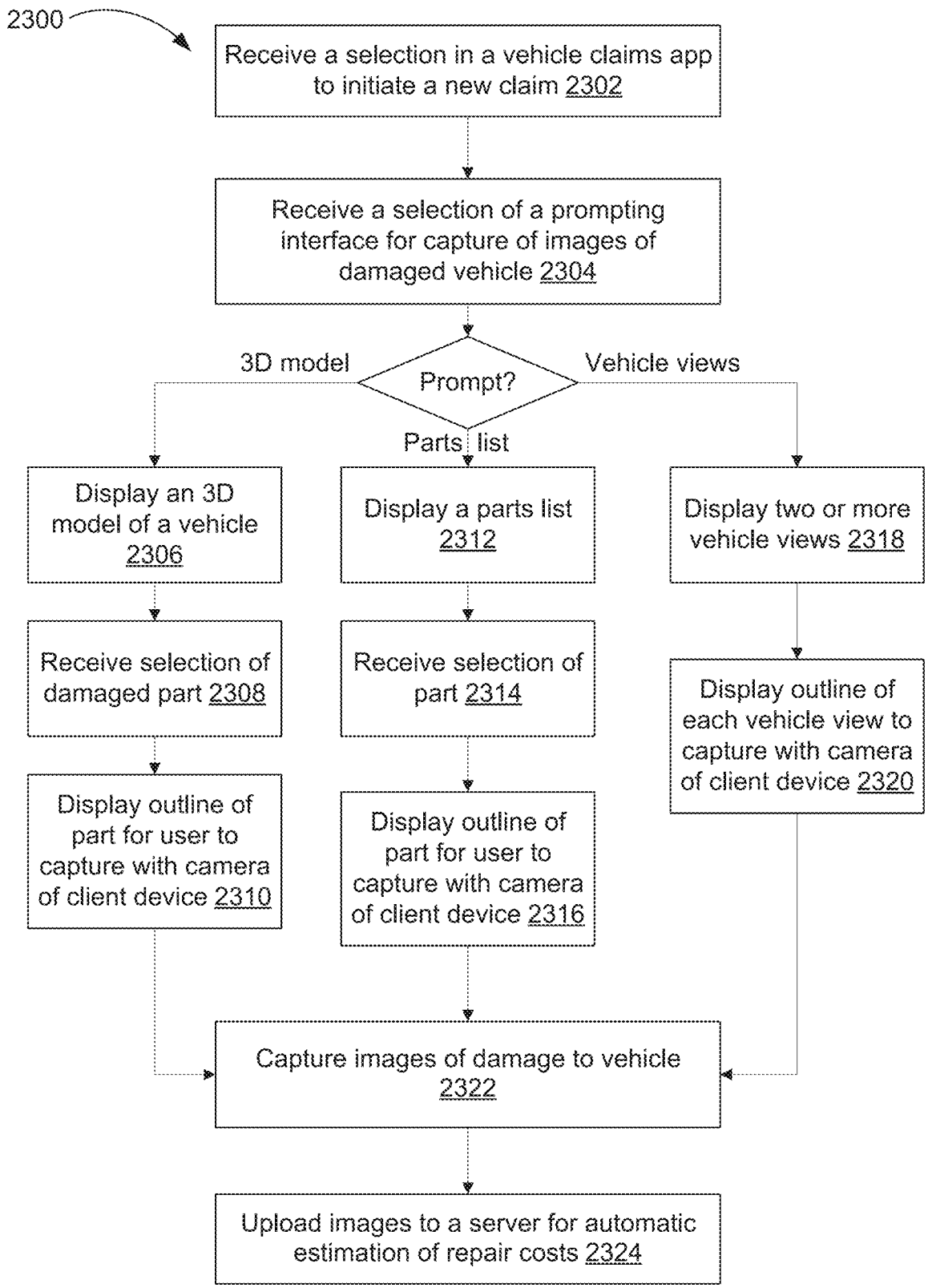
FIG. 23 is a flow diagram of method steps for a vehicle claims application to prompt a client device to capture images of a damaged vehicle, according to one embodiment of the disclosure.

FIG. 23 is a flow diagram of method steps for a vehicle claims application to prompt a client device to capture images of a damaged vehicle, according to one embodiment of the disclosure. At step 2302, the vehicle claims application receives a selection to initiate a new claim. At step 2304, the vehicle claims application At step 2304, the vehicle claims application receives a selection of a prompting interface for capture of images of damaged vehicle.

If the prompting interface is to capture images using a 3D model of the vehicle, at step 2306, the vehicle claims application displays a 3D model of the vehicle. At step 2308, the vehicle claims application receives a selection of a damaged part on the 3D model. At step 2310, the vehicle claims application displays an outline of the selected part for a user to capture with a camera of the client device.

If the prompting interface is to capture images using a parts list of the vehicle, at step 2312, the vehicle claims application displays a parts list. At step 2314, the vehicle claims application receives a selection of part and, at step 2316, displays an outline of the part for the user to capture with the camera of the client device.

If the prompting interface is to capture images using vehicle views, at step 2318, the vehicle claims application displays two or more vehicle views and, at step 2320, displays an outline for each vehicle view to capture with the camera of the client device.

At step 2322, the vehicle claims application capture images of damage to vehicle using the camera of the client device. At step 2324, the vehicle claims application uploads the captured images to a server for automatic estimation of repair costs.

In another implementation of the automatic vehicle damage assessment (AVDA) system, rather than comparing photos of a damaged vehicle to an undamaged version, another embodiment of the disclosure relies upon machine learning methods to learn patterns of vehicle damage from a large number of auto claims in order to predict damage for a new claim. In general, machine learning systems are systems that use "training data" to "learn" to associate their input with a desired output. Learning is done by changing parameters of the system until the system outputs results as close to the desired outputs as possible. Once such a machine system has learned the input-output relationship from the training data, the machine learning system can be used to predict the output upon receiving a new input for which the output may not be known. The larger the training data set and the more representative of the input space, the better the machine learning system performs on the prediction task.

Some embodiments use machine learning to perform the task of prediction of vehicle damage from an auto claim. Thousands of historical auto claims are stored in one or more databases, such as database 110 in FIG. 1, for training and testing of the disclosed system. The database also stored auto claim images and other pieces of information that come with a claim, such as vehicle make, model, color, age, and current market value, for example. The desired output of the disclosed machine learning system is the damage appraisal as prepared by a repair shop consisting of a list of parts that were repaired or replaced and the corresponding costs of repair, both for parts and labor. Another desired output is the determination of the loss type, namely, total loss, medium loss, or small loss, for example.

Figure 24:
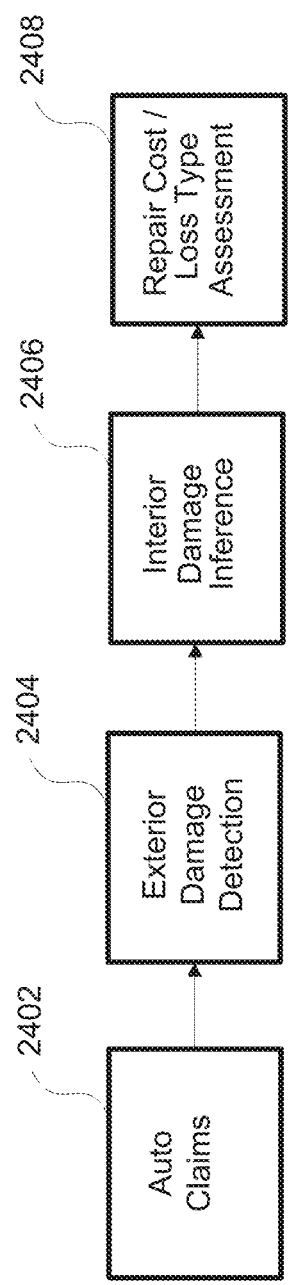
FIG. 24 is a block diagram illustrating a multi-stage design of a machine learning system, according to one embodiment.

FIG. 24 is a block diagram illustrating a multi-stage design of a machine learning system, according to one embodiment. At stage 2402, claims data for thousands of auto claims is input into the machine learning system. The machine learning system is executed by one or more computing devices, such as servers 102 in FIG. 1.

At stage 2404, the machine learning system uses a machine learning method called Convolutional Neural Network (CNN) to detect external damage. A CNN is a type of machine learning method called an artificial neural network. A CNN is specially designed for image inputs based on analogy with the human visual system. A CNN consists of a number of layers of "neurons" or "feature maps," also called convolution layers, followed by a number of layers called fully connected layers. The output of a feature map is called a feature. In the convolution layers, the CNN extracts the essential aspects of an image in a progressively hierarchical fashion (i.e., from simple to complex) by combinatorially combining features from the previous layer in the next layer through a weighted non-linear function. In the fully connected layers, the CNN then associates the most complex features of the image computed by the last convolution layer with any desired output type, e.g., a damaged parts list, by outputting a non-linear weighted function of the features. The various weights are adjusted during training, by comparing the actual output of the network with the desired output and using a measure of their difference ("loss function") to calculate the amount of change in weights using the well-known backpropagation algorithm. Additional implementation details of the CNNs of the disclosed machine learning system are described in detail below.

At stage 2406, the machine learning system predicts damage to the interior parts of the vehicle from the exterior damage assessment output by stage 2404. Some embodiments employ a Markov Random Field (MRF). An MRF defines a joint probability distribution over a number of random variables whose mutual dependence structure is captured by an undirected (mathematical) graph. The graph includes one node for each random variable. If two nodes are connected by an edge, then the corresponding random variables are mutually dependent. The MRF joint distribution can be written as a product of factors, one each of a maximal clique (i.e., a maximal fully connected subgraph) in the graph. Additional implementations details of an MRF of the disclosed machine learning system are described in detail below.

At stage 2408, after the list of both exterior and interior damaged parts has been prepared, the machine learning system prepares a repair cost appraisal for the vehicle by looking up the damaged parts and labor cost in a database. The damaged parts list can be compared to a list of previously damaged parts prior to the occurrence of the current damage, and a final list of newly damaged parts is determined through subtraction of previously damaged parts. Some embodiments also take into account the geographical location, age of the vehicle, and other factors.

Additionally, some embodiments can classify a claim into categories as a total, medium, or small loss claim by taking the damaged parts list, repair cost estimation, and current age and monetary value of the vehicle as input to a classifier whose output is the loss type which takes the three values— total, medium and small. Any machine learning technique can be used for the classifier, e.g., logistic regression, decision tree, artificial neural network, support vector machines (SVM), and bagging. First, the system is trained on historical claims for which the outcome is known. Once the system parameters have been to achieve a desired degree of accuracy on a test set, the system can be used to perform the loss classification.

CNN Implementation

As described, a CNN is a type of machine learning method called an artificial neural network. A CNN consists of a number of layers of "neurons" or "feature maps," also called convolution layers, followed by a number of layers called fully connected layers. The output of a feature map is called a feature. In the convolution layers, the CNN extracts the essential aspects of an image in a progressively hierarchical fashion (i.e., from simple to complex) by combinatorially combining features from the previous layer in the next layer through a weighted non-linear function. In the fully connected layers, the CNN then associates the most complex features of the image computed by the last convolution layer with any desired output type, e.g., a damaged parts list, by outputting a non-linear weighted function of the features. The various weights are adjusted during training, by comparing the actual output of the network with the desired output and using a measure of their difference ("loss function") to calculate the amount of change in weights using the well-known backpropagation algorithm.

A "loss function" quantifies how far a current output of the CNN is from the desired output. The CNNs in some of the disclosed embodiments perform classification tasks. In other words, the desired output is one of several classes (e.g., damaged vs. non-damaged for a vehicle part). The output of the network is interpreted as a probability distribution over the classes. In implementation, the CNN can use a categorical cross-entropy function to measure the loss using the following equation:

$$H(p,q) = -\Sigma_x p(x) \log(q(x))$$

where p is a true distribution over classes for a given input x, and q is the output from the CNN for input x. The loss will be small if p and q are close to each other.

In a first example, if we do positive and negative classification, and q=[0.1 0.9] and p=[0 1], then $H_1$=0.1. In a second example, if we do positive and negative classification, and q=[0.9 0.1] and p=[0 1], then $H_2$=2.3.

As described, a CNN is made up of layers. Each layer includes many "nodes" or "neurons" or "feature maps." Each neuron has a simple task: it transforms its input to its output as a non-linear function, usually a sigmoid or a rectified linear unit, of weighted linear combination of its input. Some embodiments of the disclosure use a rectified linear unit. A CNN has four different types of layers:

1. "Input layer" that holds the raw pixel values of input images.

2. "Convolutional layer" (Conv) that computes its output by taking a small rectangular portion of its input ("window") and applying the non-linear weighted linear combination.
3. "Pooling layer" (Pool) that takes a rectangular portion of its input ("window") and computes either the maximum or average of the input in that window. Embodiments of the disclosure use the maximum operation. This layer reduces the input sizes by combining many input elements into one.
4. "Fully connected layer" (FC), where each neuron in this layer will be connected to all the numbers in the previous volume. The output is a non-linear weighted linear combination of its input.

The parameters of a CNN are:
Number of layers
Number of neurons in each layer
Size of the window in each convolution and pooling layer
Weight vectors for each neuron in each layer
The parameters of the non-linearity used (the slope of the rectified linear unit in our case)

Of these, the weight vectors for each neuron in each layer are the ones adjusted during training. The rest of the weight vectors, once chosen, remain fixed. For example, Table 1 below provides an examples of the number of parameters used in one implementation for detection of damage to the front bumper:

TABLE 1

| CNN parameters | Representation size | Weights |
| --- | --- | --- |
| Input: | [240 × 320 × 3] | 0 |
| Conv1-64 neurons | [240 × 320 × 64] | (5*5*5)*64 = 8000 |
| Pool1 | [120 × 160 × 64] | 0 |
| Conv2-64 neurons | [120 × 160 × 64] | (5*5*64)*64 = 102,400 |
| Pool2 | [60 × 80 × 64] | 0 |
| Conv3-64 neurons | [60 × 80 × 64] | (5*5*64)*64 = 102,400 |
| Pool3 | [30 × 40 × 64] | 0 |
| FC1-256 neurons | [1 × 1 × 256] | 30*40*64*256 = 19,660,800 |
| FC2-256 neurons | [1 × 1 × 256] | 256*256 = 65,536 |
| FC3-2 neurons | [1 × 1 × 2] | 256*10 = 2,560 |

CNN Training

The weight parameters of a CNN can be adjusted during the training phase using a back-propagation algorithm as follows:

```
initialize the network weights with small random values
    do
        for each image x in the training set
            prediction = compute the output of the network, q(x); // forward pass
            actual = desired output of the network, p(x);
            compute loss = H(p, q) = - Σ_x p(x) log(q(x)) for the batch;
            compute Δw_h = derivative of loss with respect to weight w_h for
allweights from hidden layer to output layer; // backward pass
                subtract Δw_h to the current weights to get new weights;
    until loss on the training set drops below a threshold
    return the network as trained
```

Figure 25:
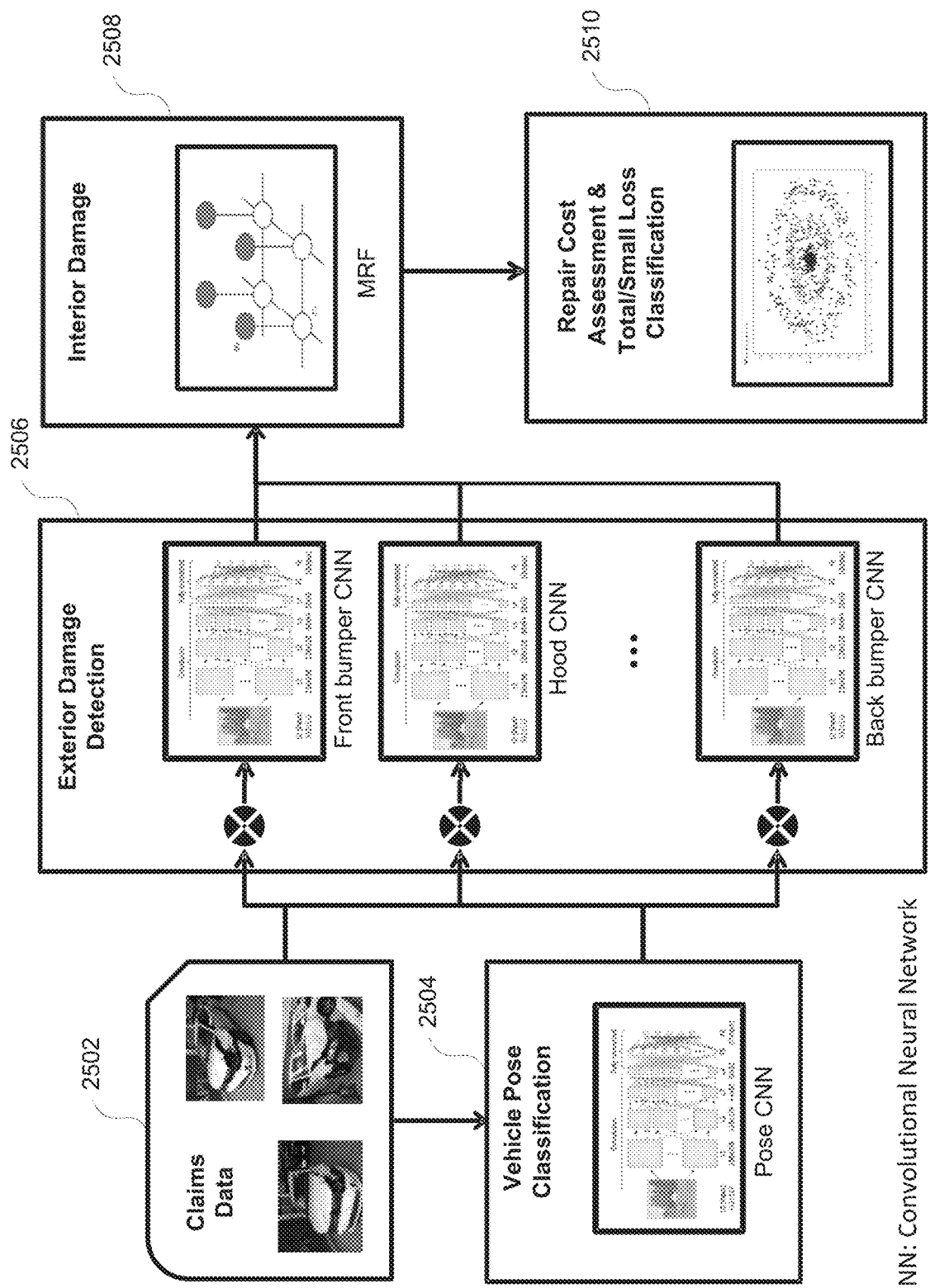
FIG. 25 is a block diagram illustrating implementation of Convolutional Neural Networks (CNNs) to detect vehicle damage, according to one embodiment.

FIG. 25 is a block diagram illustrating implementation of Convolutional Neural Networks (CNNs) to detect vehicle damage, according to one embodiment. In one implementation of the system, labeled images are input to a CNN and the damaged parts list as the desired output. In another implementation, the input-output association problem is broken down into several sub-problems, each of which is easier for a machine learning system than the full problem, as shown in FIG. 15.

Claims data 2502 for thousands or millions of auto claims is input into the exterior damage detection engine 2506. For a given claim for which vehicle damage is to be detected, the claims data is also passed to a vehicle pose classification engine 2504.

The vehicle pose classification engine 2504 uses a CNN to first predict the pose of the vehicle. The output of this CNN is one of eight (8) pose categories. For vehicles, the 8 categories may correspond to the eight (8) non-overlapping 45-degree sectors around the vehicle, i.e., front, left front corner, left side, back front corner, back, back right corner, right side, and right front sector. The CNN of the vehicle pose classification engine 2504 can be trained on a large number of auto claim images that have manually been labeled with the appropriate pose category.

In the exterior damage detection engine 2506, in one implementation, there is one CNN for each of the exterior vehicle parts, trained to predict damage to that part. In one implementation, a vehicle is divided up into twenty-four (24) exterior parts, and thus, twenty-four (24) vehicle part CNNs, including:
Pr1='Front Bumper';
Pr2='Back Bumper';
Pr3='Front Windshield';
Pr4='Back Windshield';
Pr5='Hood';
Pr6='Car Top';
Pr7='Front Grill';
Pr8='Left Front Fender';
Pr9='Left Front Headlight';
Pr10='Left Side';
Pr11='Left Back Headlight';
Pr12='Left Front Window';
Pr13='Left Back Window';
Pr14='Left Front Door';
Pr15='Left Back Door';
Pr16='Right Front Fender';
Pr17='Right Front Headlight';
Pr18='Right Side';
Pr19='Right Back Headlight';
Pr20='Right Front Window';
Pr21='Right Back Window';
Pr22='Right Front Door';
Pr23='Right Back Door'; and
Pr24='Trunk'.

These CNNs can be trained on the auto claims images 2502, which have been labeled with an indication of damage to each exterior part visible in the images.

After the pose category has been predicted by the vehicle pose classification engine 2504 for a given input image, the image is presented to each of the external part CNNs of the exterior damage detection engine 2506. In one implementation, each CNN of the exterior damage detection engine 2506 corresponds to an external part that is potentially visible from that pose. Thus, a part CNN sees only those images at its input that can have the part present in that post. This reduces the burden on the vehicle part CNNs in the exterior damage detection engine 2506, while increasing their accuracy since they receive only the images relevant to the given vehicle part CNN.

After all the images in a claim have been presented to the exterior damage detection engine 2506, the machine learning system has a prediction for damage to each of the exterior parts that we can infer from the collection of images for the claim.

This information is passed from the exterior damage detection engine 2506 to the interior damage engine 2508. The interior damage engine 2508 predicts damage to the interior parts of the vehicle from the exterior damage assessment output by the exterior damage detection engine 2506. One implementation employs a Markov Random Field (MRF) in the interior damage engine 2508. An MRF defines a joint probability distribution over a number of random variables whose mutual dependence structure is captured by an undirected (mathematical) graph. The graph includes one node for each random variable. If two nodes are connected by an edge, the corresponding random variables are mutually dependent. The MRF joint distribution can be written as a product of factors, one each of a maximal clique (a maximal fully connected subgraph) in the graph.

In one implementation, there is one random variable for damage level of each of the vehicle parts. The nodes corresponding to a pair of parts are connected by an edge if they are neighboring parts, since damage to one is likely to result in damage to the other. A probability distribution is defined on these random variables that specifies the probability for each subset of the parts that that subset is damaged while its complement is not damaged.

From the output of the exterior damage detection engine 2506, we can assign values to the random variables corresponding to the exterior parts. The values of the random variables corresponding to the interior parts can then inferred by choosing values that result in maximum joint probability for the exterior and interior damaged parts. The inference can be carried out using a belief propagation algorithm.

The joint probability distribution over all the random variables $p(y|\theta)$ can first be written as due to the Hammersley-Clifford theorem, as follows:

$$p(y|\theta) = \frac{1}{Z(\theta)} \prod_{c \in C} \psi_c(y_c | \theta_c)$$

Here, c is a maximal clique and $\theta_c$ are some parameters associated with the maxical clique. The potential functions $\psi_c$ are chosen as exponential functions of weighted linear combinations of the parameters $\theta_c$ as:

$$\log \psi_c(y_c) \triangleq \phi_c(y_c)^T \theta_c$$

In one implementation, $\phi c$ is identity. During training, the parameters $\theta_c$ are adjusted as follows: for any given auto claim, values of the variables yc corresponding to the exterior and interior parts are clamped at their true values. The values of the parameters $\theta_c$ are chosen to then maximize the probability $p(y|\theta)$. This is repeated over the entire set of training images until values of $\theta_c$ settle down to more or less fixed values. These final values are taken as the values of the parameters $\theta_c$ for prediction of damage to interior parts.

The MRF is used to predict damage to interior parts as follows: given a new claim the values of yc corresponding to the exterior parts are fixed at the outputs of the corresponding part CNNs. The values of yc corresponding to interior parts are then chosen to maximize the probability $p(y|\theta)$. For any interior parts if yc exceeds a pre-defined threshold, it is regarded as damaged. Otherwise it is regarded as undamaged.

The external an internal damage estimates are then passed to a cost estimation engine 2510. The cost estimation engine 2510 can look up in a database the corresponding cost for repair or replacement of each of the external and internal parts based on make, model, year, and color of the vehicle. Some embodiments also take into account the geographic location of the vehicle, as costs may vary by state or region.

Additionally, some embodiments can classify a claim into categories as a total, medium, or small loss claim by taking the damaged parts list, repair cost estimation, and current age and monetary value of the vehicle as input to a classifier whose output is the loss type which takes the three values—total, medium and small. Any machine learning technique can be used for the classifier, e.g., logistic regression, decision tree, artificial neural network. First, the system is trained on historical claims for which the outcome is known. Once the system parameters have been to achieve a desired degree of accuracy on a test set, the system can be used to perform the loss classification.

Figure 26:
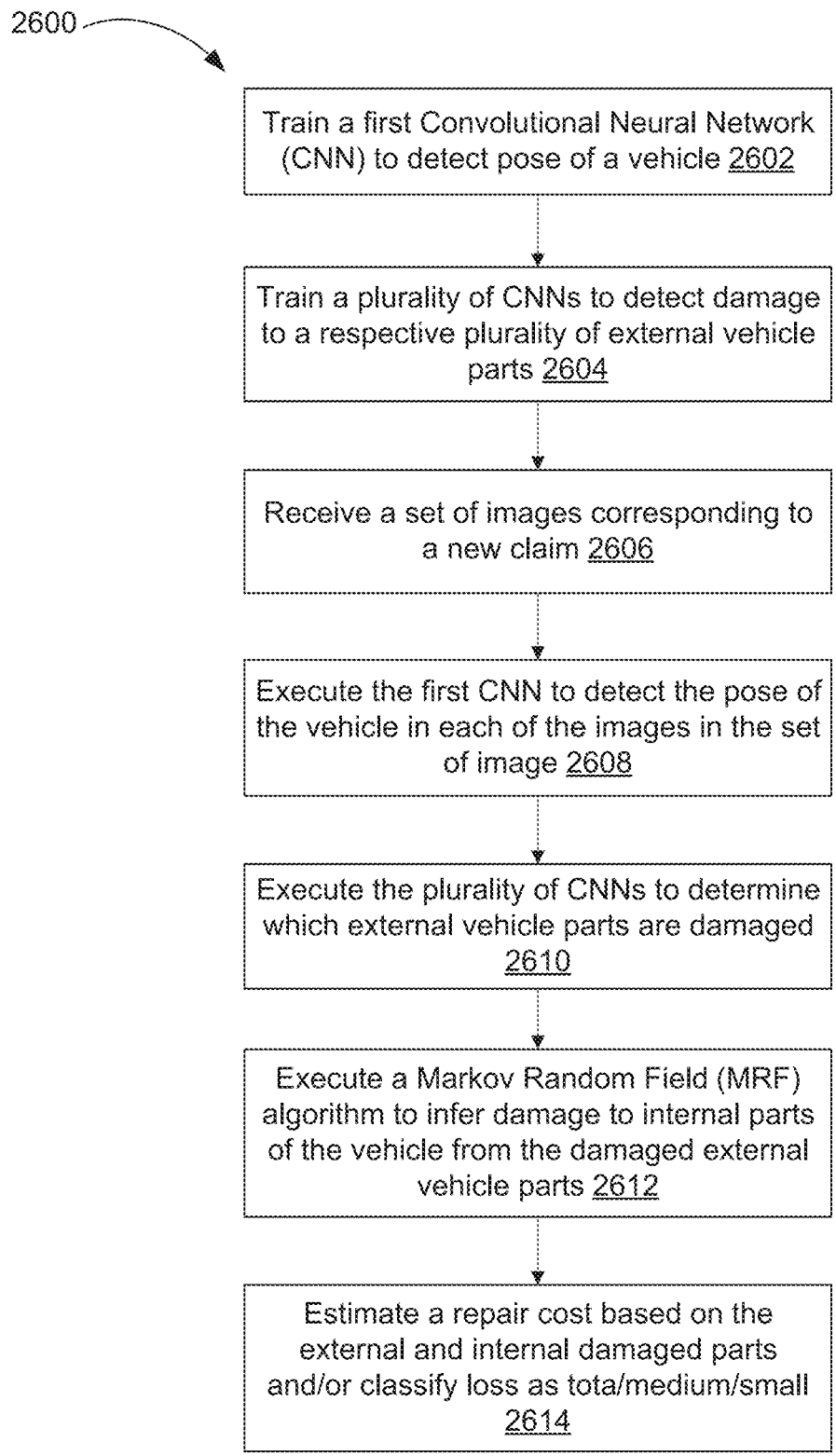
FIG. 26 is a flow diagram of method steps for estimating vehicle damage from images of a damaged vehicle using a machine learning algorithm, according to one embodiment.

FIG. 26 is a flow diagram of method steps for estimating vehicle damage from images of a damaged vehicle using a machine learning algorithm, according to one embodiment. As shown, the method 2600 begins at step 2602, where a server computing device trains a first Convolutional Neural Network (CNN) to detect pose of a vehicle. At step 2604, the server computing device trains a plurality of CNNs to detect damage to a respective plurality of external vehicle parts 2604. At step 2606, the server computing device receives a set of images corresponding to a new claim. At step 2608, the server computing device executes the first CNN to detect the pose of the vehicle in each of the images in the set of image. At step 2610, the server computing device executes the plurality of CNNs to determine which external vehicle parts are damaged. At step 2612, the server computing device executes a Markov Random Field (MRF) algorithm to infer damage to internal parts of the vehicle from the damaged external vehicle parts. At step 2614, the server computing device estimates a repair cost based on the external and internal damaged parts. Additionally, in some embodiments, at step 2614, the server computing device may classify the loss as a total, medium, or small loss, as described above.

Figure 27:
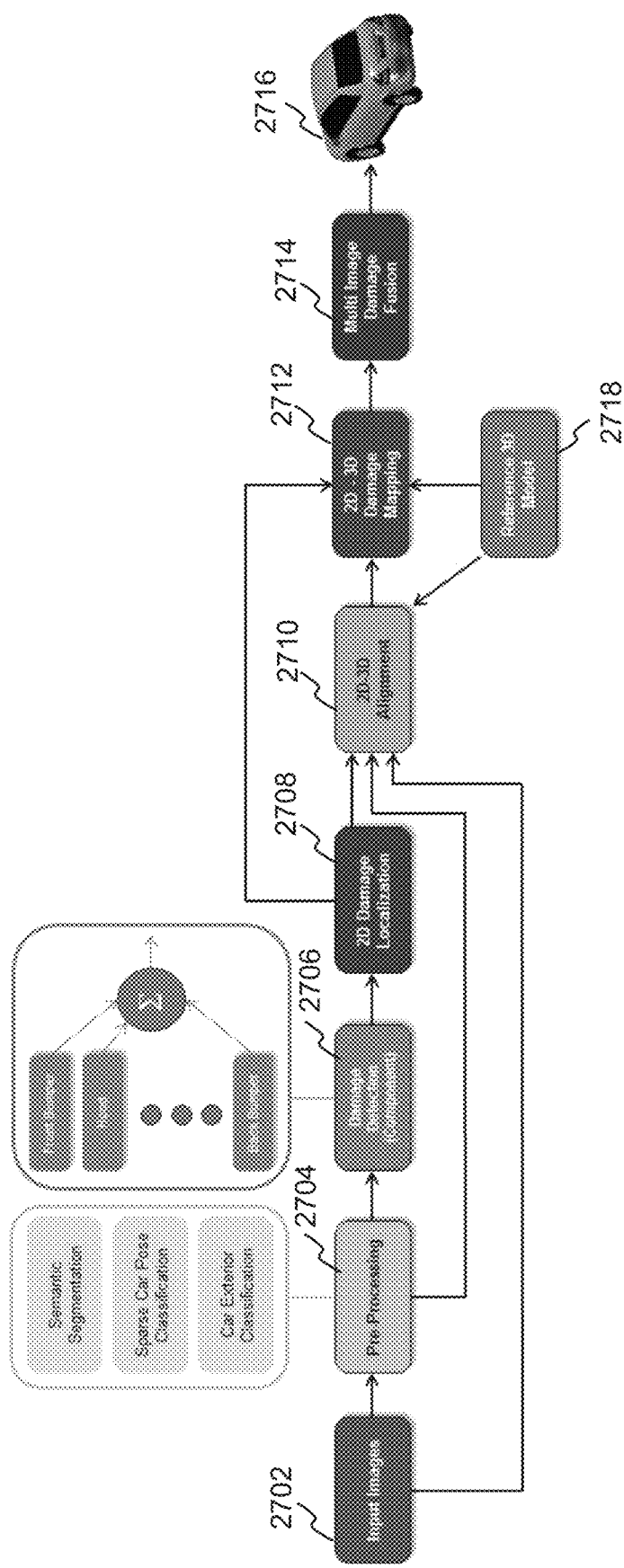
FIG. 27 is a flow diagram of method steps for performing image processing on one or more images to detect external damage of the vehicle, according to one embodiment of the disclosure.

FIG. 27 is a flow diagram of method steps for performing image processing on one or more images to detect external damage of the vehicle, according to one embodiment of the disclosure. A first embodiment was presented in FIGS. 4-5. A second embodiment is presented here in FIG. 27. In the disclosed second embodiment, a CNN-based deep learning system and 3D geometry methods are assembled together in a hierarchical data processing fashion to accurately localize and measure the damage information available from one or more images.

Figure 28:
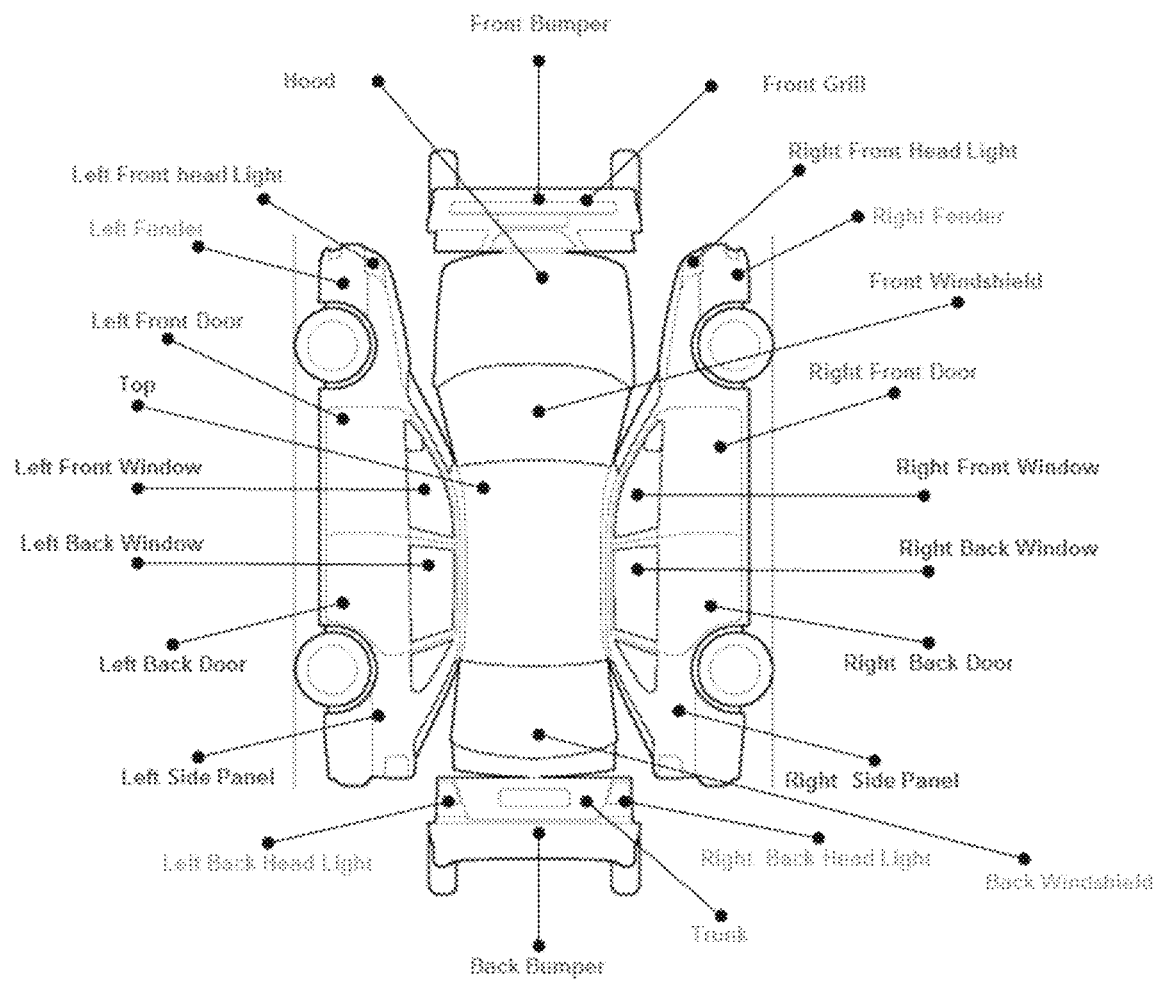
FIG. 28 illustrates a vehicle can be segmented into twenty-four (24) external parts, according to one embodiment.

The method of FIG. 27 takes damaged vehicle images (2702) and car make and model information (2718) as input, and outputs the damage localization on a 3D model (2716) of the same kind of car make and model. In one implementation, a vehicle can be segmented into twenty-four (24) external body parts, as illustrated in FIG. 28. The 24 external body metal parts can be target variables of the computations in FIG. 27, as described in greater detail below.

Model Training Data and Augmentation

As described above, in some embodiments, a deep learning system (e.g., Convolutional Neural Network) is trained on a large number of images of damaged vehicles and corresponding information about damage, e.g., its extent and location on the vehicle, in order to learn to assess damage presented with input images. The data used to train the model may be available from an insurance company's auto claims archives. A pattern learning technique can then be used predict damage to both the exterior and interior of the vehicle from input images of a damaged vehicle, as well as the associated repair costs, as described herein.

Figure 29:
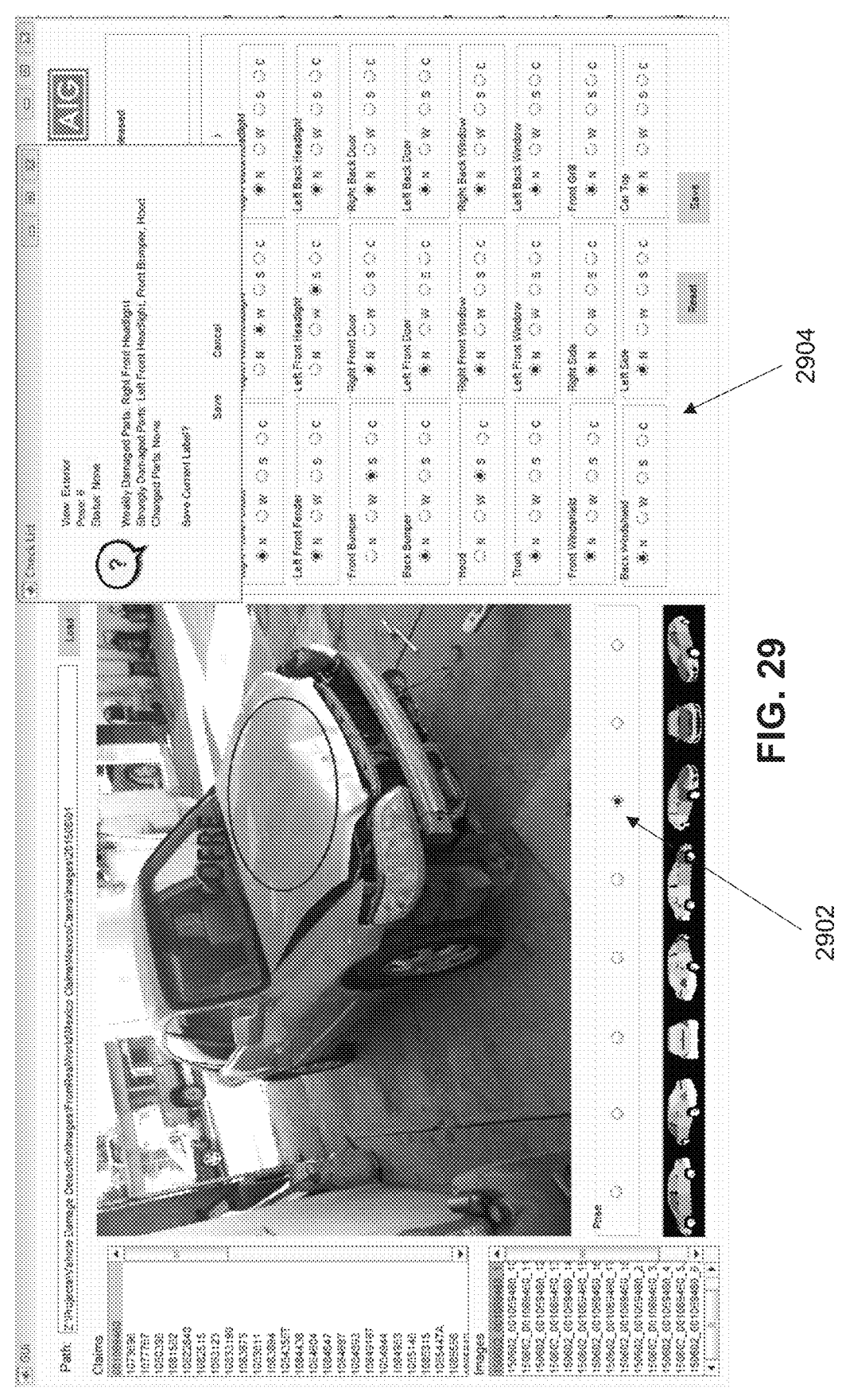
Figure 30:
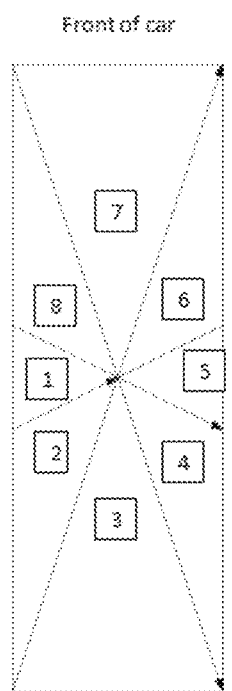
FIG. 30 illustrates an example of eight pre-defined poses of a vehicle.

In order to achieve better accuracy in training the machine learning models, some embodiments use assisted annotation to annotate each image in the dataset with an annotation tool to perform supervised/semi-supervised machine learning. An example of an interface of the annotation tool is shown in FIG. 29. The annotation tool may be software executed by the server computing device. A first portion 2902 of the interface includes an interface element for selecting the pose of the vehicle in the image from one of eight (8) pre-defined poses. FIG. 30 illustrates an example of the eight pre-defined poses of a vehicle. Specifically, the eight poses can be (1) left, (2) left rear, (3) rear, (4) right rear, (5) right, (6) right front, (7) front, and (8) left front, as shown in FIG. 30. FIG. 31 illustrates which external body parts are visible in each of the eight pre-defined poses, according to one implementation. Shading in the table in FIG. 31 illustrates that a given part is visible in a given pose, relative to a camera capturing the image of the vehicle.

A second portion 2904 of the interface includes interface elements for selecting a damage severity to each of the 24 external body parts of the vehicle in the image. In one implementation, the choices for each body part in the second portion 2904 of the interface may include (N) no damage shown, (W) weak damage shown, (S) strong damage shown, or (C) changed parts. Note, some parts that are not visible in the image may be damaged, but N is selected for those parts since the damage is not shown in the image.

In one implementation of the CNN model, each image in the training dataset is tagged with metadata identifying the pose of the vehicle in the image and indications of which parts are visible as damaged in the image and/or the severity of the damage to those parts. An interface tool like the one shown in FIG. 29 can be used to manually tag each image, in one embodiment. In other embodiments, the tagging can be performed automatically by an image processing system. In such embodiments, the interface tool could be used to verify or edit the automatically created tags.

In some implementations, a non-regularized neural network may learn features and noise equally well, increasing the potential for overfitting. Overfitting is a modeling error that occurs when a function is too closely fit to a limited set of data points. Thus, some embodiments may apply L2 regularization to avoid overfitting. Some embodiments can also leverage data augmentation to limit overfitting, as described herein.

Data augmentation, as described herein, can include offline augmentation or online augmentation to modify the model training data based on existing images. In one implementation, offline augmentation corresponds to increasing the volume of model training data before training a model. In one implementation, online augmentation corresponds to modifying the model training data when training so that the model is trained on the slightly different and randomly modified original data. Online augmentation does not increase the volume of data used for training, but rather reduces the chance of over-fitting the model on the original data. In various embodiments, online and offline augmentation methods can be performed independently.

Examples of offline augmentation include, but are not limited to: (a) flipping images horizontally, (b) cropping images with a predefined cropping window, or (c) brightness jittering, which adds an offset value to one or more color channels of an image. For example, if an existing image shows damage to the left side of the vehicle, by performing horizontal flipping, a new image is created that shows damage to the right side of the vehicle. By performing data augmentation on existing images, more images are added to the training dataset.

Data augmentation can also include online augmentation to add even more images to the training data set. Examples of offline augmentation include, but are not limited to: (a) deforming an image in affine spaces, (b) adding noise that is sampled from a Gaussian distribution, (c) adding noise that is valued with a Gaussian term $f'(x,y)=f(x,y)+N(0,\sigma^2)$ (i.e., so-called "salt and pepper noise"), (d) cropping away an original image with a pre-define cropping window, or (e) scaling each image by a scaling factor.

In some implementations, performing data augmentation to add additional images to the training data set can improve the performance of the model by reducing the chances of overfitting. Once the model(s) have been trained, the method of FIG. 27 can be performed.

Referring back to FIG. 27, at step 2702, a server, such as server 102, receives one or more images of a damaged vehicle from a client device. The images can be taken by, for example, a car insurance customer, an insurance agent, a police offer, or anyone else.

At step 2704, the server performs pre-processing on the images. Pre-processing may include one or more of the following portions: (A) vehicle exterior classification, (B) car pose estimation, and (C) car instance segmentation.

A. Vehicle Exterior Classifier

In some implementations, the images received can be taken from many possible angles and distances with respect to the car of interest. For example, an image might be a close-up of the damaged area on an external body part, or an image showing the VIN number of the vehicle. In order to efficiently and effectively detect damage to the exterior of a vehicle, images showing the car exterior are used in the method of FIG. 27. Thus, in some embodiments, pre-processing is performed to filter out non-exterior images. For example, an image that shows the interior of a vehicle can be filtered out. In some implementations, the system can define requirements for input images to be of the exterior of the vehicle. One embodiment may use a convolutional neural network to determine whether an image is showing exterior of the vehicle or not. The convolutional neural network takes images as input and gives a binary decision on the exterior/non-exterior determination.

B. Care Pose Estimation

Some embodiments determine which external body parts are visible in the input image. To do so, the server first classifies the pose of the car (with respect to the camera) into one of the eight pre-defined poses, as shown in FIG. 30. To simplify the pose estimation problem, some embodiments assume the camera is looking at the geometric center of the vehicle. Some embodiments use a convolutional neural network to achieve better pose classification. Once the pose is determined, a table such as the one shown in FIG. 31 can be used to identify which external parts are visible in the image.

C. Instance Vehicle Semantic Segmentation

Instance segmentation includes identifying the outline of the object of interest (e.g., the car) and removing all other parts of the image (e.g., the background and other cars that are not of interest). Performing instance segmentation during the model training phase provides a better training set for the classification network at run-time, as well as generates the input for 2D-to-3D alignment algorithm (described in more detail below). Accurate instance-level segmentation is a challenging problem, as many leading segmentation methods are unaware of individual object instances. Embodiments of the disclosure provides a novel instance-aware segmentation approach using Multi-task Network Cascades (MNC) enhanced using Structured Random Forest (SRF) with edge-map based potentials.

Image segmentation is a well-studied problem and recently has achieved significant improvement thanks to the use of deep learning networks. However, embodiments of the present disclosure are interested in instance-aware segmentation due to the fact that multiple vehicles may be displayed in images captured by users. Furthermore, the segmentation results are also expected to be aware of the object boundaries, which are used for precise 2D-to-3D alignment (described later in step 2710).

Embodiments of the disclosure provide a two-step framework to perform instance-aware, boundary-aware image segmentation. Embodiments of the disclosure first extract the segmentation from the input image using Multi-task Network Cascades (MNC). Then, an edge-map detected from a Structured Random Forest (SRF) is incorporated to enhance the boundaries of each segmented instance of the image, which is implemented as a conditional random field (CRF) where the unary terms are computed from the results of MNC and the pairwise terms are computed from the edge map detection algorithm. Described below are the MNC approach and use of CRF with edge-map based potentials.

Multi-Task Network Cascades

MNC is a CNN-based method for instance-aware image segmentation. Prior CNN methods typically employ a mask proposal method in order to differentiate instances. Such an approach may be slower at the inference step, but also takes no advantage of deep learning features for the mask proposal, which poses a potential bottleneck for segmentation accuracy and scalability.

Figure 32:
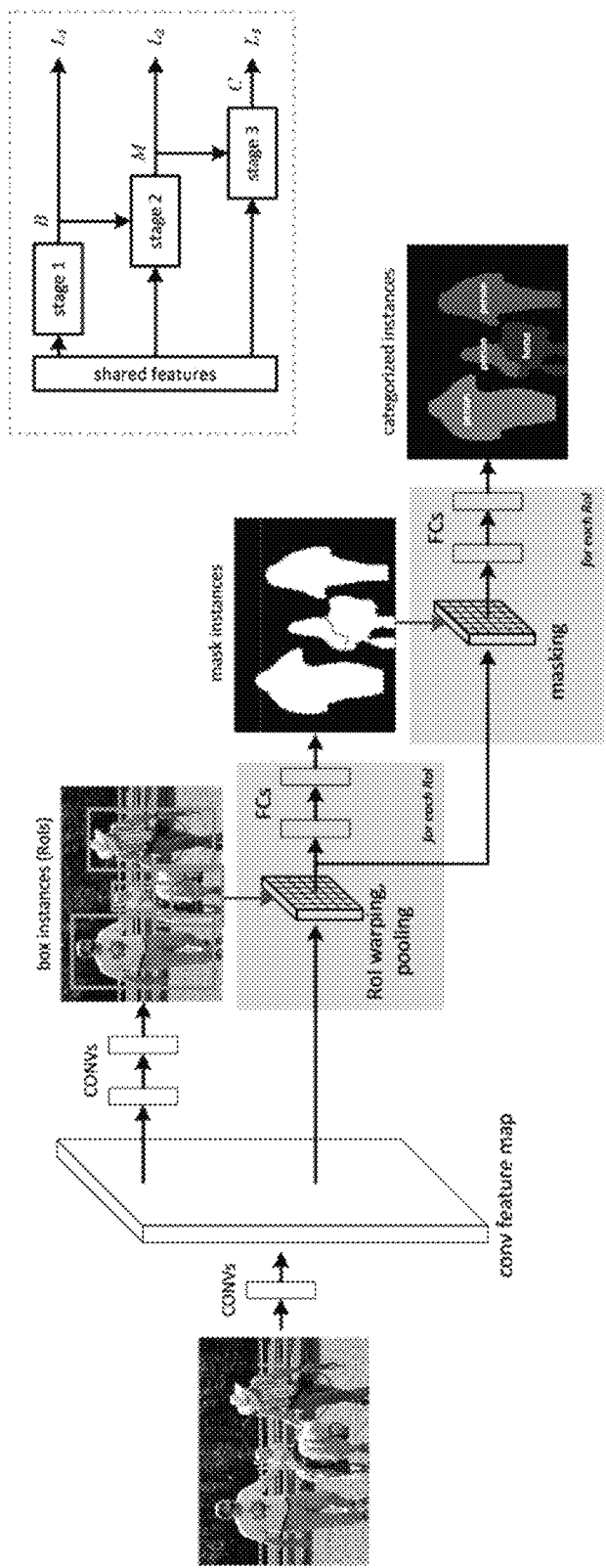
FIG. 32 illustrates an example overview of an MNC (Multi-task Network Cascades) model, according to one embodiment.

MNC is a type of fast R-CNN (Region-based Convolutional Neural Network), which incorporates a pre-processing step directly into the CNN structure. In essence, MNC is a cascaded network where each state is designed specifically for a certain task with a specific task-oriented cost function. In one implementation, three main sub-tasks decomposed from instance-aware segmentation include: (1) Class-agnostic bounding boxes detection, (2) Class-agnostic mask estimation from the bounding boxes, and (3) Mask categorizing. The three main tasks share the same deep feature bank and each takes the input from the immediately previous task. An example overview of an MNC (Multi-task Network Cascades) model is shown in FIG. 32.

In one implementation, three cost functions are defined for three stages, including: regressing box-level instances, regression mask-level instances, and categorizing instances, respectively. A regressing box-level instances layer takes regression results of a box-level layer and feature maps to predict a class-agnostic mask for each predicted bounding box. It can be performed as binary logistic regression to the ground truth mask. Instead of using a sliding-window as the method of box-level regression, in some embodiments this stage operates on the predicted bounding boxes. As the predicted bounding boxes can be different in size, a feature pooling method, namely, region-of-interest (ROI) can be used to obtain a fixed-size feature from an arbitrary box. To categorize the instances predicted from the first and second stage, the deep feature for each bounding box is extracted by ROI pooling and then "masked" before being fed into a softmax layer. Additional detail can be found in DAI, et al. "Instance-Aware Semantic Segmentation via Multi-task Network Cascades," 2016 IEEE Conference on Computer Vision and Pattern Recognition (CVPR), pp. 3150-3158 (June 2016), which is incorporated by reference herein.

FIG. 33 illustrates example results of performing MNC to segment images of vehicles. The images in top row are original images, the second row indicates different instances segmented by MNC. As shown in FIG. 33, MNC performs well at differentiating the instances of different vehicles (shown in shading in the second row of FIG. 33). However, the segmentation does not well preserve the precise boundary of each instance. This phenomenon is expected as the masks of MNC are obtained on top of low-resolution deep feature maps.

Conditional Random Field (CRF) for Improved Segmentation

In order to enhance the segmentation result of MNC by better preserving the boundary of the object of interest (i.e., the vehicle), some embodiments employ an edge-map detected from a Structured Random Forest (SRF). The goal is to incorporate two sources of complementary information, i.e., the object-level segmentation obtained from deep features and the edge-map generated from the patch-based low-level features.

Structured edge is a trainable edge detection model based on a random forest—i.e., an ensemble model containing multiple decision trees. A decision tree $f(x)$ predicts the label of a sample x by recursively branching left or right down the tree until a leaf node is reached. Each branching can be considered as a sub-classifier that assigns the sample into a smaller group, either left or right. Each leaf node is associated with a label, which will be assigned to the sample reaching the leaf node.

In one embodiment, training the tree involves finding a good criterion used to split the data at each branch of the tree based on the training data. The good criterion is defined as "an information gain" criterion that encourages the commonality of training samples within each newly formed groups. A splitting criterion such as Gini impurity or entropy can be used, in some implementations.

Figure 34:
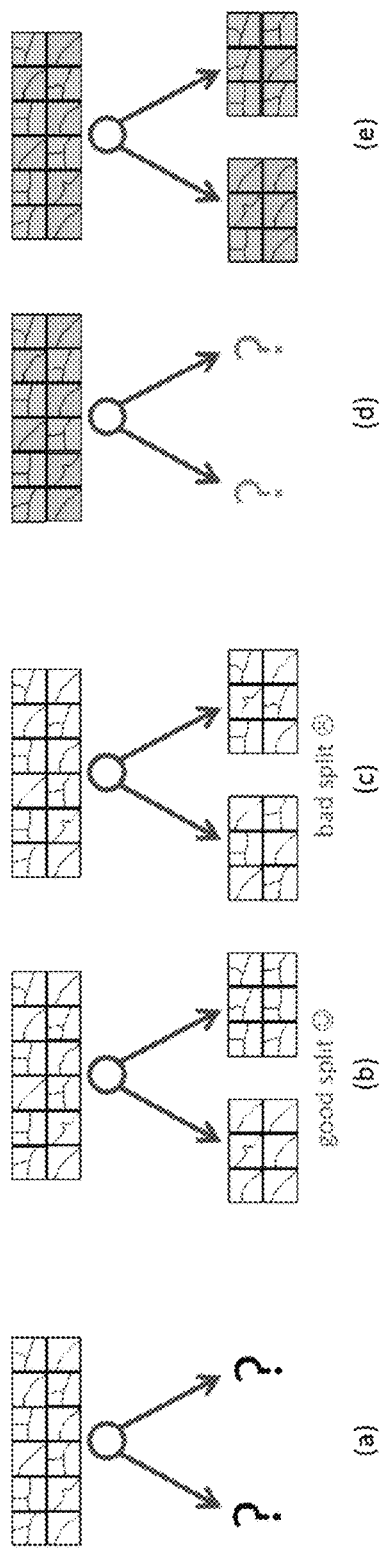
FIG. 34 illustrates an example structured edge detection algorithm.

For the structured edge detection algorithm, a sample x is the feature vector of a 32×32 image patch (for example) and the label is a 16×16 segmentation mask (for example), as illustrated in FIG. 34. As shown in FIG. 34, given a set of structured labels such as segments, a splitting function (a) is determined. A good split (b) groups similar segments, whereas a bad split (c) does not. In practice, the algorithm clusters the structured labels into two classes (d). Given the class labels, a standard splitting criterion, such as Gini impurity, may be used (e). Additional details can be found in DOLLAR, et al. "Fast Edge Detection Using Structured Forests," IEEE Transactions on Pattern Analysis and Machine Intelligence, Vol. 37, Iss. 8, pp. 1558-1570 (Dec. 4, 2014), which is incorporated by reference herein.

In one implementation of the algorithm for vehicles, the feature vector is computed based on low-level features including: intensity, gradient, and orientation. A sampling mechanism is used so that each tree uses m dimensions of the feature vector, which solves the efficiency issue and enhances the randomness. During testing, the results of all the trees are used to compute a soft-edge map, whose each pixel indicates the probability of the pixel being an edge.

CRF with MNC and Edge-Map Based Potentials

Embodiments of the disclosure first generate an over-segmentation into the superpixels of the image and then establish a conditional random field on top of the superpixel graph. Such a CRF models the possibilities of the superpixels being assigned as the object/non-object based on the MNC segmentation and edge-map values. Specifically, a CRF inference tries to minimize the energy function defined by:

$$E = w_u \sum_x U(x) + w_p \sum_{x,y} P(x, y)$$

E is the unary energy summing over all superpixels. Embodiments of the disclosure calculate this term using the segmentation result from MNC. U(x) is defined by the percentage of the area of the superpixels x being segmented as object.

E is equal to the pairwise energy summing over all pairs of neighboring superpixels. Embodiments of the disclosure calculate this from the edge-map. P(x, y) is computed using the output of the structured edge detector, i.e, the local segmentation masks. The two terms are weighted by $w_u$ and $w_p$, which are controlling parameters balancing the unary and pairwise terms. In one example, the two controlling weight $w_u$ and $w_p$ are set to two (2) and one (1), respectively.

In order to make the framework more robust to the object boundary, some embodiments can add a spatial constraint to the unary term. For example, a safe mask and an ignored mask are generated from the initial segmentation of MNC, visualized in FIG. 35.

Figure 35:
FIG. 35 illustrates a safe mask and an ignored mask generated from initial segmentation of MNC, according to one embodiment.

In FIG. 35, the left image is the original image, the middle image is the result of MNC segmentation, and the right image shows an overplayed safe mask and ignored mask.

Superpixels located in the safe mask are assigned negative energies so that they are guaranteed to be labeled as part of the object. Likewise, superpixels located in the ignored mask are assigned high energies so that their labels are likely non-object. Using safe mask and ignored mask leaves a narrow area alongside the segmentation boundary to be decided by CRF.

Damage Detection

Referring back to FIG. 27, after the server performs pre-processing at step 2704, the server performs damage detection at step 2706. Damage detection is performed for each part that is visible in a given image. The outcome of step 2706 is an indication, for each part that is visible in the image, whether that part is damaged or not.

Embodiments of the disclosure make use transfer learning to make a binary decision on whether the external part is damaged or not in an image. In one implementation, VGG 19 can be used as a baseline model, modified with a new classifier. VGG 19 is a known pre-trained CNN baseline model. Other baseline models can also be used, such as resnet-50, resnet-101, inception v-3, and inception v-4. Embodiments of the disclosure observed similar accuracy of these different models on the same test set. Below we will discuss the details in terms of VGG 19 as the baseline model, as an example.

Figure 36:
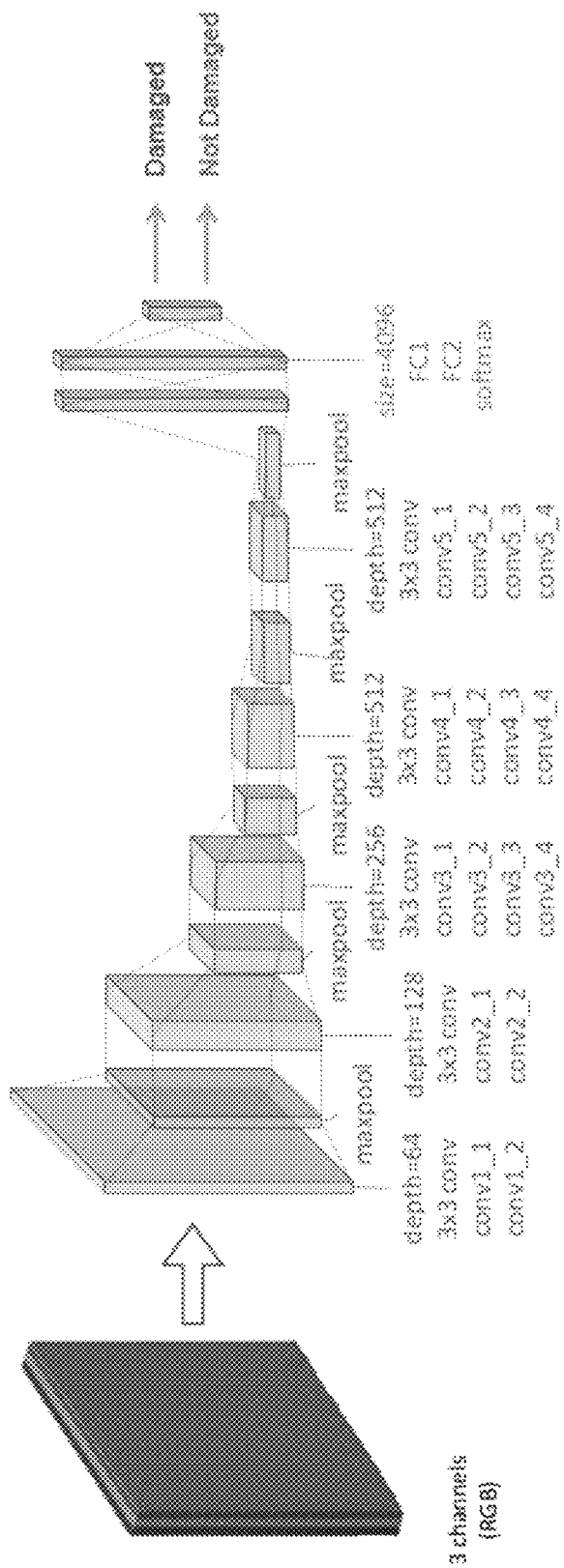
FIG. 36 is an example of a modified VGG 19 model used to detect damage of vehicle parts, according to one embodiment.

FIG. 36 is an example of a modified VGG 19 model used to detect damage of vehicle parts, according to one embodiment. As shown, a last layer of the network is replaced with a binary classification layer—either two neurons with softmax activation, or one neuron with sigmoid activation.

In one embodiment, with a one neuron sigmoid activation layer, embodiments of the disclosure are able to adjust the threshold to binarize the model output into categorical (i.e., damaged or not damaged). This operation can be used to choose an operating point in real application. Different thresholds result in different performance in terms of TPR (true positive rate—percentage of parts correctly labeled as damaged) and FAR (false acceptance rate—percentage of non-damaged parts labeled as damaged).

2D Damage Localization

The result of performing step 2706 is a binary decision as to whether each of the 24 parts is damaged in a 2D image. At step 2706, the server performs damage localization to determine where the damage is localized on the 2D image of the vehicle. The goal of this step is to determine which portions of a damaged part are damaged (e.g., a percentage of the part, in terms of area). In some implementations, based on whether the percentage of the part that is damaged is below a threshold, the part may be considered to be repairable. If the percentage of the part that is damaged is above the threshold, the part should be replaced. The threshold can be different for different parts and can be configurable.

In step 2708, the localized damage on the 2D images can be shown, for example, by drawing a 2D heatmap overlaying the image to localize where on the image the damage is located. One embodiment for performing 2D damage localization is the Grad-CAM algorithm, described in SELVA-RAJU, et al. "Grad-CAM: Visual Explanations from Deep Networks via Gradient-based Localization," 2017 IEEE International Conference on Computer Vision (ICCV) (Oct. 22-29, 2017), which is incorporated by reference herein. A second embodiment for performing 2D damage localization is a modified Grad-CAM algorithm, also described below.

Figure 37:
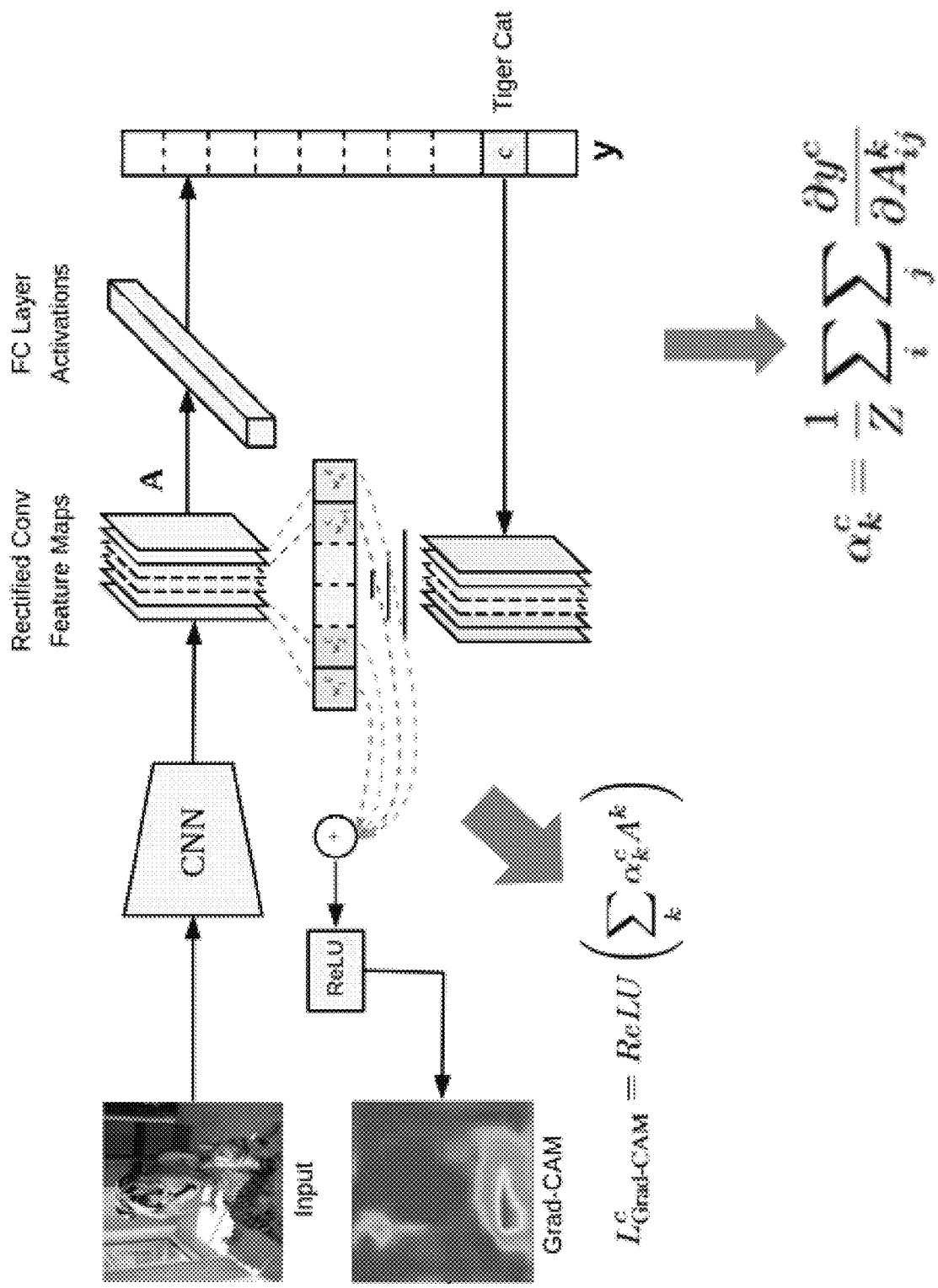
FIG. 37 illustrates a general Grad-CAM algorithm, according to one embodiment.

The general Grad-CAM algorithm workflow is illustrated in FIG. 37. Grad-CAM uses a model that has been trained to classify images into pre-defined classes. Using the trained model, the algorithm tries to infer the areas (or pixels) that are mostly responsible for the classification decision. So, we could also call it "model visualization." In the example shown in FIG. 37, the steps to highlight the tiger cat in the input images include:

Step 1. Add a new layer on top of the last layer of a trained classification network.

$$f(v_{softmax}) = v_{onehot}{}^{cat} \cdot v_{softmax}$$

Then, what we have is a vector that is all zero instead of cat index. And in cat index, the value is the confidence score from the model.

Step 2. Add the cost. We then define a cost function so the confidence score can reflect throughout the model (in the form of gradient.)

$$L(x) = \text{sum}(x)$$

Step 3. Forward the image to this model.

Step 4. Backpropagation the cost to the output of layer we are interested in (e.g. the output of last convolution layer). Let the output be $A_{ij}{}^k$ (the (i,j) element of k-th feature map) and the corresponding gradient is $$\frac{\partial L}{\partial A_{ij}^k}.$$

Step 5. Calculate the weight by global average pooling:

$$w_k = \frac{1}{Z}\sum_i \sum_j \frac{\partial L}{\partial A_{ij}^k}$$

Step 6. Calculate the CAM:

$$CAM = ReLU\left(\sum_k w_k A^k\right)$$

However, in some implementations for localizing damage on vehicles, the gradient vanishing is causing a problem in which $w_k$ is so small that it almost cancels out the entire feature map A. Therefore, one embodiment of the disclosure provides for a modified Grad-CAM algorithm, which adds a rescale layer after step 5.

Specifically, for step 5 and following, the workflow for the modified Grad-CAM algorithm is:

5. Calculate the weight by global average pooling:

$$w_k = \frac{1}{Z}\sum_i \sum_j \frac{\partial L}{\partial A_{ij}^k}$$

6. Rescale it to prevent gradient vanish:

$$w_k^* = w_k/\max(w)$$

7. Calculate the CAM:

$$CAM = ReLU\left(\sum_k w_k^* A^k\right)$$

The results of the original and modified Grad-CAM algorithm are shown in FIG. 38. For each part (e.g., left front fender and trunk), the input image is shown in the left column is the input image, the results of Grad-CAM are shown in the middle column, and the results of modified Grad-CAM are shown in the right column.

2D-to-3D Alignment

Referring back to FIG. 27, at step 2710, the server performs 2D-to-3D alignment to align a 2D image (with localized damage detected at step 2708) to a 3D model. Two different embodiments for aligning a 2D image to a 3D model are described: Approach 1: Template Matching and EM Refinement, and Approach 2: Point Correlation Method.

Approach 1: Template Matching and Pose Refinement

One embodiment for determining the 2D-to-3D association between a car in the image and a 3D model of the car is to first discretize, or sample, the 3D model and create a loop-up dictionary (i.e., a collection of 2D car model images). Then, look up in the pre-built collection to find the best match to the car in the 2D image. Therefore, we call this approach "template matching."

Template Matching Pose Alignment with CNN Features

Figure 39:
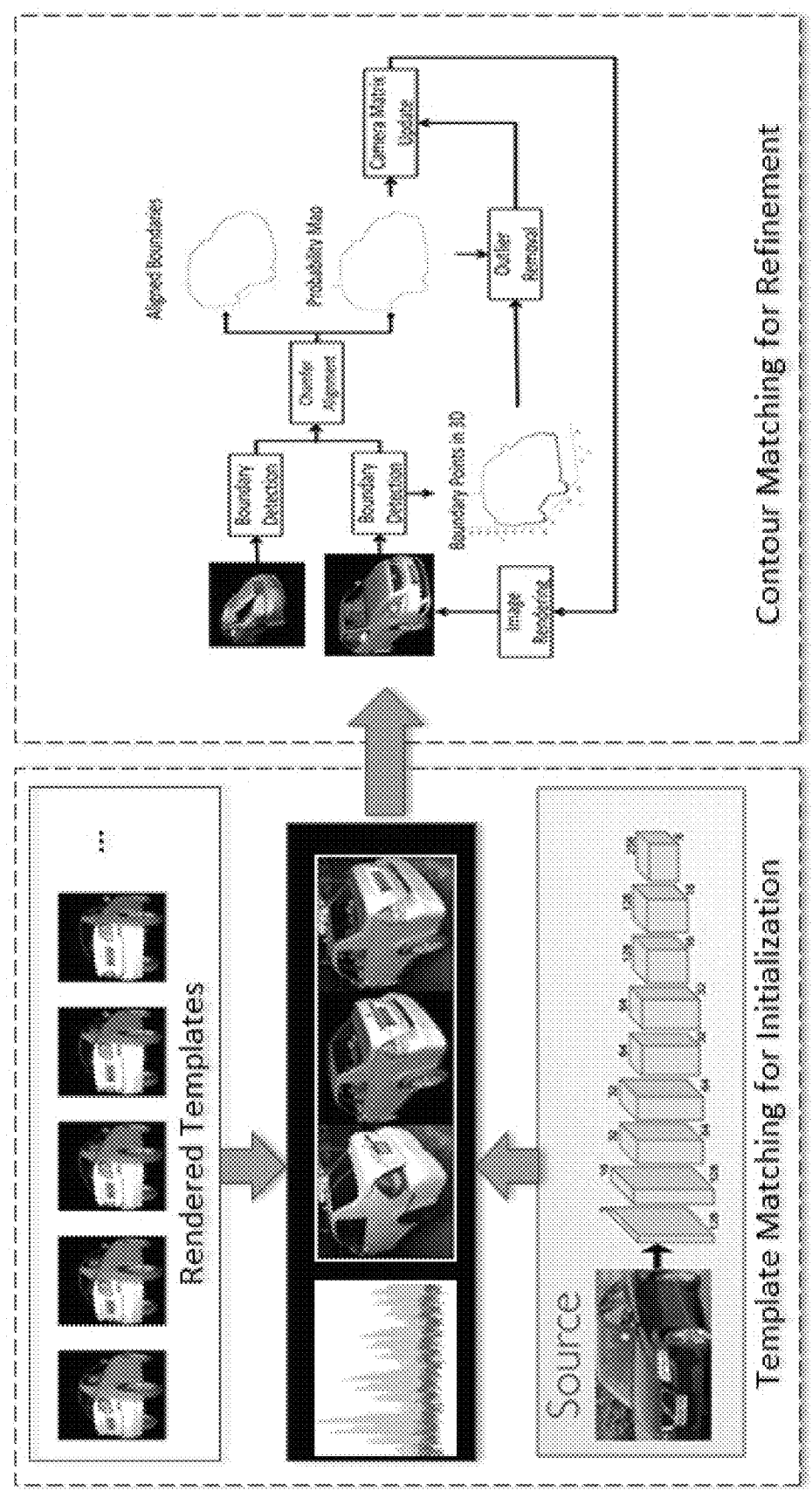
FIG. 39 illustrates a template matching approach to 2D-to-3D alignment, according to one embodiment.
Figure 40:
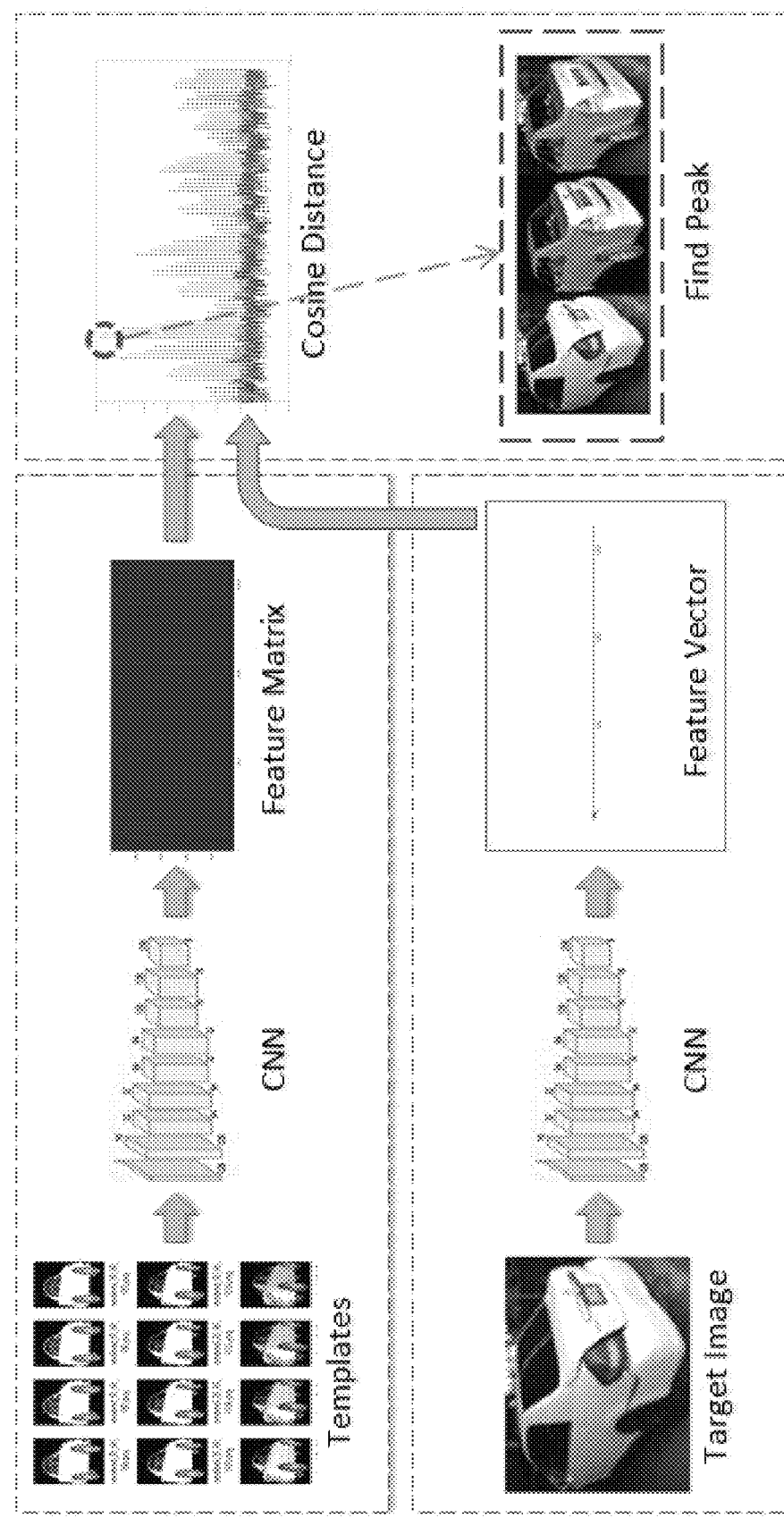
FIG. 40 illustrates template matching pose alignment with CNN features, according to one embodiment.

The template matching approach includes two successive stages: initial template matching and refining matching with contour, as shown in FIG. 39. A pre-trained deep neural network is used to extract features from both a 3D model and the image to be aligned. Then, the cosine similarity is measured between rendered and real images. The algorithm pipeline is shown in FIG. 40.

Figure 41:
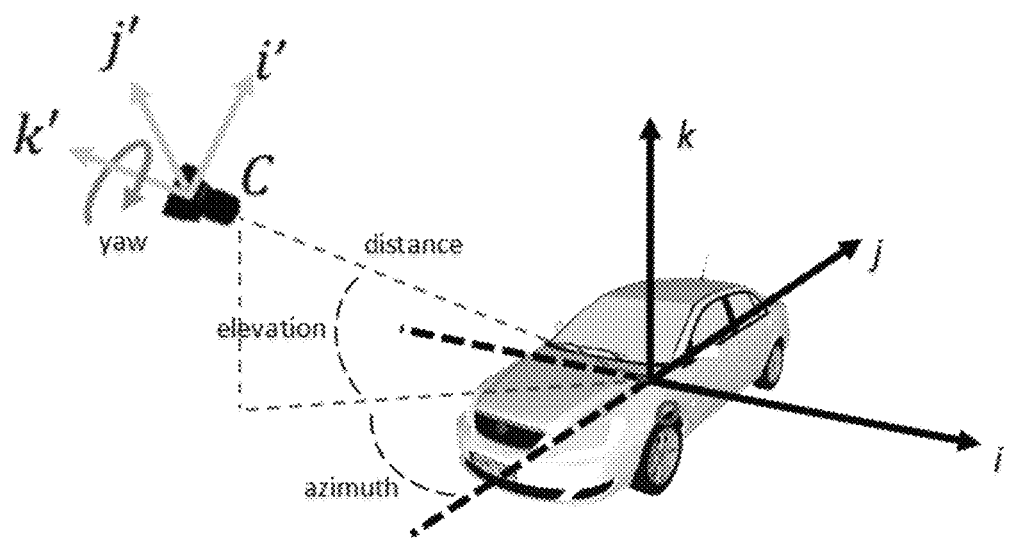
FIG. 41 illustrates parameters of distance to camera center, elevation angle, azimuth angle, and yaw angle for an example 3D car model.

In the rendering/sampling step, a discrete set of renderings of a 3D car model is generated from various viewing points by adjusting four parameters: the distance to camera center, elevation angle, azimuth angle, and yaw angle. These parameters are shown in FIG. 41 for an example 3D car model. Then, each rendered car image is rescaled to the same dimension (for example, 256×256 pixels). The following parameter ranges can be selected, as an example implementation:

distance=[400,450,500,550,600,650,700,750];
elevation=[0-20 degree];
azimuth=[0-360 degree]; and
yaw=[−6-6 degree].

In the next step, the disclosed embodiments use a pre-trained CNN to extract features. The resulting feature is a one-dimensional representation of the 2D image. Therefore, the cosine distance between 2D car image and each one of the rendered templates can be calculated using the equation:

$$\text{similarity} = \cos(\theta) = \frac{A \cdot B}{\|A\|_2 \|B\|_2} = \frac{\sum_{i=1}^n A_i B_i}{\sqrt{\sum_{i=1}^n A_i^2}\sqrt{\sum_{i=1}^n B_i^2}}$$

Some embodiments of the disclosure choose the template with the highest matching score as the final alignment, and its corresponding pose as pose estimation result.

Pose Refinement

In some embodiments, an EM-based pose refinement approach can be used to fine-tune the alignment result from the above template matching stage. The refinement is achieved by aligning a silhouette (e.g., boundary of 2D projection) of the 3D model with the corresponding image boundary of the target vehicle.

Figure 42:
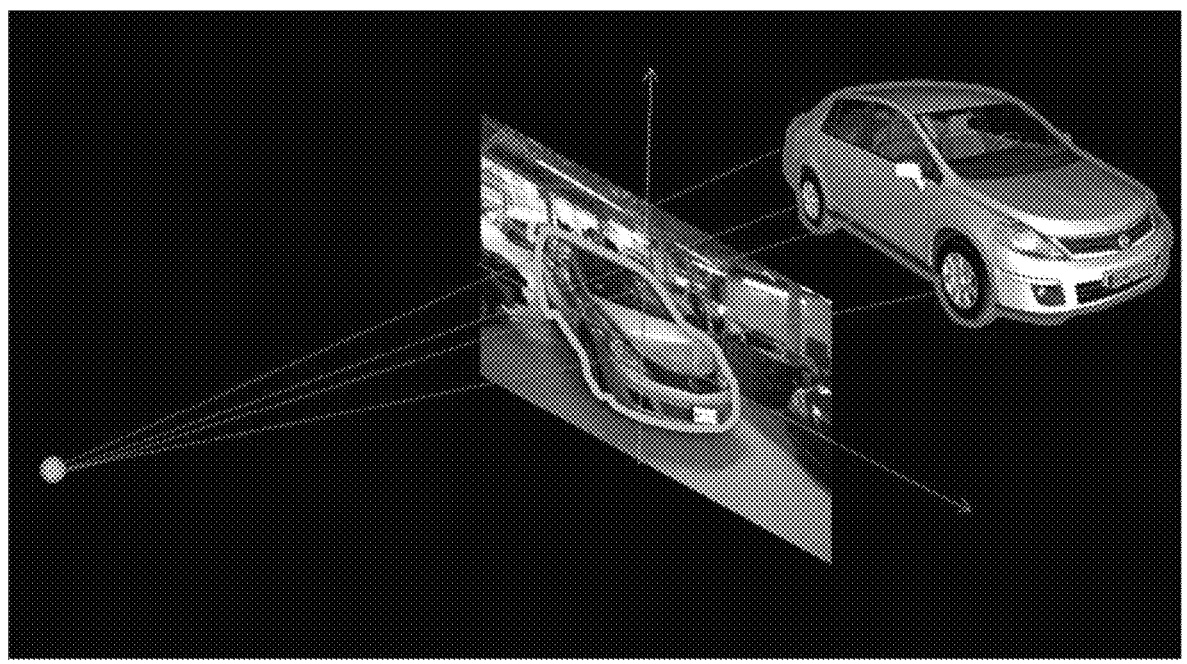
FIG. 42 illustrates projecting the 3D model onto an image of a vehicle, according to one embodiment.

The goal of pose refinement is to find the camera matrix that correctly projects the 3D model onto the real vehicle image. Given that camera matrix, the silhouette (i.e., boundary of 2D projection on image plane) of the 3D model should be seamlessly overlapped with the boundary of the real vehicle. This is illustrated in FIG. 42.

If the correct point-wise correspondence between the silhouette of the 3D model and the real vehicle boundary is known, then the underlying camera matrix can be solved via ordinary least-square optimization.

Figure 43:
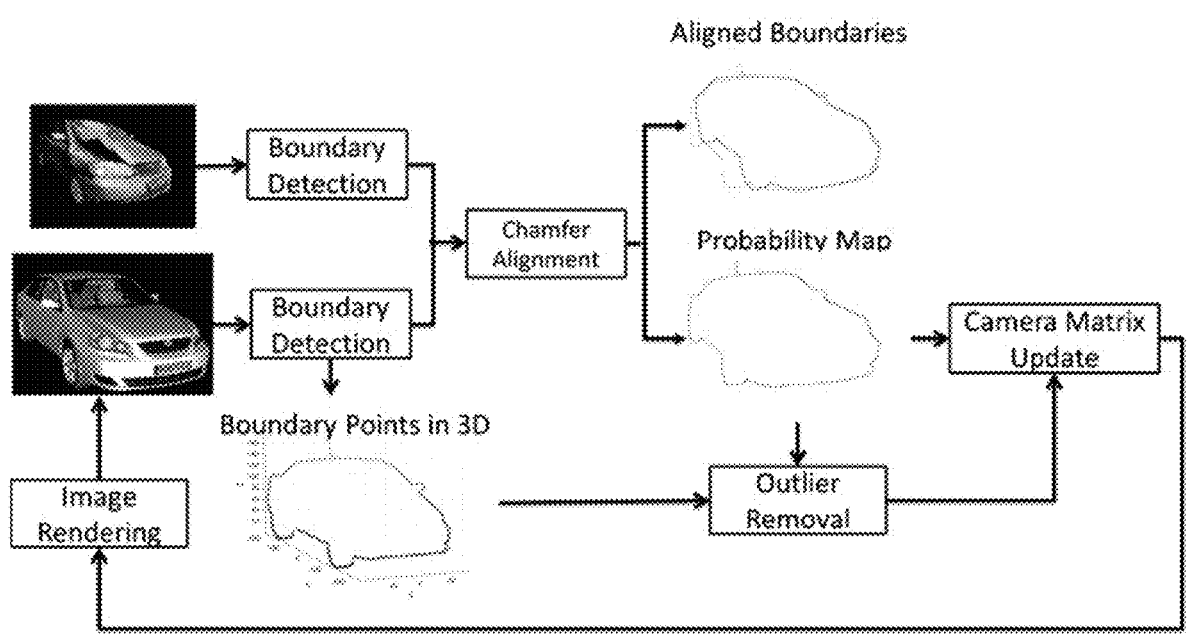
FIG. 43 illustrates pose refinement, according to one embodiment.

However, that kind of correspondence can be difficult to determine. To address this problem, some embodiments use an iterative framework, as shown in FIG. 43, which alternates between two steps to approximate the correct solution. The first step registers the boundaries extracted from a real vehicle image and a rendered image, establishing a point-wise correspondence between two boundaries. The second step updates the camera matrix based on the current registration (i.e., correspondence).

Registration of Image Boundaries

The registration step takes two images as inputs, the vehicle image $I_v$ and the rendered image $I_r$. $I_r$ is rendered from the most up-to-date 3D pose estimation for $I_v$ (either from the initialization stage, or from last iteration); thus, $I_v$ and $I_r$ should be of similar pose. The vehicle boundary in $I_v$ is extracted from the image segmentation results described in previous sections, while the boundary of the rendered vehicle in $I_r$ is extracted from $I_r$'s alpha channel. Embodiments of the disclosure designate $\{m_i\}$ and $\{v_j\}$ as the 2D boundary points extracted from images $I_r$ and $I_v$, respectively.

To perform the registration, the disclosed embodiments aim to find a homography $H_\beta$ that maps each boundary point $m_i$ to a corresponding $v_j$. For each $m_i$, we denote $\hat{m}_i$ as its counterpart after transformation with $H_\beta$:

$$\hat{m}_i = H_\beta m_i$$

Embodiments of the disclosure use $d_i(H_\beta)$ to denote the distance from $\hat{m}_i$ to its nearest $v_j$:

$$d_i(H_\beta) = \min_j D(v_j, \hat{m}_i)$$

Putting the above two equations together we have:

$$d_i(H_\beta) = \min_j D(v_j, H_\beta m_i)$$

where $D(x, y)$ denotes the squared Euclidean distance.

It is noted that some boundary points in $I_r$, referred to as "outliers," do not have corresponding boundary points in $I_v$. The outliers have two main sources, one is that an innate discrepancy exists in the current pose estimation, and as a result some boundary points on $I_r$ are actually invisible in $I_v$. The other source is the shape distortion due to damage to the vehicle. Therefore, one embodiment may account for the outliers during the registration process. Each distance $d_i$ is assigned with a posterior probability $p_i$, indicating how likely each point $m_i$ is an inlier. Formally, the problem of boundary registration is formulated as finding the correct homography $H_\beta$ that minimize the objective function:

$$Q_1 = \sum_{i=1}^{n} p_i d_i(H_\beta),$$

where $N_i$ is the number of points on the rendered vehicle's boundary. Embodiments of the disclosure apply the EM algorithm to estimate homography $H_\beta$. The EM algorithm iterates between updating the posterior probability $p_i$ based on current registration ("E-step"), and re-estimating the homography parameters ("M-step") until it converges to a local minimum.

This boundary registration method generates a homography $H_\beta$ that maps each boundary point $m_i$ to its corresponding $v_j$, as well as a probability map indicating how likely each $m_i$ is an inlier.

Camera Matrix Update

In the camera matrix step of pose refinement, embodiments of the disclosure calculate the camera matrix from the registered image boundaries. Each boundary point $m_i$ is associated with a 3D point $M_i$ on the 3D model, as $\{m_i\}$ is the 2D projection of $\{M_i\}$. From last step, we know each $m_i$ has a corresponding $v_j$ on the boundary of the real vehicle. Using $\{m_i\}$ as a bridge, embodiments of the disclosure establish the 3D-to-2D correspondence between 3D points $\{M_i\}$ and the 2D points $\{v_j\}$. The above correspondence can be utilized to estimate the camera matrix P as mentioned previously.

With the probability map for inliers generated from last step, embodiments of the disclosure filter out all the outliers from $\{m_i\}$. Only those reliable 3D-to-2D correspondences that associated with inliers are kept, denoted as $\{v_k \leftrightarrow M_k, k=1, 2, \ldots, N_k, \text{s.t. } m_k \in \text{inliers}\}$, $N_K$ is the number of inliers. The relationship between each pair $v_k$ and $M_k$ can be defined as below with regard to the camera matrix P:

$$sv_k = PM_k.$$

With the above equation, given $N_K$ correspondences, embodiments of the disclosure can find a linear solution of camera matrix P using direct linear transformation (DLT).

The linear solution of P obtained by DLT algorithm minimizes an algebraic error that is not geometrically meaningful. Therefore, embodiments of the disclosure can further approximate the optimal solution by minimizing the geometric error. Geometric error is also known as re-projection error, which is defined as the average distance between the re-projected points and the image points. In one implementation, embodiments of the disclosure are solving for a camera matrix P that minimizes the following nonlinear error function:

$$Q_2 = \sum_{k=1}^{N_k} d_k(v_k, PM_k).$$

The nonlinear optimization of this equation can be solved with Levenberg-Marquardt (LM) method. It can be noted that the LM method uses an initialization point to start with. In one implementation, we simply take the estimated camera matrix P from the linear solution for this purpose. The complete algorithm for 3D-to-2D alignment is summarized in Algorithm 1 below:

Algorithm 1:
Proposed algorithm for aligning 2D image with 3D CAD model

```
Input   : Vehicle image with background removal I_v, 3D CAD model M. and initial
          camera matrix P_0
Output  : Optimal camera matrix P* for 3D-to-2D alignment
Image rendering:
1 Create a rendered image I_r using the initial camera matrix P_0:
Boundary detection:
2 Extract boundary points m_i and v_j from I_r and I_v, respectively:
3 Extract the 3D coordinates M_i for 2D boundary points m_i:
Initialization:
4 1 ← 0: P' ← P_0:
5 repeat
  | Chamfer alignment:
6 | n ← 0:
```

Algorithm 1:
Proposed algorithm for aligning 2D image with 3D CAD model

```
7   | repeat /*EM iterations*/
8   |     | Compute posterior probabilities $\{p_i\}_{i=1}^{N_i}$ using (6.2):
9   |     | Estimate homography parameter $H_\beta^*$ using LM method:
10  |     | Compute $\gamma^*$ using (6.3), $\lambda^*$ using (6.4):
11  |     | n ← n + 1:
12  | until (n > max iterations):
    | Camera matrix update:
13  | Select inlier points $\{m_k\} \leftarrow \{m_i | p_i > 0.8\}$:
14  | Identify correspondence $v_j \leftrightarrow m_k \leftrightarrow M_k$:
15  | Find linear solution of P based on (3.3):
16  | Find $P^*$ that minimizes (3.1):
17  until ($||P' - P^{t-1}||_2 \leq \varepsilon_1$) or ( t > max iterations ) //Convergence of parameters:
18  Output current parameter estimate P' as $P^*$ :
```

The results of adding the pose alignment procedure is shown in FIG. 44. The left column shows the results of template matching alignment, and the right side shows improvements in the alignment after adding pose refinement.

Approach 2: Point Correspondence Matching

A second embodiment for aligning a 2D image to a 3D model is referred to as point correspondence matching. The first embodiment uses a two-stage method: a template matching stage based on rough pose estimation, followed by a contour matching stage based on fine-grained pose alignment. The first embodiment works well under most conditions. However, in a case that the contour of the car is severely deformed due to damage, a complementary approached is developed to account for this special situation, referred to herein as point correspondence matching.

Figure 45:
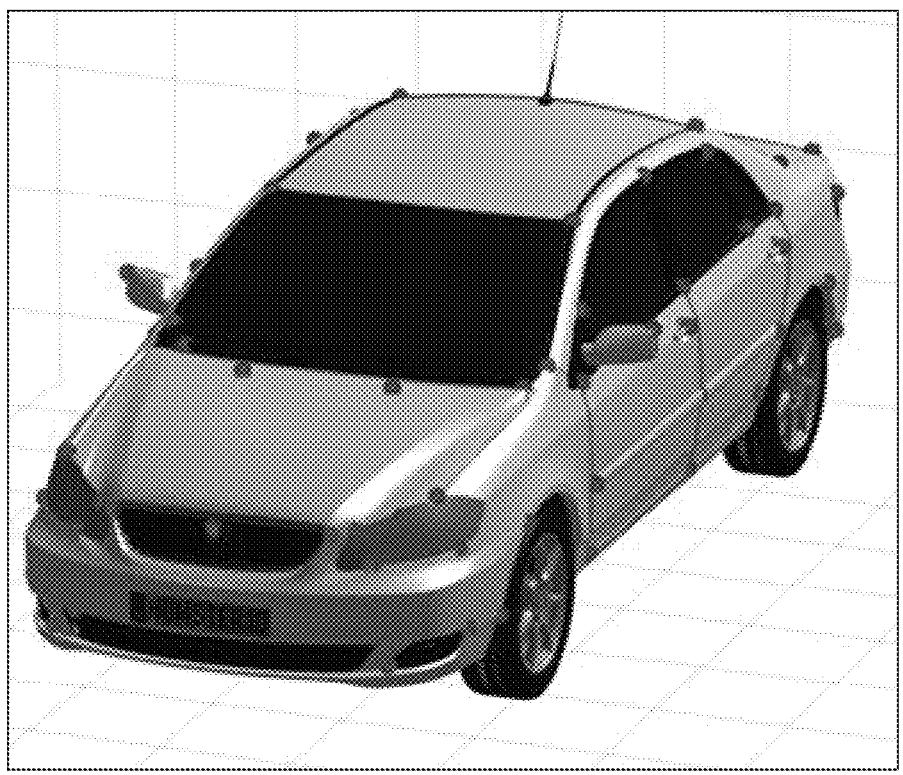
FIG. 45 illustrates a set of 3D anchor points on the surface of the 3D model of a vehicle, according to one embodiment.

In this embodiment, a set of 3D anchor points $\{Li\}$ are pre-selected on the surface of the 3D model as shown in FIG. 45. Given a car image of the same make and model as in the 3D model, there should exists another set of 2D anchor points $\{li\}$, which are 2D projections of $\{Li\}$ on the image plane.

Given the pairwise 3D-to-2D correspondence between each Li and li, the underling camera matrix determines the 3D pose that maps the 3D model onto the 2D image plane could be solved as a Perspective-n-Point problem, as shown in FIG. 46. Embodiments of the disclosure call this procedure point based matching.

In this approach, embodiments of the disclosure use anchor point detection to solve for the 3D-to-2D correspondence, and the 3D pose is estimated through point based matching.

2D Heatmap Regression for Anchor Point Detection

In order to find the above mentioned 3D-to-2D correspondence, one embodiment of the disclosure treats each 2D projection li as an individual object to detect within the target image. In other words, given each 3D anchor point Li and a target image, embodiments of the disclosure infer the location of its 2D projection li on the image plane. In one example implementation, there may be 86 anchor points on a vehicle, so there are 86 locations to detect.

Figure 47:
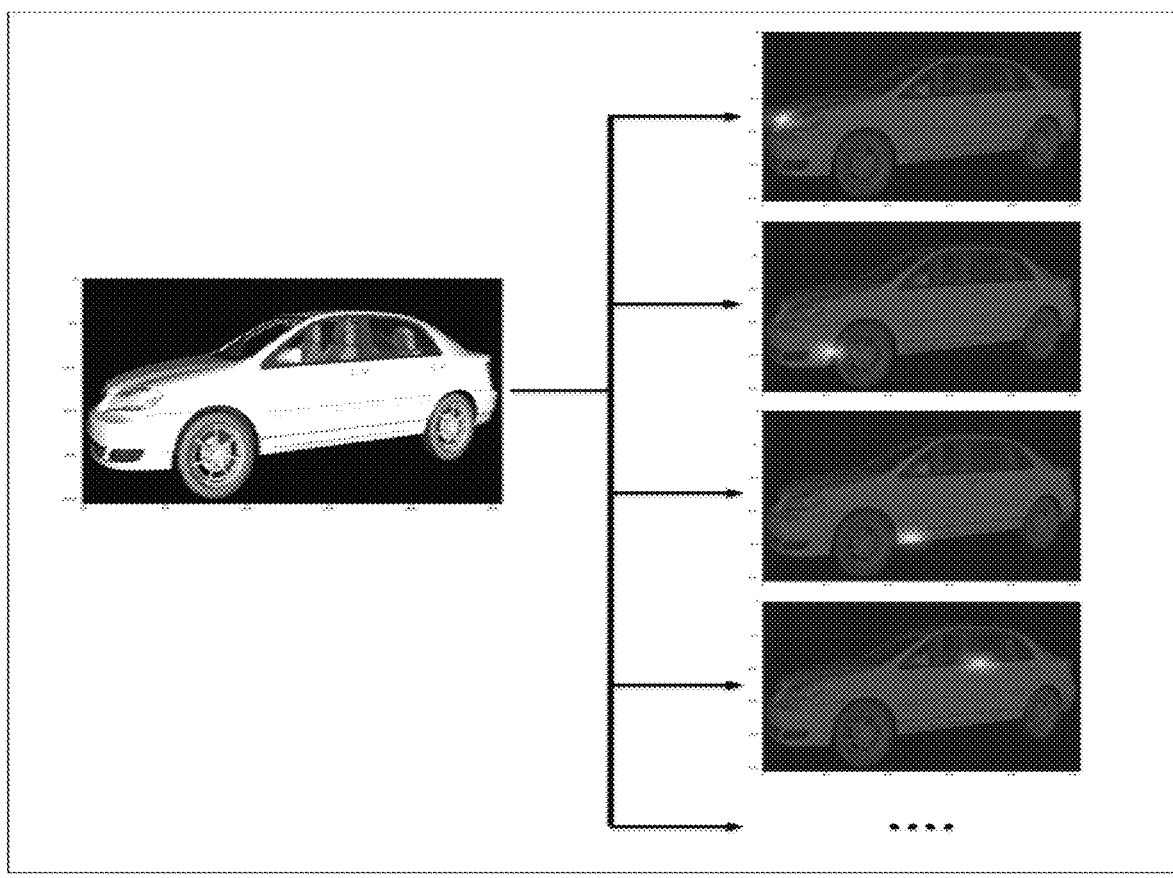
FIG. 47 illustrates heatmaps for anchor points, according to one embodiment.

For anchor point detection, a set of heatmaps can be used to represent the correct anchor point locations on the image plane. Each heatmap is of the same size as the target image, and the intensity value in each pixel is the confidence score denoting how confident the 2D projection li is centered at that location. The entire heatmap is a 2D Gaussian function with its peak centered at the correct location of li. In the implementation of 86 anchor points, there are 86 heatmaps for the anchor points, as shown for example in FIG. 47. By searching for the maximum peak of the heatmap, embodiments of the disclosure can find anchor point's location. This process is called heatmap-based localization.

Multi-Task Deep Model for Heatmaps Regression

By introducing the heatmap based localization, the anchor point detection task is converted into predicting a per-pixel confidence map for each individual anchor point. The prediction procedure is formulated as a per-pixel least square regression, and the model is tuned to generate heatmaps that minimize the total least square error with the ground truth.

To leveraged the power of deep learning on this task, some embodiments use an encoder-decoder shaped neural network for heatmaps prediction. The encoder part of this network is composed of a series of convolutional layers and intermediate max pooling layers. The output is a down-sampled feature map extracted from the input image. Following the down-sampling encoder network, there is an up-sampling decoder network. A series of transposed convolutional layers, also called deconvolutional layers, are applied to up sample the feature maps. Embodiments of the disclosure call the layer that connects the encoder decoder networks the bottleneck layer, because it has the smallest input and output size. Several skip connection layers are bridged between the encoder network and the decoder network, to merge the spatially rich information from low-level features in the encoder network, with the high-level object knowledge in the decoder network.

In some implementations, not all of the anchor points are visible in the target image. Including predictions of those invisible points into our loss function may degrade the training process. As the model is driven to approximate some targets that do not exists.

To address this situation, a second learning task can be added to the existing model in some embodiments. The model learns to predict the visibility status of each anchor points, by formulating it as multi-label binary classification. From the bottleneck layer, the model branches out a series of cascaded fully connected layers to predict the visibility status. The encoder network, together with the branched fully connected layers, constitute a regular convolutional network for binary classification.

To train this multi-task deep learning model, the loss function can be the summation over all individual heatmap regression tasks, and the visibility prediction task.

The regression task can use the least-square-error between the predicted heatmaps and the ground-truth heatmaps as loss function. During training, the ground-truth visibility status can be used to mask out the losses coming from the invisible anchor points, so they will not present in the final loss function. During inference, the predicted visibility can be used determining which heatmaps to output.

To formulate the loss function of our model, one embodiment denotes $\{\hat{h}_c\}$ and $\{\hat{v}_c\}$ as the ground truth heatmap and visibility status for anchor point c, where $\hat{v}_c \in \{0,1\}$. Embodiments of the disclosure use $h_c$ and $v_c$ to denote the predictions of heatmap and visibility status of our network.

The heatmap regression uses the least-square-error between the predicted heatmaps $\{h_c\}$ and the ground-truth heatmaps $\{\hat{h}_c\}$ as loss function. In some embodiments, the least-square-error from just the visible anchor points should be included in the loss. Embodiments of the disclosure introduce a weighted least-square-error using $\{\hat{v}_c\}$ as weights, to mask out invisible anchor points where $\hat{v}_c=0$. The heatmap loss $L_h$ is formulated as:

$$L_h = \sum_c \hat{v}_c * \|h_c - \hat{h}_c\|^2$$

For the visibility prediction, some embodiments use the per-anchor point cross-entropy as loss function. The loss $L_v$ is formulated as:

$$L_v = -\sum_c \hat{v}_c \log(v_c) + (1 - \hat{v}_c)\log(1 - v_c)$$

Finally, the total loss $L_{total}$ is formulated as:

$$L_{total} = L_h + \lambda * L_v$$

where λ is the weight term to help balance between two losses.

To train our multi-task deep model, a large amount of car images with annotated anchor point locations and visibility can be used to achieve good generalization in a real application. However, accurate annotations of anchor points are hard to achieve due to the high cost of manual annotation, and the associated inaccuracies due to human error. To obtain such large-scale training data, some embodiments utilize a 3D model combined with a 3D render engine to generate a synthetic training dataset to train our model. This is similar to the data augmentation described with respect to 2D images.

Figure 48:
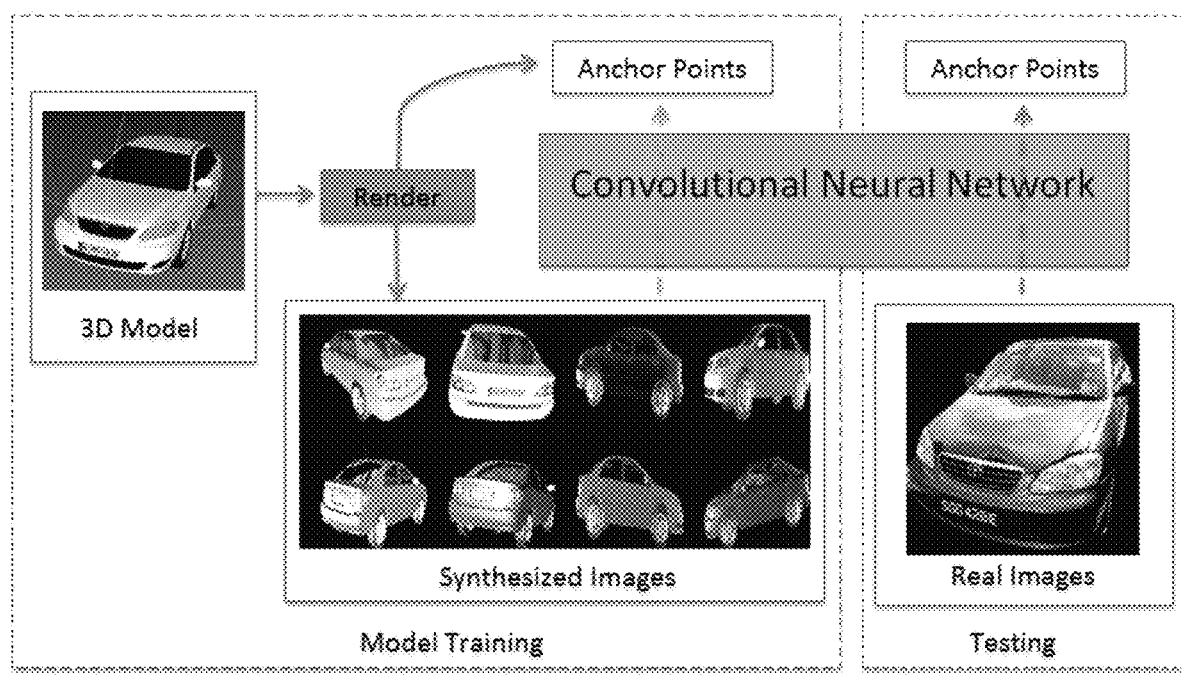
FIG. 48 illustrates rendering synthetic images and determining anchor points for the synthetic images, according to one embodiment.

For example, the rendered images from a 3D model tend to be homogeneous in lighting condition, color, and texture, thus may cause over-fitting. To compensate for that, some embodiments randomly add light sources of different locations and intensity, and adjust part colors of the 3D model to introduce more variations in our synthetic training dataset. FIG. 48 illustrates rendering synthetic images and determining anchor points for the synthetic images, according to one embodiment.

To further reduce over-fitting, some embodiments add several additional data augmentation strategies during training. For example, some embodiments may randomly crop the original input images, and take the cropped sub-images as training data. Other embodiments as salt and pepper noise to each color channel. Also, random amounts of rectangular masks can be applied to the image to mask out some parts from the car.

Point Based Matching for Pose Alignment

As described, given a set of 3D anchor points $\{X_i\}$ defined on the surface of 3D model, some embodiments can find their corresponding 2D projections $\{x_i\}$ on the image plane. We now focus on how to solve for the camera matrix that correctly map $\{X_i\}$ to $\{x_i\}$.

Figure 49:
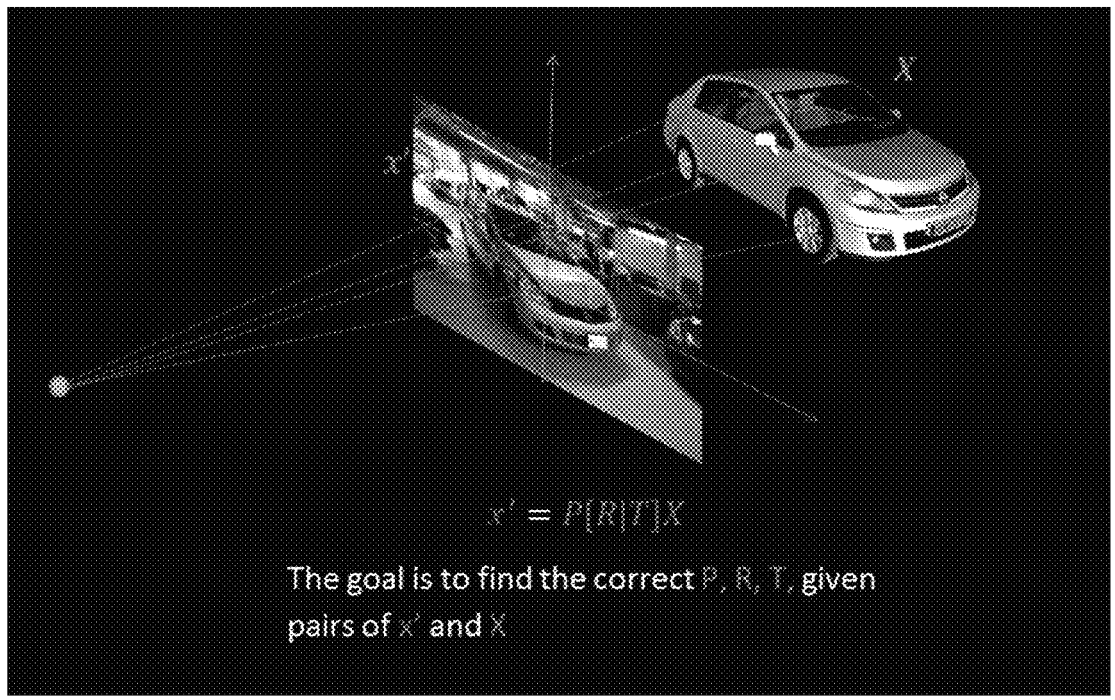
FIG. 49 illustrates a camera matrix that maps anchor points of a 3D model to corresponding 2D projections in an image, according to one embodiment.

As shown in FIG. 49, the relationship between each $X_i$ and corresponding $x_i$ is defined by the camera matrix, which includes the projection Matrix P, rotation matrix R, and translation matrix T, formulated by the equation:

$$x = P[R|T]X$$

To match each pair of $X_i$ and $x_i$ from $\{X_i\}$ and $\{x_i\}$, the bellowing loss should be minimized:

$$\text{loss}(P, R, T) = \sum_i \|x_i - \hat{x}_i\|^2$$

$$\text{s.t. } \hat{x}_i = P[R|T]X_i$$

For P, R, T, in total there are six (6) parameters to optimize. Some embodiments suppose that focal length is known, thus there are three (3) parameters for rotation and three (3) parameters for translation. A 6-dimension vector p is used to denote the parameters to tune, and the optimization problem is formulated as:

$$p = \underset{p}{\text{argminloss}}(p)$$
$$= \underset{p}{\text{argmin}} \sum_i \|f(X_i; p) - x_i'\|^2$$

Since the transformation function $f(X_i; p)$ is nonlinear, the above formula cannot be solved directly; instead, an iterative approach is applied. This approach iteratively finds an update Δp to the current parameter p by minimizing:

$$\text{loss}_{NLS}(\Delta p) = \sum_i \|f(X_i; p + \Delta p) - x_i'\|^2$$
$$\approx \sum_i \|J(X_i; p)\Delta p + f(X_i; p) - x_i'\|^2$$
$$= \sum_i \|J(X_i; p)\Delta p + r_i\|^2$$

where:
$$r_i = f(X_i; p) - x_i'$$
$$J(X_i; p) = \partial f(X_i; p) / \partial p$$

By solving the above formula:

$$\Delta p = -(J^{-1})^T r$$

where: $r = [r_0 \ldots r_i \ldots]$ $$J^{-1} = [J(X_0; p) \ldots J(X_i; p) \ldots]$$

By iteratively updating p using $p = p - \alpha(J^{-1})^T r$, embodiments of the disclosure can compute an optimized p.

To calculate J, embodiments of the disclosure can perform this analytically or numerically. One embodiment performs this numerically, since it may be easier to do this in a program.

Image Fusion

Referring back to FIG. 27, in steps 2704-2706-2708-2710-2712, embodiments of the disclosure have shown how to analyze damaged parts from single captured image. This process 2704-2706-2708-2710-2712 can be repeated for each input image. For example, in the context of an auto claim, the most claim cases include multiple images of the same vehicle from different viewpoints. Although each image is analyzed independently, the evaluation results can be integrated together, which is referred to herein as "image fusion." For example, the disclosed system is able to generate a heatmap, for each image, to indicate the region where the vehicle is damaged in the image. By fusing the 2D heatmaps from different images, embodiments of the disclosure are able to enhance the damage assessment, for example, in case the heatmap for one image is not satisfactory. To do so, embodiments of the disclosure utilize the 3D model of the vehicle, and map each heatmap into a common 3D space, leading to a 3D version of a heatmap that is convenient for damage appraisal. In some aspects, image fusion can be thought of "wrapping" the heatmaps of the 2D images onto the 3D model.

Figure 50:
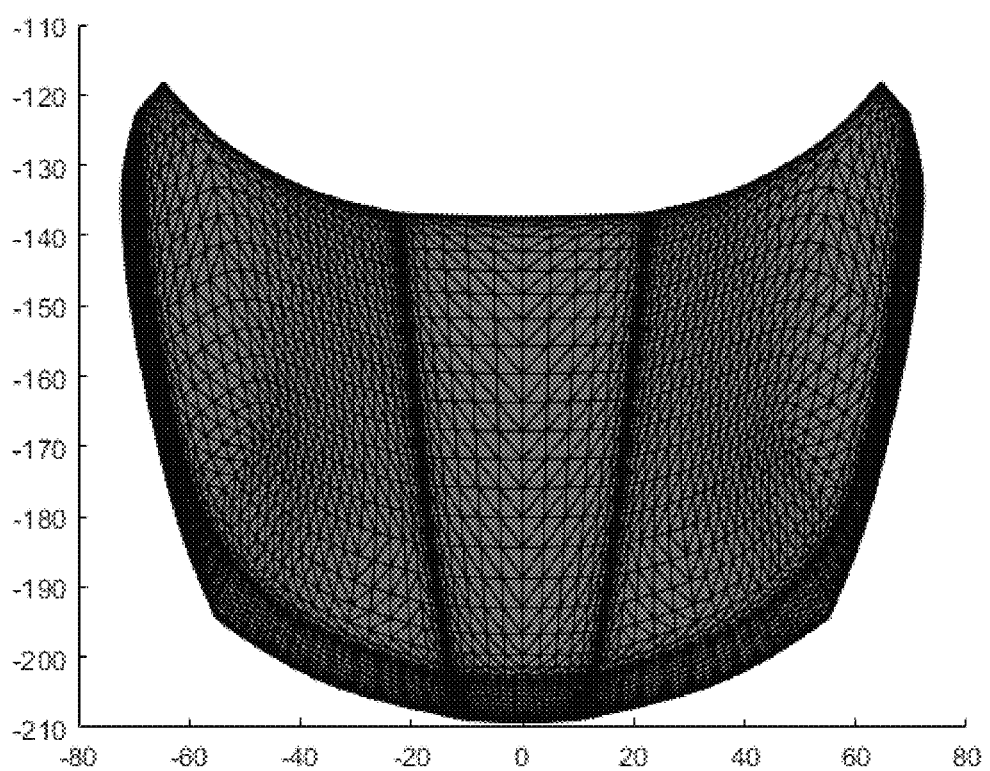
FIG. 50 illustrates an example 3D model of car hood.

More specifically, at step 2714, the server performs multi-image damage fusion. In some implementations, a 3D model includes a set of 3D vertices. Each set of three vertices grouped together form a face (i.e., triangle). An example 3D model of car hood is shown in FIG. 50.

One embodiment for generating the fused 3D heatmap is to assign each vertex or face a color associated with the heatmap. In one implementation, each vertex or face is assigned a heatmap intensity value. To achieve this, one embodiment is to first map each single vertex onto a heatmap image, then use interpolation to get an intensity value in that projected location. The intensity value is assigned to the corresponding 3D vertex, thus back projected to the 3D space.

Figure 51:
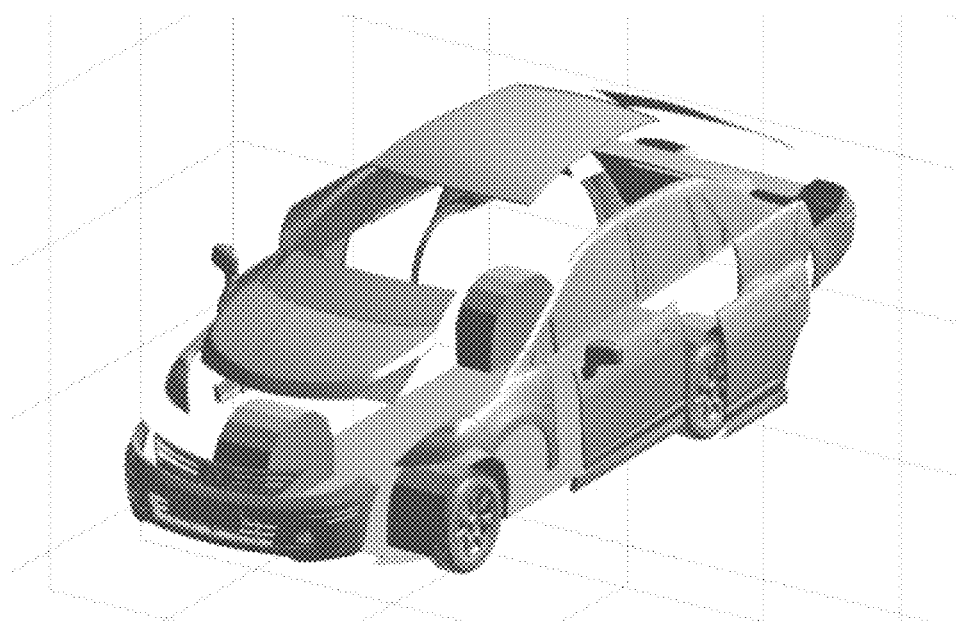
FIG. 51 illustrates an example of a segmented 3D model.

In one implementation, before we perform the 3D to 2D mapping, embodiments of the disclosure first manually segment the 3D model into individual parts. By doing so, we can distinguish which image regions are covered by each part after the 3D to 2D mapping. This can improve efficiency, since if we are only interested in one part, then we can only calculate the 3D projection for that single part, rather than calculate the entire car. FIG. 51 illustrates an example of a segmented 3D model.

Figure 52:
FIG. 52 illustrates the effect of directly projecting the 3D car model onto a 2D image, according to one embodiment.

FIG. 52 illustrates the effect of directly projecting the 3D car model onto a 2D image with the estimated camera matrix, where each part is denoted with different color. This figure also demonstrates the benefits of segmenting the 3D model into individual parts, as the result provides a dense pixel-wise fine part segmentation of the 2D car image.

After performing the direct 3D to 2D mapping without considering the surface information, a problem arises. Since the 3D model is composed of many 2D surfaces, some vertices are actually occluded by surfaces when mapped to 2D. This may cause confusion, for those occluded vertices will mistakenly 'colored' if we do not consider the occlusion issue.

One embodiment to remove occlusion involves a two-staged approach, including a back-face culling stage and a depth checking stage.

Figure 53:
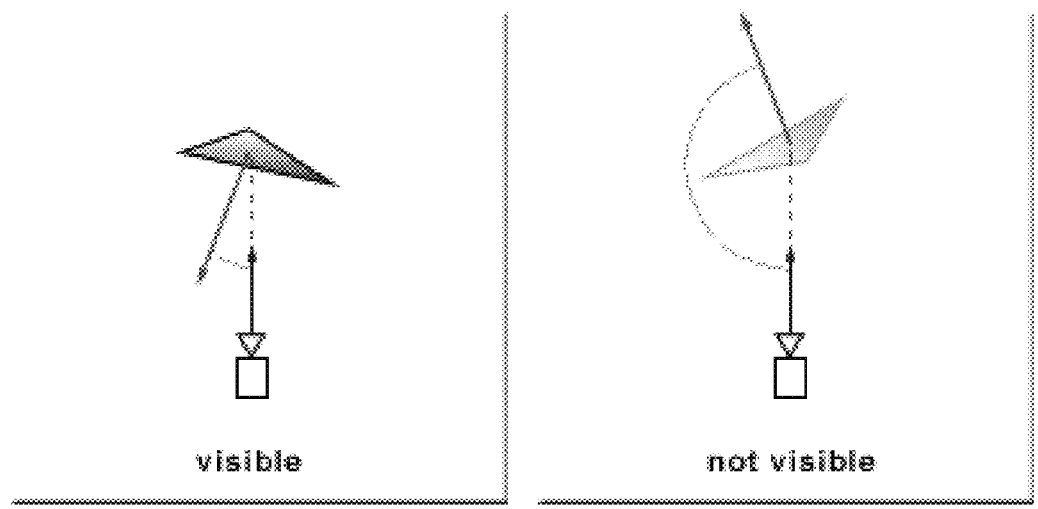
FIG. 53 illustrates an example of back-face culling, according to one embodiment.

In back-face culling, since each vertex in the 3D model is assigned with a normal direction (for example, as in a ".obj" file), according to the back-face culling algorithm, we can connect the camera center with a vertex with a straight line, forming an angle between that line and the norm direction of that vertex. If the angle is larger than 90 degrees, then the vertex should be invisible to the camera; whereas, if the angle is smaller than 90 degree, then the vertex is visible, as illustrated in FIG. 53.

Back-face culling removes most of the occluded vertices, but still may not solve all the problem entirely, since sometimes a surface facing towards the camera can still be occluded. Thus, some embodiments also perform a second stage occlusion removal method referred to as "depth checking stage."

In some implementations, a rendering engine can provide a rendered depth map of the 3D model respective to a certain view point, which denotes the distance between each vertex to the camera center. With such a depth map, embodiments of the disclosure can assign each 3D vertex a rendered distance to the camera center by interpolation (similar to the above described heatmap). Then those rendered 'distances' are compared with their true distance calculated using 3D vertex location. If the rendered 'distance' is smaller than the true distance, this means that occlusion has happened in that vertex.

Figure 54:
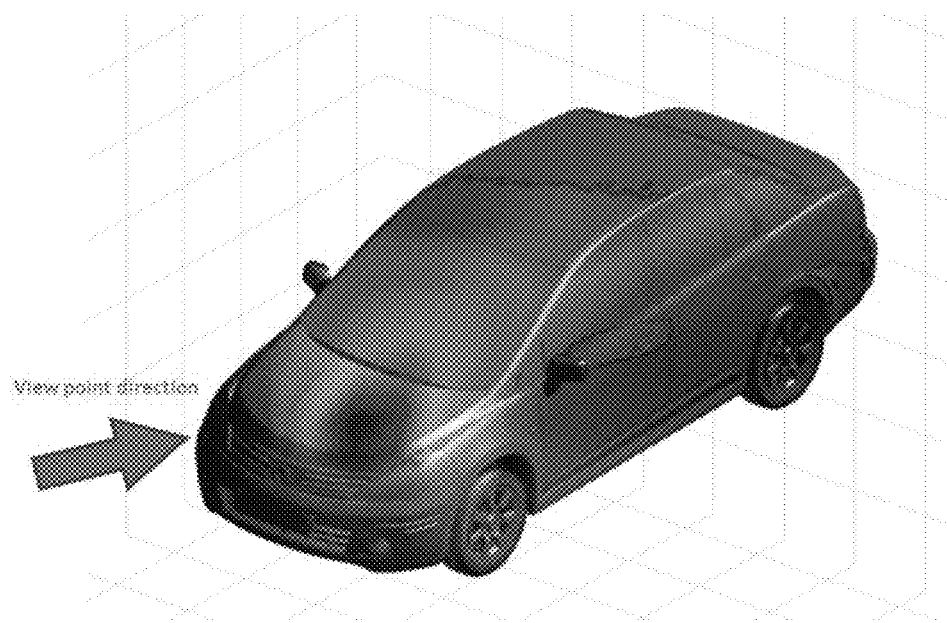
FIG. 54 illustrates a heatmap of intensity values mapped onto a visible region of a 3D model, according to one embodiment.

By using the two-stage occlusion remove method, embodiments of the disclosure can effective remove each occluded vertex when performing single-view 3D to 2D projection. As shown in the example in FIG. 54, the desired heatmap intensity values are mapped onto visible region of the 3D model. The occluded region is shown with a different color.

Figure 55:
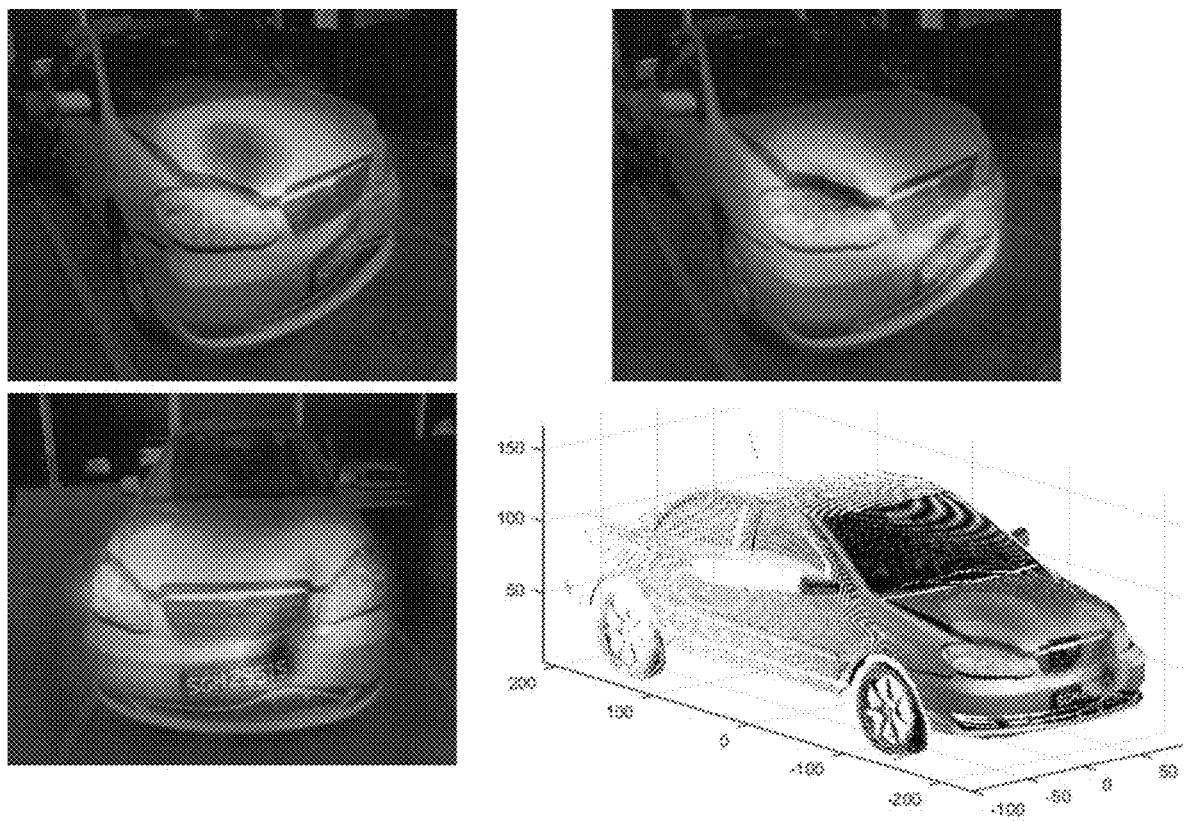
FIG. 55 illustrates an example of fusing multiple 2D images with heatmaps onto a 3D model.

Using the above procedure, embodiments of the disclosure map the heatmap intensity of one single view to the 3D model. This process can be repeated for each image separately, and the results are summed together. Alternatively, if multiple heatmaps correspond to the same vertex, the maximum value in each set can be selected as the final per-vertex heatmap intensity. Still further embodiments may use the mean value as the final per-vertex heatmap intensity if multiple heatmaps correspond to the same vertex. FIG. 55 illustrates an example of fusing multiple 2D images with heatmaps onto a 3D model.

Once the 3D model has the heatmap fused onto it, the server is able to determine which parts are damaged by comparing the heatmap-fused 3D model to a 3D model of an undamaged vehicle.

As described, the method shown in FIG. 27 provides a technique to identify which external parts of a vehicle are damaged, and also which portions of those parts are damaged. As described in FIG. 4 at step 406, from this information, the server may also infer internal damage to the vehicle from detected external damage. Once the externally damaged parts are identified, the server can look up in a database which internal parts are also likely to be repaired or replaced based on the set of damaged external parts. This inference can be based on historical models for which internal parts needed to be replaced given certain external damage in prior repairs. As also described in FIG. 4 at step 408, the server can calculate an estimated repair cost for the vehicle based on the detected external damage and inferred internal damage. The server accesses one or more databases of parts and labor cost for each external and internal part that is estimated to need repair or replacement. The estimate can be provided to an insurance claim adjuster for review, adjustment, and approval.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising:
    performing computerized image processing based on two or more images to generate two or more damage detection images, wherein each damage detection image is a two dimensional (2D) image that includes indications of one or more areas of damage to a vehicle in the damage detection image;
    training a Convolutional Neural Network (CNN) with the two or more damage detection images to detect the indications of the one or more areas of the damage to the vehicle in the damage detection image;
    executing the CNN to detect the indications of the one or more areas of the damage to the vehicle in the damage detection image;
    mapping the two or more damage detection images to a three-dimensional (3D) model of the vehicle to generate a damaged 3D model that indicates one or more areas of the vehicle that are damaged, wherein the damaged 3D model includes a plurality of vertices,
    wherein, for each vertex in the plurality of vertices, an angle for the vertex is formed between (i) a line from a camera center to the vertex, and (ii) a normal direction associated with the vertex,
    wherein, for each vertex in the plurality of vertices, the vertex is visible to a camera in response to the angle for the vertex being smaller than 90 degrees and the vertex is invisible to the camera in response to the angle for the vertex being larger than 90 degrees, and
    wherein each vertex in the plurality of vertices that is visible to the camera is associated with a damage intensity value from a corresponding region of a damage detection image from the two or more damage detection images, wherein multiple damage detection images include regions that correspond to a first vertex on the damaged 3D model, wherein the first vertex is visible to the camera, and wherein a maximum damage intensity value at the first vertex from the multiple damage detection images is selected as the damage intensity value for first vertex; and
    calculating an estimated repair cost for the vehicle based on the maximum damage intensity value at the first vertex of the damaged 3D model.

2. The method of claim 1, wherein the damaged 3D model is segmented into vehicle parts, and calculating the estimated repair cost is based on accessing a parts database that includes repair or replacement costs for damaged vehicle parts, wherein said parts database includes estimates for parts and labor for repairing or replacing individual vehicle parts.

3. The method of claim 1, wherein the damaged 3D model is segmented into vehicle parts, and wherein calculating the estimated repair cost comprises determining that a vehicle part should be replaced when a damaged area of the vehicle part is above a threshold.

4. The method of claim 1, wherein the damaged 3D model is segmented into vehicle parts, and wherein calculating the estimated repair cost comprises determining that a vehicle part should be repaired when a damaged area of the vehicle part is below a threshold.

5. The method of claim 1, further comprising:
    performing pre-processing on the two or more images to remove images that show an interior of the vehicle.

6. The method of claim 1, wherein performing computerized image processing includes:
    determining, for a given image of the two or more images, which external parts of the vehicle are visible in the given image; and
    performing, for the given image, instance segmentation to identify an outline of the vehicle in the given image and to remove other parts of the given image.

7. The method of claim 6, wherein performing, for the given image, instance segmentation comprises:
    identifying a portion of the given image that includes the vehicle using Multi-task Network Cascades (MNC); and
    refining the portion of the given image that includes the vehicle using an edge-map detected from a Structured Random Forest (SFR).

8. The method of claim 1, wherein
    performing computerized image processing includes:
    determining, for a given image of the two or more images, which external parts of the vehicle are visible in the given image based on a pose of the vehicle relative to a camera that captured the given image; and
    for the given image, detecting a damaged area of the given image by processing each of the external parts of the vehicle that is visible through a respective Convolutional Neural Network (CNN) corresponding to the external part.

9. The method of claim 8, wherein performing computerized image processing further includes:
    for the given image, performing 2D damage localization to make a binary decision for each external part that is visible in the given image as to whether of the external part is damaged.

10. The method of claim 1, wherein mapping the two or more damage detection images to the 3D model of the vehicle comprises:
performing template matching and pose refinement; or
performing point correspondence matching.

11. A non-transitory computer-readable storage medium storing instruction that, when executed by a processor, cause a computer system to perform the steps of:
performing computerized image processing based on two or more images to generate two or more damage detection images, wherein each damage detection image is a two dimensional (2D) image that includes indications of one or more areas of damage to a vehicle in the damage detection image;
training a Convolutional Neural Network (CNN) with the two or more damage detection images to detect the indications of the one or more areas of the damage to the vehicle in the damage detection image;
executing the CNN to detect the indications of the one or more areas of the damage to the vehicle in the damage detection image;
mapping the two or more damage detection images to a three-dimensional (3D) model of the vehicle to generate a damaged 3D model that indicates one or more areas of the vehicle that are damaged, wherein the damaged 3D model includes a plurality of vertices,
wherein, for each vertex in the plurality of vertices, an angle for the vertex is formed between (i) a line from a camera center to the vertex, and (ii) a normal direction associated with the vertex,
wherein, for each vertex in the plurality of vertices, the vertex is visible to a camera in response to the angle for the vertex being smaller than 90 degrees and the vertex is invisible to the camera in response to the angle for the vertex being larger than 90 degrees, and
wherein each vertex in the plurality of vertices that is visible to the camera is associated with a damage intensity value from a corresponding region of a damage detection image from the two or more damage detection images, wherein multiple damage detection images include regions that correspond to a first vertex on the damaged 3D model, wherein the first vertex is visible to the camera, and wherein a maximum damage intensity value at the first vertex from the multiple damage detection images is selected as the damage intensity value for first vertex; and
calculating an estimated repair cost for the vehicle based on the maximum damage intensity value at the first vertex of the damaged 3D model.

12. The computer-readable storage medium of claim 11, wherein the damaged 3D model is segmented into vehicle parts, and wherein calculating the estimated repair cost comprises determining that a vehicle part should be replaced when a damaged area of the vehicle part is above a threshold or determining that the vehicle part should be repaired when the damaged area of the vehicle part is below the threshold.

13. The computer-readable storage medium of claim 11, further comprising:
performing pre-processing on the two or more images to remove images that show an interior of the vehicle.

14. The computer-readable storage medium of claim 11, wherein performing computerized image processing includes:
determining, for a given image of the two or more images, which external parts of the vehicle are visible in the given image; and
performing, for the given image, instance segmentation to identify an outline of the vehicle in the given image and to remove other parts of the given image, wherein performing, for the given image, instance segmentation comprises:
identifying a portion of the given image that includes the vehicle using Multi-task Network Cascades (MNC); and
refining the portion of the given image that includes the vehicle using an edge map detected from a Structured Random Forest (SFR).

15. The computer-readable storage medium of claim 11, wherein performing computerized image processing includes:
determining, for a given image of the two or more images, which external parts of the vehicle are visible in the given image based on a pose of the vehicle relative to a camera that captured the given image; and
for the given image, detecting a damaged area of the given image by processing each of the external parts of the vehicle that is visible through a respective Convolutional Neural Network (CNN) corresponding to the external part.

16. The computer-readable storage medium of claim 11, wherein mapping the two or more damage detection images to the 3D model of the vehicle composes: performing template matching and pose refinement; or performing point correspondence matching.

17. A server device, comprising:
a memory storing instructions; and a processor configured to execute the instructions to cause the server device to:
perform computerized image processing based on two or more images to generate two or more damage detection images, wherein each damage detection image is a two dimensional (2D) image that includes indications of one or more areas of damage to a vehicle in the damage detection image;
train a Convolutional Neural Network (CNN) with the two or more damage detection images to detect the indications of the one or more areas of the damage to the vehicle in the damage detection image;
execute the CNN to detect the indications of the one or more areas of the damage to the vehicle in the damage detection image;
map the two or more damage detection images to a three-dimensional (3D) model of the vehicle to generate a damaged 3D model that indicates one or more areas of the vehicle that are damaged, wherein the damaged 3D model includes a plurality of vertices,
wherein, for each vertex in the plurality of vertices, an angle for the vertex is formed between (i) a line from a camera center to the vertex, and (ii) a normal direction associated with the vertex,
wherein, for each vertex in the plurality of vertices, the vertex is visible to a camera in response to the angle for the vertex being smaller than 90 degrees and the vertex is invisible to the camera in response to the angle for the vertex being larger than 90 degrees, and
wherein each vertex in the plurality of vertices that is visible to the camera is associated with a damage intensity value from a corresponding region of a damage detection image from the two or more damage detection images, wherein multiple damage detection images include regions that correspond to a first vertex on the damaged 3D model, wherein the first vertex is visible to the camera, and wherein a maximum damage intensity value at the first vertex from the multiple damage detection images is selected as the damage intensity value for first vertex; and calculate an estimated repair cost for the vehicle based on the maximum damage intensity value at the first vertex of the damaged 3D model.

\* \* \* \* \*